(12) United States Patent
Wang et al.

(10) Patent No.: US 7,980,283 B2
(45) Date of Patent: Jul. 19, 2011

(54) SYSTEM AND METHOD FOR USING A FORCE MODEL TO CONTROL PROCESS CONFIGURATIONS FOR THE ENCAPSULATION OF A WEB

(75) Inventors: Michael Wang, Shanghai (CN); Randy Meirowitz, San Diego, CA (US); Jamie Henderson, Temecula, CA (US)

(73) Assignee: Nextec Applications, Inc., Greenwich, CT (US)

( * ) Notice: Subject to any disclaimer, the term of this patent is extended or adjusted under 35 U.S.C. 154(b) by 612 days.

(21) Appl. No.: 12/015,453

(22) Filed: Jan. 16, 2008

(65) Prior Publication Data

US 2009/0181589 A1 Jul. 16, 2009

(51) Int. Cl.
*B05C 5/02* (2006.01)

(52) U.S. Cl. ......................................... 156/356; 422/59

(58) Field of Classification Search ............... 156/60, 156/64, 350, 356; 442/59
See application file for complete search history.

(56) References Cited

U.S. PATENT DOCUMENTS

| | | | |
|---|---|---|---|
| 3,265,529 A | 8/1966 | Caldwell et al. |
| 3,594,213 A | 7/1971 | Rudman |
| 4,666,765 A | 5/1987 | Caldwell et al. |
| 5,004,643 A | 4/1991 | Caldwell |
| 5,209,965 A | 5/1993 | Caldwell |
| 5,418,051 A | 5/1995 | Caldwell |
| 5,698,303 A | 12/1997 | Caldwell |
| 5,846,604 A | 12/1998 | Caldwell |
| 5,856,245 A | 1/1999 | Caldwell |
| 5,869,172 A | 2/1999 | Caldwell |
| 5,874,164 A | 2/1999 | Caldwell |
| 5,876,792 A | 3/1999 | Caldwell |
| 5,912,116 A | 6/1999 | Caldwell et al. |
| 5,935,637 A | 8/1999 | Caldwell et al. |
| 5,954,902 A | 9/1999 | Caldwell |
| 5,958,137 A | 9/1999 | Caldwell et al. |
| 6,040,251 A | 3/2000 | Caldwell |
| 6,071,602 A | 6/2000 | Caldwell |
| 6,083,602 A | 7/2000 | Caldwell et al. |
| 6,129,978 A | 10/2000 | Caldwell |
| 6,289,841 B1 | 9/2001 | Caldwell |
| 6,312,523 B1 | 11/2001 | Caldwell |
| 6,342,280 B1 | 1/2002 | Patrick et al. |
| 6,416,613 B1 | 7/2002 | Patrick et al. |
| 2001/0017102 A1 | 8/2001 | Caldwell |

OTHER PUBLICATIONS

International Search Report (ISA/US) Application No. PCT/US09/30213, dated Mar. 10, 2009.

(Continued)

*Primary Examiner* — Arti Singh-Pandey
(74) *Attorney, Agent, or Firm* — Sheppard Mullin Richter & Hampton LLP; David E. Heisey

(57) ABSTRACT

The present invention relates to methods and apparatus for manufacturing a treated web. The subject methods and apparatus involve the control of numerous variables, including, without limitation, web tension (both overall web tension as well as the web tension immediately before and after each individual blade), angle of entry of web into each blade, blade angle in relation to horizontal reference point, blade pressure against moving web, angle of exit of web from each blade, web speed, number of blades, the pressure of the leading nip rolls, the pressure of the trailing nip rolls, static control, thickness of each blade, bevel on each blade, oven cure temperature, oven cure dwell time, blade temperature and blade surfaces and edge conditions and blade finish.

25 Claims, 31 Drawing Sheets

OTHER PUBLICATIONS

Written Opinion (ISA/US) Application No. PCT/US09/30213, dated Mar. 10, 2009.
U.S. Appl. No. 12/900,377, Randy Meirowitz.
U.S. Appl. No. 12/857,401, Jaime Henderson.
U.S. Appl. No. 12/728,125, Jaime Henderson.
NEXTEC Applications, Inc.; "First Amended Complaint Against Brookwood Companies for Patent infringement," Case 1:07-cv-06901-RJH-THK; filed Sep. 19, 2009, pp. 1-10.
NEXTEC Applications, Inc.; "Brookwood Companies Answer to First Amended Complaint;" Case 1:07-cv-06901-RJH-THK; filed Oct. 3, 2008, pp. 1-9.

FIG. 53

Proposed WAO Distribution at Different Encapsulation Pressures

*Total WAO*

*WAO in Surface Region*

*WAO Inside A Fabric*

WAO

Low          Encapsulation Pressure          High

FIG. 54

SYSTEM AND METHOD FOR USING A FORCE MODEL TO CONTROL PROCESS CONFIGURATIONS FOR THE ENCAPSULATION OF A WEB

TECHNICAL FIELD

The present invention relates to methods and apparatus for the introduction of sufficient energy to controllably and selectively place a polymer composition into a porous web. The present invention more particularly relates to methods of and apparatus for the controlled placement of a curable, shear thinning, polymer composition into a web. The controlled placement is preferably performed through the energy controlled viscosity and rheology modified placement of the polymer controlled manner by 1) applying the polymer composition onto a surface of a web, 2) shear thinning the composition and placing it into the web, and 3) curing the polymer composition. This method and apparatus produces a web that either has some of its fibers or structural elements encapsulated by the polymer composition while at least some of the interstitial spaces of the web are open; or has an internal layer extending through the web in a direction generally spaced from at least one major surface thereof; or has both encapsulated structural elements and an internal layer of polymer composition.

DESCRIPTION OF THE RELATED ART

There has always been an ongoing thrust to achieve improved fabric performance properties. Properties of interest range from the quantifiable like water resistance/repellency, fire resistance, and adhesion performance to the subjective such as comfort. Two distinct pathways for improved performance have historically been followed: development of new fibers and surface modification of existing fibers. Development of new fibers is costly and often requires relearning how to manufacture the product or retooling for different materials. Surface modification is an attempt to achieve desirable properties while minimizing changes and cost additions to existing processing.

There are many reasons to explore surface modification of materials, not the least of which is to have bulk mechanical properties of a fabric delivered by the base fiber and different surface properties imparted by a small amount of material which does not degrade the mechanical properties of the fiber. This same argument can be made from an economic standpoint, where the base fiber is less expensive than the modifier. Difficulties encountered with surface modification have included durability, economically feasible and environmentally friendly processing.

There are essentially three different physical types of surface modifications. The first type is where the modifier is chemically bound to the surface of the substrate material covalently. This can be achieved in many different ways such as chemical grafting onto the surface of the substrate through condensation or high energy addition reactions, or oxidizing the substrate away leaving a covalently bound modified surface. Covalently bound modifiers are usually the most durable surface modifications however, the lengths to which one must go in order to obtain a graft on a substrate can be tremendous. The second type of surface modification is causing an association or entrapment of the modifying molecule (or part of the molecule) with the substrate material. This comingling of modifier molecules and substrate uses molecular attractions like Van der Waals forces, dipole/dipole interactions, Hydrogen bonding, etc. as well as steric factors to hold the modifier in/on the surface of the substrate. The factors that affect this type of reaction are the same as those that effect thermosol dyeing or blooming. The third type of modification involves the retention of modifier by substrate with only adhesive and cohesive forces between the modifier to the substrate and the modifier to itself respectively. This is the most common type of surface modification in the textile area.

In textile technology traditional finishes, or topically applied modifications via immersion, coating or lamination, have inherent limitations.

Immersion applications of 100% solids, solvent dissolved solids, or aqueous emulsion can be performed by running a fabric through a bath and then drying. 100% solids applications usually use either low molecular weight materials (with viscosity's low enough for processing) that tend to yield a modification with poor mechanical properties or higher molecular weight materials which often do not to give optimal penetration into the substrate. Solvent processing has environmental and economic issues such as removal of the solvent, fate of Volatile Organic Compounds (VOCs), and permits which have a cost, if grandfathered, and are becoming more difficult to obtain if not grandfathered. Solvent and emulsion processing both are thermodynamically driven to yield low surface coverage due to poor substrate wet out, (greater than zero contact angle—$\theta$), if the modifier is of a lower surface tension ($\gamma$) than the substrate (e.g. Durable Water Repellant—DWR). Provided the surface of the substrate is wet out by the modifier these techniques still require removal of the solvent or aqueous media which tends to cause imperfections in the polymer network, manifested as reduced mechanical properties of the modifier/substrate combination.

Coating applications can be deliberate or formed by immersions that have poor penetration into the substrate. Coatings can be one or two sided but tend to be step gradients in the Z direction of the fabric, as opposed to a homogeneous material or continuous gradient. A step gradient has certain intrinsic disadvantages. Adhesion derives mostly from surface forces, less than optimal mechanical interlocking, and sometimes little to no contribution from cohesive strength of the modifying material. Secondly because of the disparate materials plied together the resultant tactile properties of the composite (i.e.—hand, drape, etc.) are usually distinctly different than the base fabric.

Laminations use an adhesive tie coat to keep a film in contact with the fabric surface. The limitations of this process can be environmental issues with the adhesives (as well as with any other part of the film preparation process), and the same issues with coating caused by a Z directional step gradient in the fabric. Additional difficulties are encountered in ensuring that the mechanical performance differential between the substrate, adhesive, and film is balanced. For instance if shrinkage of any of the three materials passes the initial yield stress of either of the other materials there will be deformation, if it passes the ultimate tensile there will be delamination of the composite. Finally for both coating and lamination performance of the final material is due to the added layer, so that if the fabric tended to absorb water before the application of the coating or lamination, the fabric will still absorb water after the coating or lamination. Absorption of water by a fabric yields a material that, as the water evaporates, causes discomfort to the wearer. The mechanism for discomfort is loss of body heat through evaporative heat loss (the "refrigerator effect").

BRIEF SUMMARY OF EMBODIMENTS OF THE INVENTION

One encapsulation process described herein, according to one embodiment, has up to 40 different variables that can be changed to affect the performance of the final product. Historically this number of variables has required an empirical or a trial and error approach for developing products by this technology. More recently a more sophisticated statistical method like Design of Experiments (DOE) is used to develop products. In performing a DOE one chooses "factors" (variables) which are changed in a controlled fashion and measures "responses" (properties of the final material). By utilizing the statistical methods of a DOE one can run only a fraction of all possible experimental conditions and glean product performance related information with a high confidence level. However, even utilizing DOE techniques product development for this process, requires a tremendous number of trials taking a large amount of time and costing a substantial amount of money. This, in turn, has a negative impact on the number of products which can be developed and of the eventual cost of these products to the end consumer.

The complicated nature of the encapsulation process can be facilitated by a method or process in which a reduction of variables could be effected. The forty or so variables in the encapsulation process have been examined. Primary and higher order variables (relative to their effect on product performance) have been identified. Product development, modification and trouble shooting are performed by making changes to the primary variables. Further, the use statistical methods (e.g.—Design of Experiments (DOE)) coupled with the reduction to primary variables has been a tremendous step along the way in making this technology reproducible, robust and economically feasible.

The identification of primary variables has been through experimental observation and it is "accepted" that the correct variables have been chosen. The possibility exists that some primary variables have not been identified and that some higher order (less than primary) variables have been chosen. A second point is the more experimental and duplicate data points in the DOE the higher the degree of confidence in the results, which requires more time and investment. Also even if the right variables have been chosen and the results are correct to a high degree of confidence the DOE allows only for prediction of behavior by "interpolation", that is, with in the boundaries established by the design. In other words, one should not "extrapolate" the results to make predictions outside of the limited design space. In order to move to the next level of sophistication and efficiency, a tool that addressed these inherent weaknesses is required.

A new tool to facilitate product development, modification and trouble shooting should identify a limited number of process variables, or groups of variables, which can be controlled, measured and used to predict product performance. These variables should be confirmed as primary variables (ones which have a major impact) for the encapsulation process. There needs to be a demonstration of correlation between some end property of interest (performance) and the variables identified. Finally a causal relationship between changes to these variables and the responses of the desired end property must be shown.

According to one embodiment, the present invention provides a system and method for using a force model, based on classical Newtonian Mechanics, to control the process of encapsulation. The encapsulation process can be described in mathematical and geometric terms by use of classical Newtonian Mechanics. This description is based on a vector force analysis of the encapsulation process. The force that results from the interaction between process variables including, but not limited to fabric structure, fabric tension, polymer viscosity ($\eta$), entry angle between the fabric and the blade, exit angle between the fabric and the blade, sharpness of the blade, and line speed can be calculated.

In accordance to another embodiment of the present invention, a method for encapsulating a web with an encapsulation material is provided. The method comprises: determining initial material properties of the material to be encapsulated (such as weight, strength, porosity, weave, etc.); determining a process configuration using a force model of an encapsulating system having two coating blades, each blade is configured to encourage the encapsulation material to encapsulate the web when the web passes each of the blades, and wherein the force model is applied based on the initial material properties of the material to be encapsulated; and encapsulating the web using the determined process condition. In one embodiment, a first blade of the two coating blades is downstream from a second blade of the two coating blades.

In yet another embodiment, the method further includes determining a final (end) performance property of the encapsulated web (such as, air permeability, hydrostatic head, Weight Add On (WAO), etc.), and wherein the force model is applied based on the final performance property of the web.

In another embodiment, the method further includes defining a property of the encapsulation material (Polymer; such as viscosity, coefficient of friction, etc.), and wherein the force model is applied based on the defined property of the encapsulation material (polymer).

In still another embodiment, the process configuration comprises one or more of a first entrance angle of the first blade, a first exit angle of the first blade, a first radius of the first blade, a second entrance angle of the second blade, a second exit angle of the second blade, a second radius of the second blade, and tension of the web.

In yet another embodiment, the force model comprises:

$$\frac{F_{N2}}{F_{N1}} = \frac{Cos\theta_{i2}}{Cos\theta_{i1}(1 - Cos\theta_{e1}\mu)(1 - Cos\theta_{i2}\mu)}$$

wherein $F_{N2}$ is a force normal to the web at the second blade, $F_{N1}$ is a force normal to the web at the first blade, $\theta_{i1}$ is the first entrance angle, $\theta_{e1}$ is the first exit angle, $\theta_{i2}$ is the second entrance angle, $\theta_{e2}$ is the second exit angle, and $\mu$ is a coefficient of friction between the web and the blades.

In yet another embodiment, the process configuration is selected such that $F_{N2}$ is larger than $F_{N1}$, wherein $F_{N1}$ and $F_{N2}$ are selected based on the desired property of the encapsulated web.

In one embodiment, the first and second entrance angles and the first and second exit angles have a range of 25-85 degrees. The first and second radii have a range of 0.00002-0.00100 inches, and the tension of the web has a range of 125-750 pounds.

In yet another embodiment, the first material property comprises weight, strength, porosity, or weave configuration, and the second material property comprises a viscosity of the encapsulation material.

In yet another embodiment, the viscosity of the encapsulation material has a range of 100,000-1,500,000 centipoises.

In accordance with yet another embodiment of the invention, an encapsulating system comprises: a first blade and a second blade configured to cause an encapsulation material to encapsulate a web, the second blade being downstream from the first blade; a plurality of rollers for supporting and encouraging the web to pass the first and second blades; a force modeling module configured to receive characteristics of the web and the encapsulation material, wherein the force modeling module is configured to generate operating parameters for controlling one or more of the first and second blades and one or more of the plurality of rollers based on the received characteristics; and a control module configured to implement the generated operating parameters such that a first force is exerted on the web by the first blade and a second force is exerted on the web by second blade.

The methods and apparatus of the present invention permits the application of the polymeric composition onto the surface of the web by a variety of means. After the polymer is applied to the surface of the web, the polymer composition is preferably immediately shear thinned to controllably and significantly reduce its viscosity and place it into selected places within the web. To aid in this process, the web is preferably distorted, typically by stretching at the location of the shear thinning. This distortion facilitates the entrance of the polymer composition into the web by creating a double or dual shear thinning. In the case of the web, this is produced by the combination of the edge condition of the blade, the engineered shear thinnable polymer, the speed of the web, and the subsequent repositioning of the fibers and filaments after their immediate passage under the edge of the blade.

Controlled placement of the polymer composition within a web may be performed by a basic embodiment of a machine in accordance with the present invention, that is as simple as an applicator to apply viscous polymer to the surface of the web, a pair of facilities for applying tension to a section of the web and a blade forced against the web in the section under tension. The web is pulled under tension past the blade, or, alternatively, the blade is moved relative to the web, and the forces generated by the blade cause the polymer composition to flow into the three-dimensional matrix of the web, and controllably be extracted out of the web leaving a thin film of polymer encapsulating selected fibers, or an internal layer of polymer, or both. Tension on the web is preferably released thereafter, and the web is cured.

The present invention includes novel methods and apparatus for manufacturing webs, fibers and fabrics that have certain desirable physical qualities such as water resistance, increased durability, and improved barrier qualities by combining the use of encapsulated fibers and filaments and a breathable or controlled pore size internal coating with a controlled surface chemistry modification and the like. Such webs, fibers and fabrics can be used to prepare a wide variety of products including, but not limited to, carpets, specialized clothing, career apparel, bioengineered surfaces for diagnostic applications, and upholstery. By use of the present invention, webs, fibers and fabrics can be manufactured with a wide variety of desired physical characteristics.

Methods and apparatus of the present invention can treat webs or fabrics which are generally flat or planar with great internal precision of the internal Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIGS. 52-53 are diagrams illustrating models of fabric encapsulation according to embodiments of the present invention.

FIG. 54 illustrates results generated by one or more of the force models listed above according to embodiments of the present invention The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The following description is of the best presently contemplated mode of carrying out the invention. This description is made for the purpose of illustrating the general principles of the inventions and should not be taken in a limiting sense.

Before describing the invention in detail it is useful to describe a few example environments with which the invention can be implemented. Description in terms of this example environment is provided to allow the various features and embodiments of the invention to be portrayed in the context of an exemplary application. After reading this description, it will become apparent to one of ordinary skill in the art how the invention can be implemented in different and alternative environments.

Figure 1A:
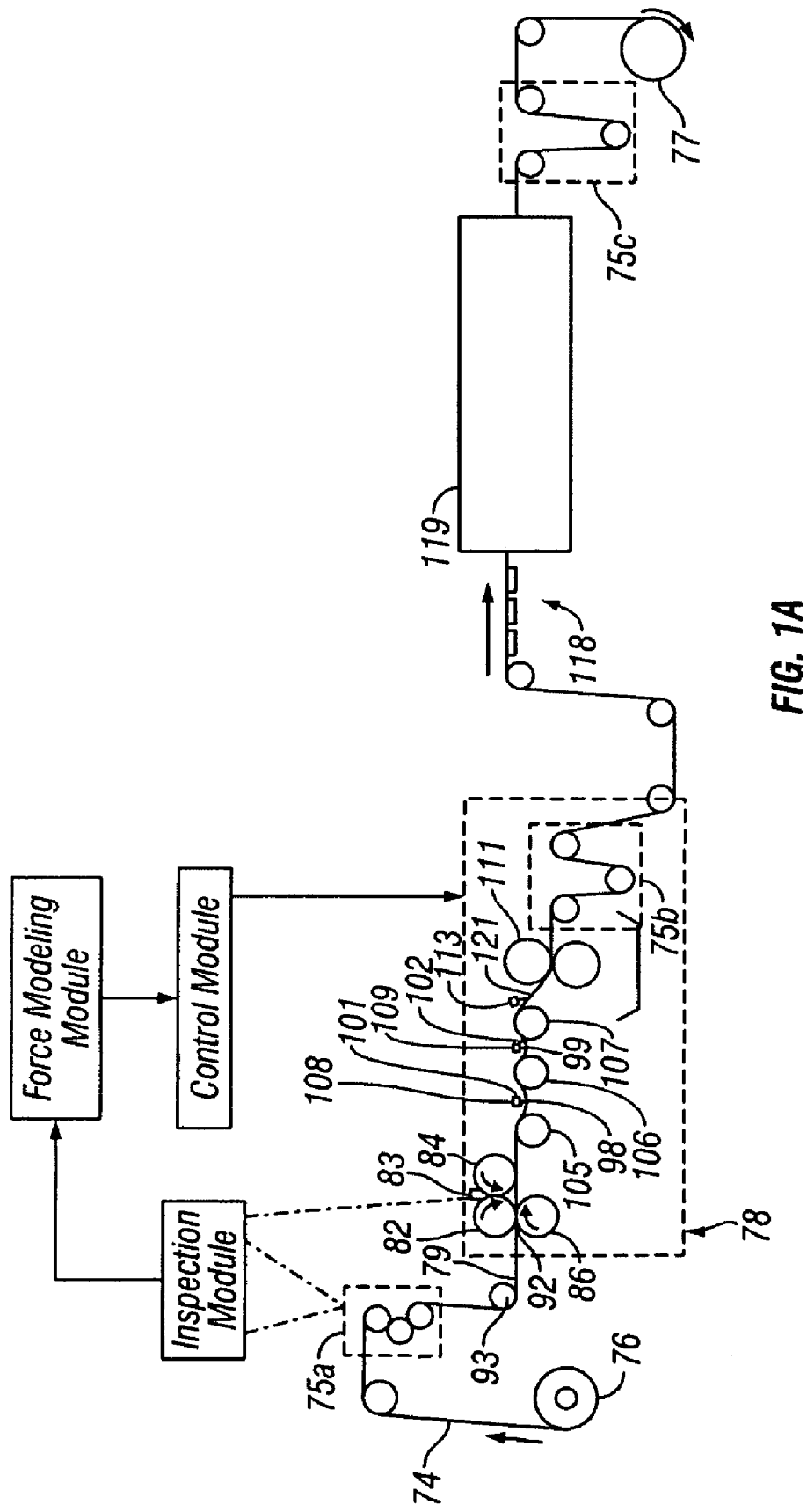
FIGS. 1A-C are diagrams illustrating environments/apparatuses in which the invention can be implemented.

One such example is that of a coating or encapsulating system used to coat a web of material such as, for example, fabric. FIG. 1A illustrates a schematic of an apparatus or environment 100 in which the present invention is being implemented according to an embodiment of the present invention. Referring now to FIG. 1A, apparatus 100 includes a continuous web 74 that is being moved along a web pathway from a supply roll 76 to a take-up roll 77. Apparatus 100 further includes web tensioning devices 75a-c, a coating or encapsulating station 78, shear-knifes or blades 101 and 102, tenter frame 118, oven 119, inspection module 123, force modeling module 124, and control module 125.

Coating station 78 is configured to apply a polymer composition to the upper face 79 of web 74 by a polymer applicator such as a conventional reverse roll coater 81. In the reverse roll coater 81, the polymer composition is applied to the surface of a reversely rotating (relative to the direction of travel of web 74) coating roll 82 from a nip region reservoir 83 formed between the coating roll 82 and a transfer roll 84 (which rotates in the direction of travel of web 74, but whose surface does not contact web 74). The web 74 is transversely compressed between coating roll 82 and drive roll 86 as it passes through station 78. Thus, in one embodiment, the polymer composition is applied under a positive pressure against face 79 by coating roll 82 which functions to cause the composition to be forced into web 74. In one embodiment, coating roll 82 has a smooth, chrome plated surface. Alternatively, polymer composition may be applied to the upper face 79 of the web 74 without any force, leaving the controlled placement and shear thinning for a subsequent step or series of steps, such as by the force of the shear blades 101 and 102 as described below.

Largely for purposes of controlling the alignment of web 74 with rolls 82 and 86, the web 74 is pre-tensioned by tensioning devices 75a. In one embodiment, tensioning devices 75a are components of a conventional web clutching mechanism (not detailed) which provides selective tensioning of web 74 prior to a nip region 92 defined between rolls 82 and 86 with the intervening roller roll 93 being used for guidance of web 74. Tensioning devices 75a also function to smooth out and extend web 74 before it enters coating station 78.

After passing nip region 92 the web 74 is controllably longitudinally tensioned along the web pathway extending from nip region 92 to tensioning devices 75b. The tensioning devices 75b are components of a conventional web tension adjusting and regulating mechanism (not detailed) which provides for on-line, in-stream operator controlled adjustments that permit selective control of the tautness of web 74 particularly in the web pathway region from nip region 92 to tensioning devices 75b.

Along the tensioned web pathway region, the web 74 successively passes through each one or more of a series of processing area 98, 99 and 121. While three processing stations are shown, more or less could be utilized in accordance with this invention. At each of the stations 98 and 99, a substantially non-flexible shear blade 101 and 102, respectively, extends laterally across web 74 with the web 74 being entirely unsupported on the lower face thereof which is opposed to upper face 79 and to the respective blade of shear blades 101 and 102.

To control the amount and type of shear force independently applied by each blade 101 and 102 the web 74 passes over each blade edge in a contacting relationship and three blade rolls 105, 106 and 107. Rolls' 105-107 position may be adjustable relative to blades 101 and 102. The blades 101 and 102 are also adjustable both vertically and angularly. By adjusting the vertical height of each blade relative to the web path or the web path's position relative to each blade, the force of each blade against the web can be controlled. By adjusting the vertical height of the blade rolls, the shear force can be controlled and the angle at which the web contacts the blades can also be controlled.

In one embodiment, blade rolls 105 and 106 can be positioned such that roll 105 is on the lead side, and roll 106 on the trailing side, of blade 101 while blade rolls 106 and 107 are positioned so that roll 106 is on the lead side, and roll 107 is on the trailing side of blade 102. The angle of inclination or tilt of each blade 101 and 102 relative to the vertical is adjustable over a wide range, but it is presently preferred to adjust the blade inclination angle for each blade between about ±45° relative to the vertical with the web 74 being horizontal. In one embodiment, each respective blade is functionally associated with a blade back support or holder 108 and 109, respectively. Each support 108 and 109 permits its associated blade 101 and 102 to be vertically and angularly positioned relative to a supporting frame (not shown).

As shown in FIG. 1A, another adjustable variable is the amount of angular web depression achieved by the web in its passage over the circumferential edges of adjacent rolls 105 and 106 relative to blade 101, and in its passage over the circumferential edges of rolls 106 and 107 relative to blade 102. Considering the place where the blade 101 or blade 102 contacts the web to be a hypothetical point, the angle of the blade 101 or blade 102 relative to the web can be in the range of about 30° to about 140°.

In one embodiment, shear blades 101 and 102 can have straight edges to shear thin the polymer composition; however, it will be appreciated that shear knives or blades may have other shapes such as, for example, curved or circular edges. For example, when treating a web which displays differential longitudinal stretch characteristics laterally there across in response to a uniform laterally applied warp tension, it appears to be possible to equalize the shear forces applied to a web by employing a suitably curved shear blade which appears to compensate for such a differential stretch characteristic.

In one embodiment, shear blades 101 and 102 can have sharp edges, dull or rounded edges. Preferably, knives 101 and 102 have edges that are surface finished to a desired uniformity as measured by a root mean squared (RMS) calculation.

In one embodiment, shear blades 101 and 102 can be formed of steel or other materials such as, for example, metal alloys, non-metallic composites, and the like. The shear knives are preferably hardened or otherwise treated to reduce wear.

Those skilled in the art will appreciate that the amount of shear force applied by one or more shear blades 101 or 102 transversely against a web 74 is a function of many variables with probably the most important or principal variables being the polymer viscosity, the longitudinal web tension, and the positioning of the shear knives 101 and 102 relative to the web 74 during operation.

In one embodiment, the temperature of the blade can be kept cool to keep the polymer composition from curing prematurely. This can be accomplished by passing a coolant through or around the blade or by other means well known in the art. Alternatively, the blade could be heated by passing a heated fluid around or through the blade, if desired to improve or alter the viscosity and rheology for the required changes in the polymer necessary to achieve a specific product.

The blade finish can also be important. In one embodiment, a blade face and edge having a hard and smooth surface is desirable to shear thin the polymer and to maximize friction or selectively create shear forces between the web, the polymer, and blade(s). For some applications, the blades should preferably remain rigid in all dimensions and have minimal resonance in order to get uniform web treatment.

In one embodiment, the angle of each blade can be rotated ±90° from the vertical. In order to vary the shear and placement forces of the blade against the web, polymer and additives, adjustment facilities are provided for moving the blade vertically up and down and moving the blade forward and backward horizontally. All three axis are important for creating the desired control which causes the encapsulated fibers and/or filaments, the additive placement and orientation on the fiber and filaments, the optional internal layer, and the controlled thickness of the encapsulating films or internal layer. The lateral placement of each blade relative to the other is also important and facilities are provided for allowing lateral movement of each blade toward and away from each other. The lateral placement of each blade controls the micro tension and elastic vibration of the web between the preceding roll and the blade, thereby controlling the web after the immediate exit of the web from the blade and controlling the Coanda Effect (also known as "boundary layer attachment", is the tendency of a stream of fluid to stay attached to a convex surface, rather than follow a straight line in its original direction).

In one embodiment, changing the tension of the web can result in changes internally to the web such as, for example, the position of the internal layer of the web, amount of fiber encapsulation, and thickness of the film encapsulating the individual fibers or filaments.

At the leading edge of the blade, the web is stretched longitudinally and the polymer is simultaneously and dynamically shear thinned, placed into the web, and partially extracted from the web, thereby leaving encapsulated fibers and filaments and/or an internal layer. As the web passes the leading edge of the blade, the elastic recovery forces of the web combined with the relaxation or elastic recovery of the fibers and filaments causes fiber encapsulation and the surface chemistry modification (or bloom). It is believed that this occurs by the popping apart of the individual fibers and filaments. The fibers and filaments either pull the polymer from the interstitial spaces or the rheology of the polymer attracts it to the fibers and filaments or some combination of the two. The end result is that the polymer in the interstitial spaces moves to the fibers and filaments as they move or snap apart, thereby creating encapsulated fibers and filaments. At the bottom surface of the blade, the thickness, depth, and controlled placement of the internal layer is determined. A wider blade results in a thicker internal layer of polymer. Further, the dynamics of stretch and relaxation of the fibers provides for an even energy necessary for the thin film encapsulation of the polymer composition over the fibers.

When a suitable and preferred level of applied shear force and web tensioning have been achieved to produce a product having encapsulated or enveloped fibers and/or an internal coating, or both, one can usually hear a distinctive sound in the region of a shear blade 101 and 102. This sound can also be heard in the vicinity of shear blades being used in the operation of other processes described herein. This sound can in fact be used by an operator as a rough guide as to whether or not the operator is succeeding in producing a product with controlled polymer placement containing enveloped fibers and/or an internal coating, or both.

Blade roll 105 may also function as a compensator roll for mechanically adjusting and controlling web tension before shear thinning begins. Also, conveniently and preferably the web tension is sensed electronically, and then roll 105 is automatically raised or lowered to achieve web tensioning adjustments so as to maintain a preset predetermined tension in web 74.

Apparatus 100 also includes a flexible so-called "flex-blade" or "Spanish blade" 100 is positioned. Preferably, the blade of this flexible blade 10100 is inclined at an angle with respect to the web 74 passing there against so that the blade 10100 exerts a compressive force against the face 79 of web 74 with opposed face 103 being entirely unsupported. The angle with respect to a (hypothetical) perpendicular line extending into a (hypothetical) straight line extending from the circumferential edge of roll 107 to the circumferential edge of a roll 111 can range from about 30° to about 140° for the adjustment of the inclination angle of the flex blade. To provide adjustability for flexible blade 101, blade 101 is functionally associated with a mounting bracket or back supports 113 which in turn is adjustable relative to an methods and apparatus frame (not shown).

In one embodiment, after leaving tensioning devices 75b, web 74 is under reduced or preferably minimal tension and is led into oven 119 via tenter frame 118. Distortions or other defects in the web may exist at this point in the process. These distortions can be metered and observed and then the tenter frame 118 can be adjusted such that the web can be straightened or shaped either longitudinally or laterally, as desirable or considered necessary for an individual web. If desired, the tenter frame 118 can be automatically operated to apply tensioning forces to a web in accordance with a predetermined program, or the like. It is to be understood, however, that a tenter frame may not always be necessary or desirable. Many webs may be processed in accordance with the principles of this invention without use of a tenter frame or other transverse tensioning device. In such cases, the web will pass directly into the curing ovens from the tensioning devices 75b.

The tenter frame 118 can also provide the start of a new zone of limited longitudinal and transverse tensioning which extends forwardly along the web pathway from tenter frame 118 through oven 119 to a tension compensator, here shown as utilizing three tensioning device 75c which are part of a conventional mechanical tension compensator subassembly which is similar in structure and function to the compensator subassembly incorporating the previously described tensioning devices 75b. The tensioning longitudinally of web 74 as it passes through oven 119 is employed to control the web 74 as it passes through oven 119 as regards web dimensional limits. This tensioning is chosen to be at a level which does not introduce significant distortion into the web, yet web sagging is avoided, as from thermal expansion and elongation. Rollers (not shown) can be used in the oven 119 to avoid sagging and to maintain uniform heat exposure. It has been found for many applications that it is desirable to cure the treated web under substantially no tension. It is preferable that the web be cured in a relaxed state so that its original construction or the physics of its construction can be retained. This is instrumental for maintaining the correct hand and minimizing shrinkage.

The oven 119 functions to cure the polymer composition selectively placed within the web 74. Oven 119 can be operated with gas or other energy source. Furthermore, the oven could utilize radiant heat, induction heat, convection, microwave energy or other suitable means for affecting a cure which are known in the art. Oven 119 can extend for from about 12 to about 20 yards.

Curing temperatures range from about 320° to about 500° F., applied for times of from about 2 minutes to about 30 seconds (depending upon the temperature and the polymer composition) are desirable. If a curing accelerator is present in the polymer, curing temperatures can be dropped down to temperatures of about 265° F. or even lower (with times remaining in the range indicated).

In place of an oven, or in combination with an oven, a source of radiation can be employed (electron beams, ultraviolet light, or the like) to accomplish curing, if desired.

Less than the full heating capacity of the oven 119 can be used, if desired. For example, only top heating or only bottom heating with respect to the web can sometimes be used as compared to a combination of both top and bottom heating.

The take-up roll 77 is operating at approximately the same speed as the supply roll 76. When the rotational speeds of take-up roll 77 are not synchronized with rotational speeds of the supply roll 76, the tension roll combination of rolls 121, 122 and 123 can be used to take up or reduce web slack, as the case may be.

Web transport speeds can vary widely; for example, from about 2 yards per minute to about 90 yards per minute. Present speeds are from about 35 yards per minute to about 50 yards per minute.

As shown in FIG. 1A, apparatus or environment 100 also includes one or more inspection modules 123, force modeling module 124, and control module 125. Inspection modules can be set up at various locations in environment 100 to measure or obtain characteristics of the web and other materials such as, for example, materials used for encapsulating web 74. For example, inspection module 123 can be configured to measure or estimate various characteristics of web 74 such as thickness, porosity, strength, temperature, and weight. Inspection module 123 can also be configured to measure or estimate various characteristics of the encapsulation material such as, for example, viscosity and temperature. These measured characteristics can then be forwarded to force modeling module 124.

Force modeling module 124 is configured to generate operating parameters for controlling one or more components of apparatus 100 such as, for example, components located inside of a zone 151, as shown in FIG. 1A, based on one or more characteristics of the web, the encapsulating material, or a desired characteristic of an encapsulated web, which can be manually inputted into module 124. The generated operating parameters may be used to do one or more of the following: change the height of blade 101 or 102 with respect to a reference point; change the vertical position of one or more of rollers 105, 106, and 107; change the angle of blade 101 or 102 with respect to a vertical reference; change the speed of rollers 82, 84, 86, 105, 106, and 107; and change the temperature of any one of the rollers. Module 124 is configured to generate recommended operating parameters such that a predetermined (approximate) amount of force normal of to the web is generated at each of the first and second blades. The force selected by module 124 is based on the measured characteristics collected by inspection module 123. In this way, the encapsulated web produced may have the desired characteristics.

To obtain a certain normal force at each blade, module 124 may control one or more of the following variables in environment 100: 1) web tension, 2) angle of entry of fabric into the blade, 3) blade angle in reference to horizontal position, 4) blade height, 5) angle of exit of fabric from blade, 6) web speed, 7) viscosity of polymers, 8) nip pressure, 9) entry nip pressure 10) oven cure temperature, 11) oven cure dwell time, 12) ambient polymer temperature, 13) humidity, and 14) degree web is deformed under lateral tension. Control module 125 is configured to carry out the process changes once the operating parameters and variables are generated by force modeling module 124.

Modules 123, 124, and 125 can be configured to be fully automated, meaning materials characteristics and process conditions are constantly monitored and, operating parameters can be automatically changed in response to the monitoring process.

Figure 1B:
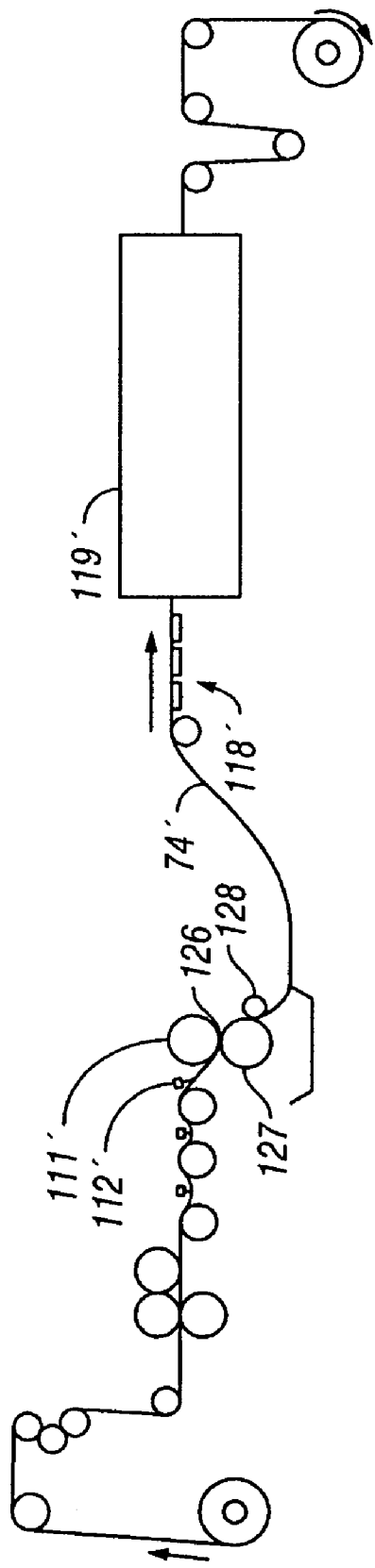
Figure 1C:
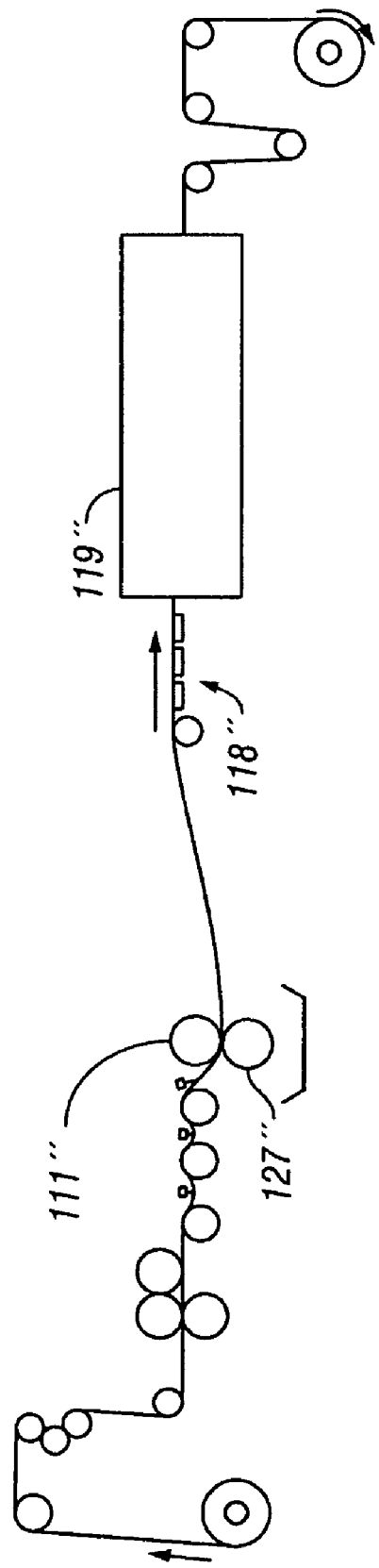

The apparatus and processes described above can be used in various forms or embodiments. Referring to FIGS. 1B and 1C, two alternate configurations are described according to embodiments of the present invention. In FIGS. 1B and 1C similar components are similarly numbered but with the addition of single prime marks thereto in the case of FIG. 1B and double prime marks thereto in the case of FIG. 1C.

In FIG. 1B, a stage of web pressurization is introduced after the flex knife 112' and before the tenter frame 118'. In this embodiment, web 74 is passed through the nip region 126 existing between padder roll 111' and associated transfer roll 127 where the web 74' is subjected to compression between rolls 127 and 111'. In this way, a better distribution of polymer composition on web 74 may be achieved.

After leaving nip region 126, the web 74 is retained under some compression against roll 127 by means of retaining bar or roll 128 for similar purposes. As discussed with reference to FIG. 1A, the web 74 may pass directly into the oven 119' without utilizing the tenter frame 118'. It is desirable that the web curing start promptly after tension is released in the nip region 126, thus it is preferred that the nip region 126 be located in close proximity to the entrance to oven 119'.

If desired, the roll 128 can be replaced by a flex knife (not shown) over whose edge the web 74' passes after departure from roll 127. The flex knife can accomplish substantial further polymer distribution in web 74.

Referring to FIG. 1C, web 74 is passed through the nip region of rolls 111'' and 127''. In this embodiment, use of the mechanical tensioning devices 75b (as shown in FIG. 1A) are eliminated. Additionally, rolls 111'' and 127'' provide the desired reduced tension for web passage through a curing station 119'', which may or may not use the intervening tenter 118''. Typically, and preferably, webs of this invention are characterized by having fiber envelopment layers which range from about 0.01 to about 50 microns.

Although not shown, the apparatus or environment shown in FIGS. 1B and 1C can also include an inspection module, a modeling module, and a control module similar to modules 123, 124, and 125, respectively.

By having a number of shear thinning blades, you create a multiple shear thinning effect, which changes the final construct of the polymer and the (a) thin film encapsulation of the individual fibers and filaments, (b) controlled placement of the internal coating, and (c) controlled placement of the additives in (a) and (b). It is understood that the first shear thinning causes viscoelastic deformation of the polymer composition which, due to its memory, tends to return to a certain level. With each multiple shear thinning, the level to which the polymer starts at that shear point and returns is changed. This is called thixotropic looping or plateauing.

By using the methods and apparatus of this invention, one can achieve a controlled placement of a polymer composition into a porous substrate or web to obtain a desired treated web.

A curable polymer such as used in the practice of this invention is applied under pressure using shear forces onto and into a web or substrate. The shear forces cause the curable silicone polymer to flow into the web. The extent of fiber envelopment and cell or pore wall lining is believed to be regulatable by controlling such factors as discussed previously, as well as the selection and applied amount of fluorochemical, if any, the curable polymer used, and the applied compressive and shear forces employed at a given temperature so that fiber envelopment is achieved while the interstices and/or open cells of the web are not completely filled with such polymer in the region of the internal layer, and the outer opposed surfaces of the web are substantially completely free of polymer coating or residue. After such a procedure, the curable polymer is then cured.

The curable polymer is applied onto the surface of the web. Then, the web, while tensioned, is passed over and against shearing means or through a compression zone, such as between rollers or against a shear blade. Thus, transversely applied shear force and compressive pressure is applied to the web. The combination of tension, shearing forces, and web speed is sufficient to cause the polymer to move into the web and out from the interstices or open cells around the web fibers, cells, or pores being enveloped. The result is that at least some of the interstices and/or open cells are unfilled in regions of the web outside of the region occupied by the internal coating or internal layer, and are preferably substantially free of polymer. Excess polymer is removed by the surface wiping action of the shearing means. The curable polymer enveloping the fibers is thereafter cured.

The desired penetration of, and distribution and placement of polymer in, a web is believed to be achieved by localized pressuring forces exerted on a web surface which are sufficiently high to cause the viscosity of a polymer composition to be locally reduced, thereby permitting such polymer to flow under such pressuring and to be controllably placed within the web and to envelope its fibers or line the cell or pore walls thereof. To aid in this process, the web is preferably at least slightly distorted by tensioning or stretching, while being somewhat transversely compressed at the location of the controlled placement. This distortion is believed to facilitate the entrance of the polymer composition into the web. When the compression and tension are released, the polymer composition is believed to be squeezed or compressed within and through the interstitial spaces, or open cell spaces, of the treated web.

If, for example, too much polymer is present in the finished product, then either or both the tension and shear force can be increased, and vice versa for too little polymer. If flow is not adequate upon the fibers, producing incomplete fiber envelopment, then the viscosity of the polymer composition can be reduced by increasing the pressures and temperatures employed for the controlled placement thereof. Alternatively, if the viscosity is too low, then the pressure and/or temperature can be decreased. If the polymer composition is resistant to being positioned or placed in a desired location in a desired amount in a given web at various viscosities and/or pressures, then the level of fluorochemical pretreatment of the web can be increased, or decreased, as the case may be.

In one embodiment of this invention, polymer is forced into a web between two rollers. One such roller bears a polymer impregnant, typically and preferably distributed uniformly upon and over a circumferentially extending textured, or gravure surface. Such roller rotates (i) in the same direction as a facing roller and (ii) oppositely to the direction of movement of a continuously moving web traveling past the localized pressured area achieved between such roller and such moving web. The unidirectional rotation of the two rollers is believed to produce a distorting and stretching force or effect upon the web. This force is believed to promote penetration of the polymer into the web. This form of pressured application or coating can be termed "reverse roll coating" for convenience. Preferably, the reverse coating rollers have generally horizontal axis while the moving web moves generally horizontally. The web is further concurrently both longitudinally tensioned and distorted by being stretched against metering bars, bar knives, and the like which are urged against the web.

Such an initial pressured step is preferably followed by a series of further pressured web treatment steps believed to accomplish polymer reintroduction, polymer distribution, polymer scraping, and excess polymer removal and recovery. The collective result of such steps gradually produces a web wherein the polymer envelopes to a desired extent the fibers, or lines the cell or pore walls comprising the web and collects within a desired internal region or zone in the web thereby filling or plugging interstitial spaces, or open cells or pores, of the web in such region, but not filling the internal structure of the treated web with polymer beyond a desired extent. Particularly, and for example, in a fabric, a polymer composition may be made to substantially completely envelope the fibers or line the cells or pores thereof and fill the interstitial spaces thereof in such internal region.

Any of the apparatus configurations described above (e.g., FIGS. 1A-C) can be used to produced a fluorochemical and silicone polymer treated web. The resultant encapsulated/coated web is breathable, water resistant and rewashable and is characterized as being a longitudinally tensionable porous flexible fibrous web having opposed substantially parallel surfaces that are comprised of associated fibers with interstices between the fibers, or is a matrix having cells or pores therein. The web is substantially uniformly impregnated with a fluorochemical and thereafter treated with a silicone polymer composition, to form a web having an internal layer within the web wherein the outer surfaces of the web are substantially free of silicone polymer and the web is breathable and water resistant or waterproof. At least a portion of the fibers or cell walls are encapsulated or enveloped. At least one surface of the web is characterized by having a visual appearance which is substantially the same as the visual appearance of one surface of the starting porous web.

When the web has fibers comprised of a synthetic polymer, the polymer is preferably selected from the group consisting of polyamides, polyesters, polyolefins, regenerated cellulose, cellulose acetate, and mixtures thereof.

Preferred webs of this invention are more specifically characterized by having a water drop contact angle in the range of about 90° to about 160°; a rewash capability of at least about 3; a breathability of at least about 35% of untreated substrate web; and a water repellency rating of at least about 80 prior to washing.

Other variables that affect the finished product, but are not directly related to the methods and apparatus, include, without limitation, the polymer blend, the starting viscosity of the polymer composition, accelerators added to the polymer composition, additives added to the polymer composition, the type of web used, ambient temperature, humidity, airborne contaminants, lint on web, pre-treatment of web, sub-web surface temperature, and web moisture content.

1.0 Force Model 1.1 Overview

Force modeling module 124 uses a mechanics model of encapsulation based on classical Newtonian mechanics. Force modeling module 124 mathematically correlates mechanical forces generated on blade with processing variables such as, for example, fabric tension, entry angle between fabric and blade, exit angle between fabric and blade, sharpness of blade as well as polymer viscosity and line speed. In one embodiment, using equations derived for the force model, forces on both blade 101 and blade 102 along a blade face can be calculated using a reasonable estimation on both the coefficient of friction of polymer lubricated fabric and the polymer's viscosity. Excellent agreement between the modeled and measured forces on can be achieved and can be verified with approximately 20 case studies of historical Laboratory Encapsulation Machine (LEM) data and designed experiments.

Using the developed force model, forces generated by blade 101 and blade 102 at a certain selected set of process variables or parameters can be calculated. From the force model, it can be determined that the force on the blade as a function of processing variables is not monotonic, meaning the same force on a blade can be achieved with different sets of process variables or parameters. Based on the calculated force-variable contour curves, settings of variables that generate an equal force on the blade can be identified.

It can also be determined from the force model that for a majority of practical encapsulation conditions, the force on blade 102 is higher than the force on blade 101. This result suggests that, under most conditions, blade 102 is the working blade (dominant blade) for encapsulation. Using this result, performance properties of many historical and newly encapsulated fabrics can be determined as a function of force on the working blade, e.g., blade 102. Good correlation between performance properties of encapsulated fabric and calculated force on blade 102 has been found. The preliminary results indicate that the performance of encapsulated fabric is governed by magnitude of force on blade 102 regardless of how the desired force was achieved.

In one embodiment, the force model yields the following observations: the weight add on (WAO) of silicon on fabric and the Suter value decrease as the force on blade 102 is increased, while readings from the densometer and Frazier increase when the force on blade 102 is increased. These results suggest that, at a constant dwell-time, force on blade may become the only independent variable that controls the encapsulation (dwell time is the effective time of polymer flow driven by external hydrodynamic pressure, which is another independent variable). Other variables, such as tension, entry angle, exit angle, blade sharpness, etc., which influence the encapsulation through changing magnitude of forces on blade 102, are not independent.

Performance properties, such as Suter, densometer, Frazier, MVTR, etc. are interpreted based on weight add on (WAO) and polymer placement. The level of the Model's utility is also investigated.

1.2 Shear Blades' Mechanics Model

Figure 2:
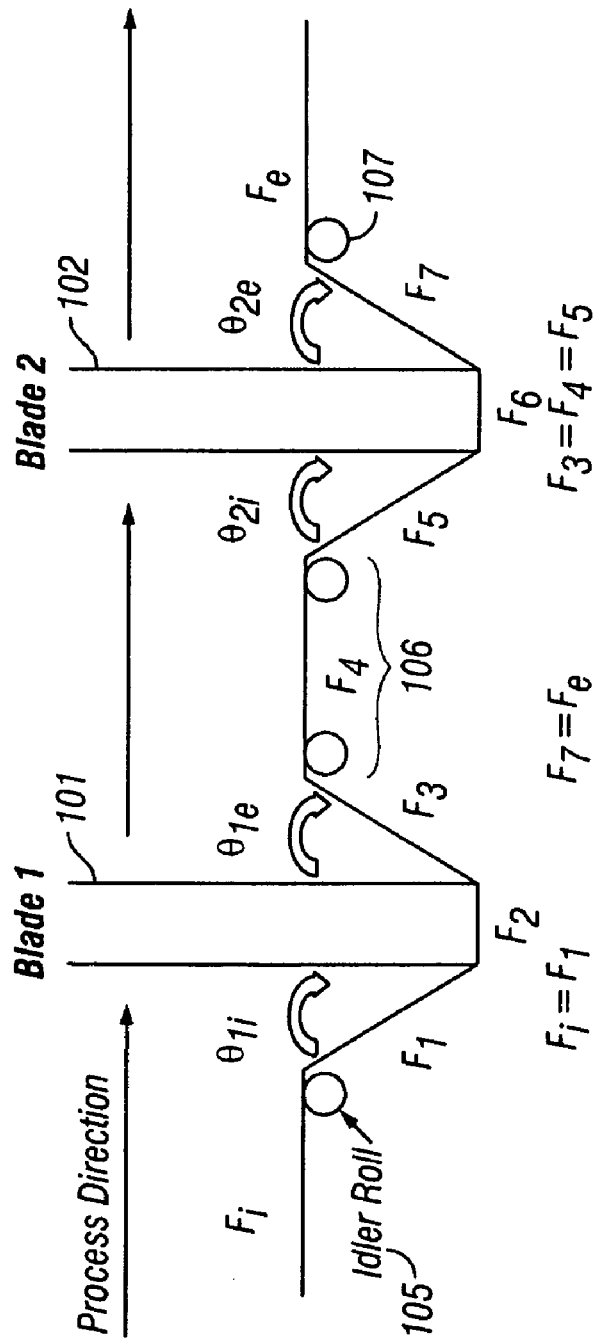
FIGS. 2-3 are diagrams illustrating force models according to embodiments of the present invention. Note: these two figures need to be changed to the two attached, include legend

The encapsulation process can be represented in this fashion pictorially (FIG. 2). In FIG. 2 there are idler rolls (rolls are not driven or braked but that turn freely with the fabric) before and after each blade. By making the reasonable assumption that what ever small amount of rolling friction these contribute to the process is negligible the process force analysis simplifies.

Figure 3:
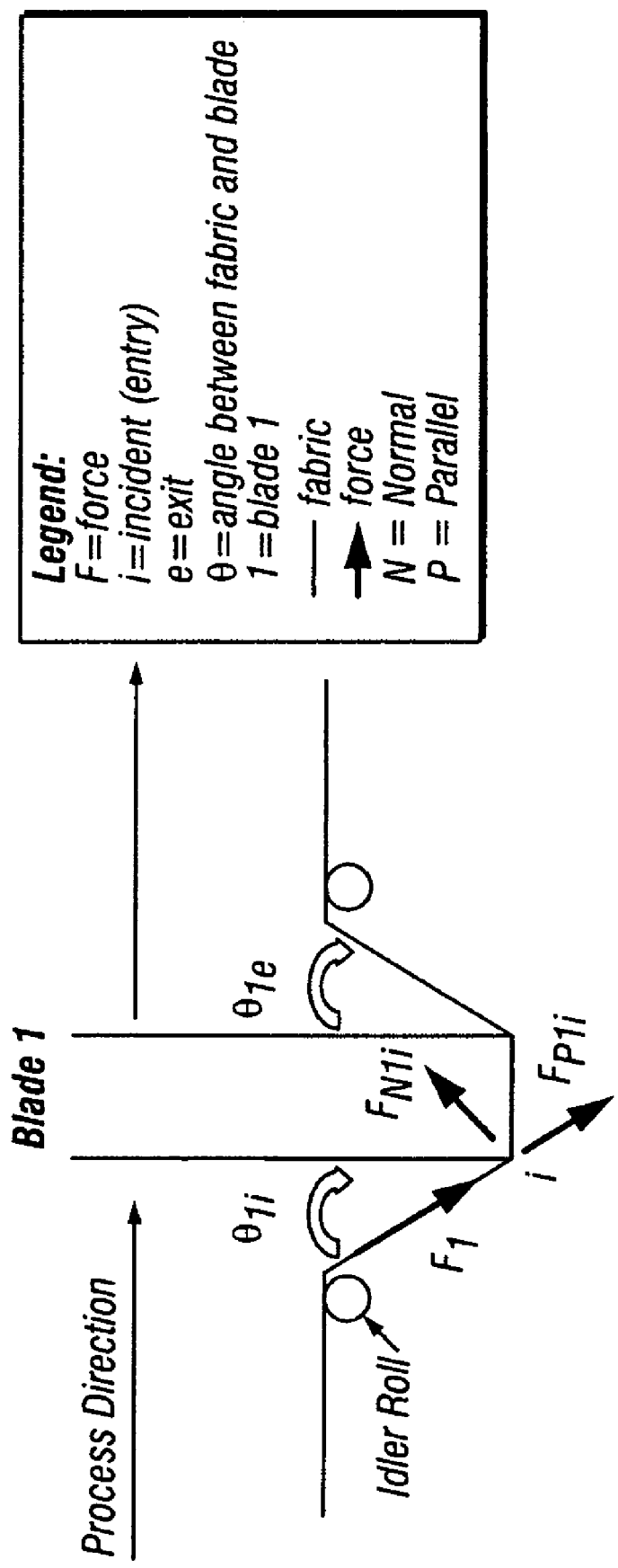

Using this assumption forces on either side of an idler roll, where there is no other machine element between, are equal. That is $F_i=F_1$; $F_7=F_e$; & $F_3=F_4=F_5$. The forces in this model are then attributed to the driven nip roll at the end of the process, the brake roll at the beginning of the process, and the interaction of the fabric/polymer at each blade contact. Utilizing these preliminary results/assumptions the force on a blade can be examined in more detail. The force vector decomposition for input (entry) into blade 1 is shown in FIG. 3. The analogous force vector decomposition diagram could be drawn for the exit from blade 1 as well as the entry and exit for blade 2. $F_{N1i}$ and $F_{P1i}$ Represent the forces Normal and Parallel to the web. The friction between the blade and web/polymer can be represented by p (the coefficient of friction). By making the assumption that the force is concentrated at the entry and exit tips of the blade and algebraically manipulating the equations that describe this configuration we arrive at Equation I.

$$F_{N1i}=F_1 \cos\theta_{1i}/(1-\cos\theta_{1i}\mu) \quad (I)$$

Through the examination of the physical meaning of equation I it can be seen that the Normal force on the entry of the blade varies directly with the web tension and inversely with the entry angle of the fabric. From this observation it can be seen that, at least qualitatively, this expression is correct. Performing an analogous analysis on the exit from blade 101 and the entry and exit at blade 102 a similar series of equations are obtained. By mathematically manipulating these equations an expression which describes the ratio of the normal force of blade 102 to blade 101 is developed (Equation II).

$$F_{N2i}/F_{N1i}=\cos\theta_{2i}/\cos\theta_{1i}(1-\cos\theta_{1i}\mu)(1-\cos\theta_{2i}\mu) \quad (II)$$

Equation II can be used to calculate the force ratio of blade 102 to blade 101 over a range of entry angles (while holding exit angles and polymer) viscosity constant). Since pressure rather than force is the drive for the encapsulation to perform this comparison we assume the same blade sharpness on blade 101 and blade 102. This ratio will allow for the determination of the dominant blade during the processing. Going back to and manipulating the equations which were derived previously an equation which describes the ratio between pulling force and the initial tension can be obtained (Equation III).

$$F_f/F_e=1/(1-\cos\theta_{1i}\mu)(1-\cos\theta_{1e}\mu)(1-\cos\theta_{2i}\mu)(1-\cos\theta_{2e}\mu) \quad (III)$$

Figure 5:
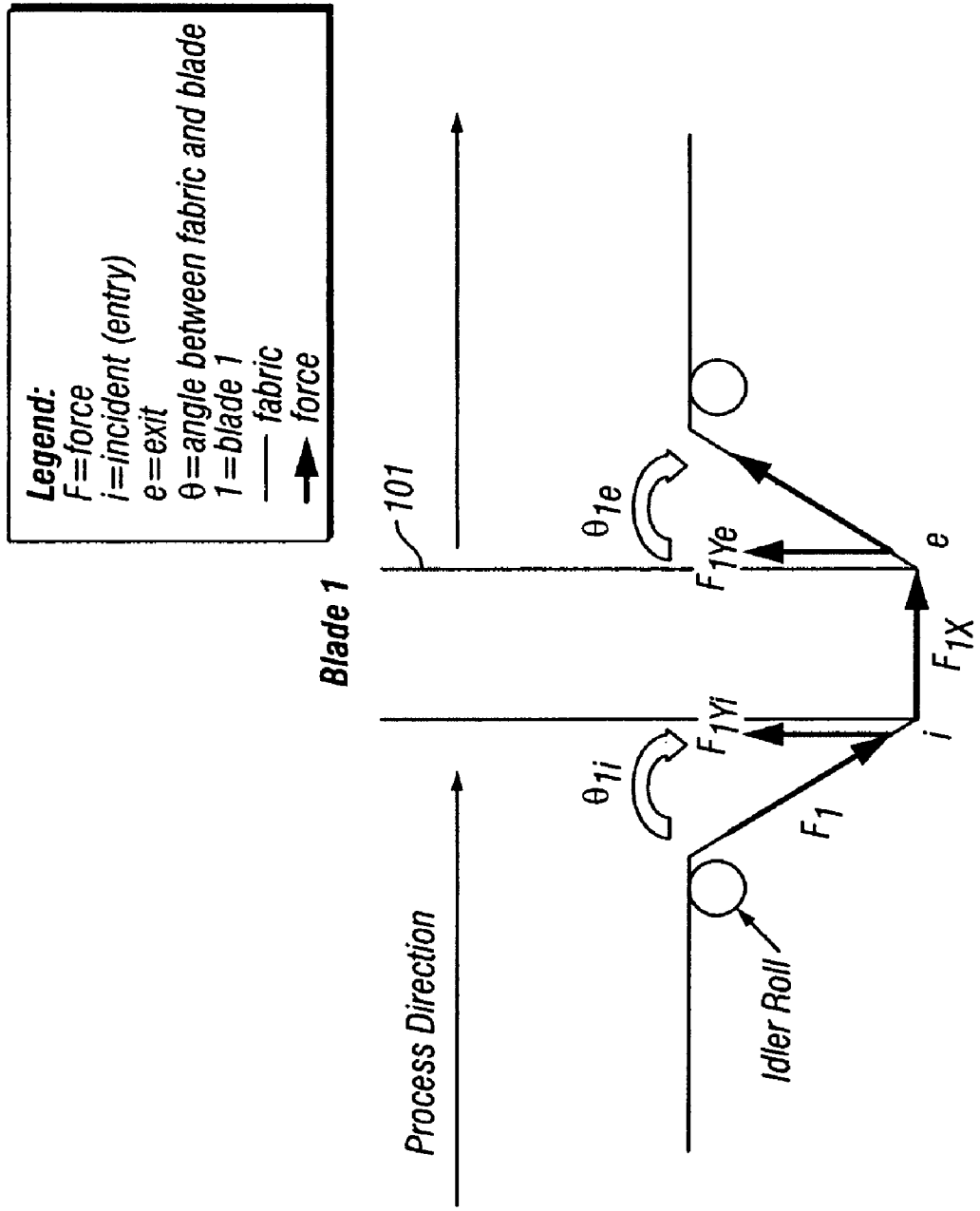
FIG. 5 is a diagram illustrating a force model according to one embodiment of the present invention. Note: this figure needs to be changed to the one attached, include legend

These equations and this model can be used to calculate force ratios over all conditions that the process is run. In the majority of conditions under which the process is run blade 102 is the dominant blade. In order to take the next step in validating the model the calculated forces must be compared to the measured forces. In order to validate this model a correlation between calculated values and measured values must be performed. There are experimental difficulties in measuring the normal force on the blade tips on production equipment. However, forces on the blades are continuously measured on the laboratory encapsulation equipment. The forces on the laboratory encapsulation line are measured on cantilevered blades via a three directional load cell. This measurement gives rise to forces being measured on a three dimensional basis, that is in the X, Y, and Z directions (FIG. 5). To utilize these measurements for correlation the model must be reworked to define the forces in the X, Y, and Z directions (FIG. 5). The force in the Z direction (width of the blade) is considered to be so small it is neglected. An analysis similar to the analysis done on the Normal and Parallel forces is performed for the X and Y directions.

The Normal and Parallel analysis neglects the force from shearing of the polymer. Consequently when this approximation is applied to the X, Y, Z model the $F_{1yi}$ calculated compared to the measured force exhibits good correlation however the $F_{1ye}$, $F_{2yi}$ & $F_{2ye}$ forces are all underestimated. Further the error between calculated and observed gets larger the further through the process the variable is. The expression arrived at for the representation of the shear force starts with the equation for a coating process and is modified to take into account that encapsulation is done with a Non-Newtonian fluid of a finite thickness shown as equation IV.

$$\tau_{XY1}=3\eta F_1 \cos\theta_{1i}W(\ln(u)R)^{1/2} \quad (IV)$$

Where $\tau_{XY1}$ is the shearing force on blade 101, $\eta$ is the polymer viscosity, W is the fabric width, u is the line speed and R is the radius at the entry tip of the blade. With the equations built so far the tension of the fabric exiting blade 101 (force F3) can be calculated using Equation V.

$$F_3=F_1\{1+(\cos\theta_{1i}+\cos\theta_{1e})\mu+3\eta\cos\theta_{1i}W(\ln(u)R)^{1/2}\} \quad (V)$$

Calculation of the Y directional forces on blades 101 and 102, via Equation V, yields values which are in excellent agreement with experimentally measured values.

Making the assumption that both blades have the same degree of sharpness than the force ratio of blade 102 to blade 101 can be calculated. There are three possible outcomes for the ratio. If the ratio is less than 1 blade 101 is the dominant blade, if the ratio is greater than 1 than blade 102 is the dominant blade and if the ratio is equal to one than the force on the blades is equal. By comparing this ratio at all different entry angles it can be seen that blade 102 is the dominant blade in the majority of conditions under which the process is ran. For illustrative purposes the rest of the discussion will focus on $F_{2\overline{y}}$ with the understanding that the other forces can also be determined and used.

This then allows us to examine the use of $F_{2\overline{y}}$ as the variable for process prediction. The $F_{2\overline{y}}$ is calculated for many unique sets of machine variable set up conditions including changes to the fabric structure, fabric tension, polymer viscosity ($\eta$—three different viscosity polymers), entry angle between the fabric and the blade, exit angle between the fabric and the blade, sharpness of the blade, and line speed. These values are then matched to experimentally measured $F_{2\overline{y}}$ values for the same process conditions. In all cases the calculated and measured values agreed within 10%. It should be noted that since the calculated $F_{2\overline{y}}$ is in good agreement with the measured $F_{2\overline{y}}$ that the calculated value can now be utilized and the experiments can be performed on the production equipment. Additionally, a series of experiments were run where the input variables were changed in such a way that the same specific resultant $F_{2\overline{y}}$ arrived at for different combinations of starting variables. It was found that the calculated and measured $F_{2\overline{y}}$ were still in agreement. Showing that the $F_{2\overline{y}}$ can be isolated from the conditions used for set up or that the force at the blade tip is monotonic.

At this point the model had allowed for only the prediction of the $F_{2\overline{y}}$. For real utility there should be a correlation between the calculated force ($F_{2\overline{y}}$) and performance properties. That is, there should be not only correlation but causality established for the calculated variables to be predictive. Once this is done there would exist the capability for some predictably of performance properties based on calculated force at the blade. By looking at product made on the production line and back calculating the force via the model a series of relationships between measured properties and calculated $F_{2\overline{y}}$ can be obtained. It is important to note again that regardless of the particular (and specific) machine settings only the resultant force at $F_{2\overline{y}}$ is used. A good solid relationship between the $F_{2\overline{y}}$ with polymer weight add on, hydrostatic head of the final product and air permeability has been demonstrated. Again, a series of experiments were run where the input variables were changed in such a way that the same specific resultant $F_{2\overline{y}}$ arrived at for different combinations of starting variables. It was found that the calculated $F_{2\overline{y}}$ and the resultant end properties of polymer weight add on, hydrostatic head, and air permeability were still in agreement. Showing not only that the $F_{2\overline{y}}$ can be isolated from the conditions used for set up or that the force at the blade tip is monotonic but that it is predictive of the end properties of interest.

Interestingly, in the region where blade 102 is dominant, this relationship exists without factoring in the $F_{1\overline{y}}$ (entry force on blade 101), $F_{1\overline{y}e}$ (exit force on blade 101) or $F_{2\overline{y}e}$ (exit force on blade 102). The implication of this fact is that the process that has up to 40 variables which appeared to require individual control and understanding can now be represented by a single variable that arises from the combination of these 40 variables. Further this single variable can be calculated or measured.

Multiple groups of variables, including but not limited to fabric structure, fabric tension, polymer viscosity ($\eta$), entry angle between the fabric and the blade, exit angle between the fabric and the blade, sharpness of the blade, and line speed can were examined. $F_{2\overline{y}}$ was calculated for the various conditions and this was then compared to various performance properties, including but not limited to polymer weight add on, hydrostatic head of the final product and air permeability. Because of the nature of the encapsulation process a unique curve of performance property versus $F_{2\overline{y}}$ is generated for a given fabric and a given polymer. That is, as the polymer viscosity ($\eta$) and the fabric density (represented by Air permeability) changes the polymer weight add on, at the same $F_{2\overline{y}}$, changes. In particular, as the polymer viscosity ($\eta$) and the air permeability of the fabric increases (fabric becomes less dense) the polymer weight add on increases.

In one embodiment, in the region in which blade 102 is dominant, a high degree of correlation between polymer weight add on and $F_{2\overline{y}}$ exists ($R^2 \geq 0.90$). This predictive tool can now provide information that allows for much smaller Design of Experiments varying blade forces (as opposed to many variables) to be run. Descriptions of how the force model is used in the product development process follows.

Figure 6:
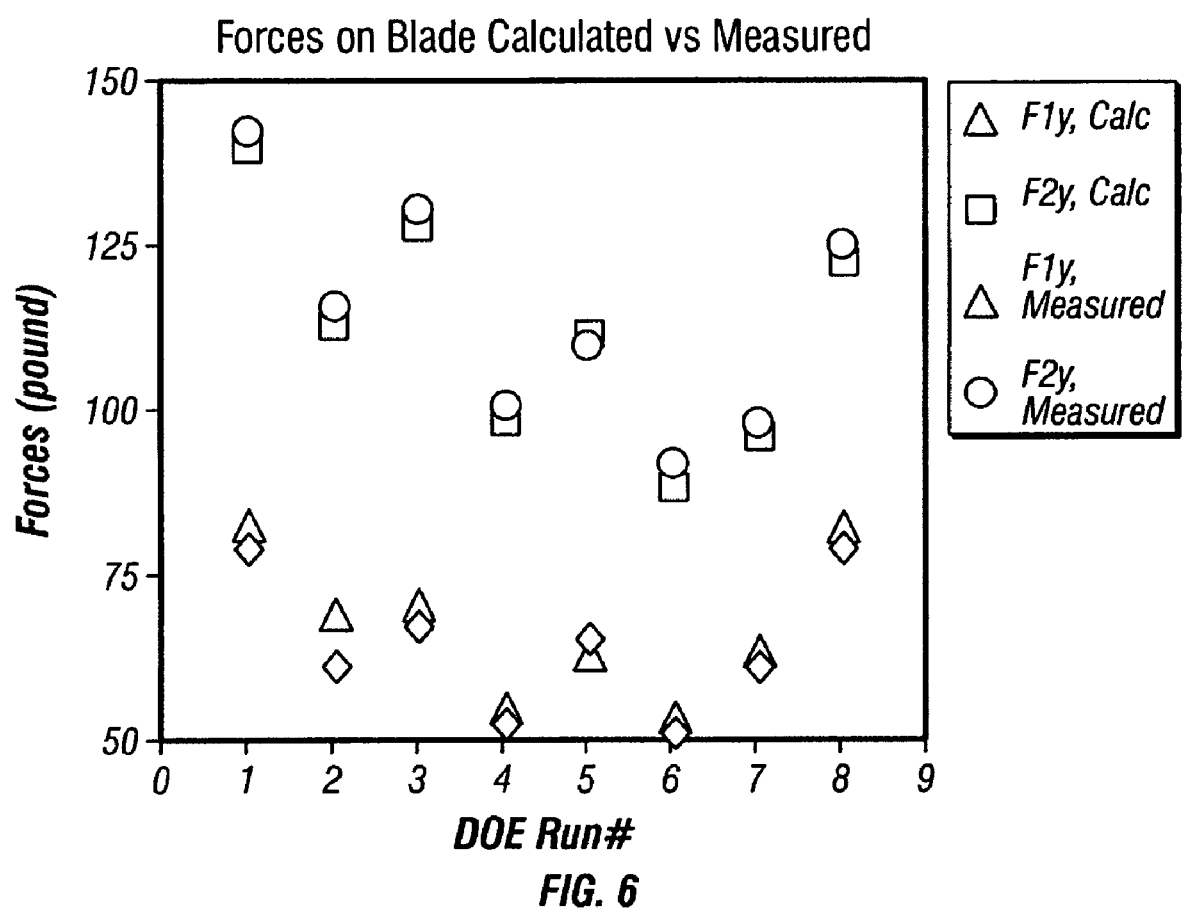
FIG. 6 is a diagram illustrating results generated by one or more of the force models listed above according to an embodiment of the present invention.

FIG. 6 illustrates a graph showing the calculated force using the force model according to an embodiment of the present invention vs. the measured forces. Referring to FIG. 6, it is found that the calculated force on the blade in the Y direction agrees well with the measured force (with differences of less than 10%). However, the calculated force on the blade in the X direction is normally about 5% to 25% smaller than that of measured force. This force discrepancy between the calculated and measured is reasonable and explainable.

In the force model, only the shear force that starts from the entry tip of the blade is considered. Besides this shear force, a normal stress (expanding force normal to shear field) is generated due to polymer bead under high shear. This normal stress (force) has two functions: A). Drive the polymer climbing along blade height, and B). Push the blade away in the X direction. Since the load cell on LEM measures all the forces in the X direction regardless of where they are applied onto the blade, this normal force is recorded in the measured force but not counted in the force model. It is believed that this normal stress applied on blade body results in the discrepancy between the calculated and measured forces in the X direction.

It should be noted that the entire force on the blade in the X direction is not significant in driving penetration of the polymer into the fabric because a majority of the X direction forces is contributed by the friction and shear which both are parallel to the web surface. Therefore, the Y direction force will be used to evaluate the accuracy of this model.

In the above force model, the forces on the blades are treated as a point force, i.e. it is assumed that all the forces are applied at the point A and B (incident/entry and exit tips of the blade). Although the real forces are distributed microscopically from starting the web/blade contact point to the web/blade separation point. Practically, the entry tip of blade is believed to be the main working zone for encapsulation. This assumption is generally true since in most situations the force on the blade at exit tip of the blade is much lower than at the entry tip due to large exit angles were used, especially for the two blades application. This is also corroborated by the fact that the blade sharpness at entry tip wears quicker than at exit tip.

Figure 4:
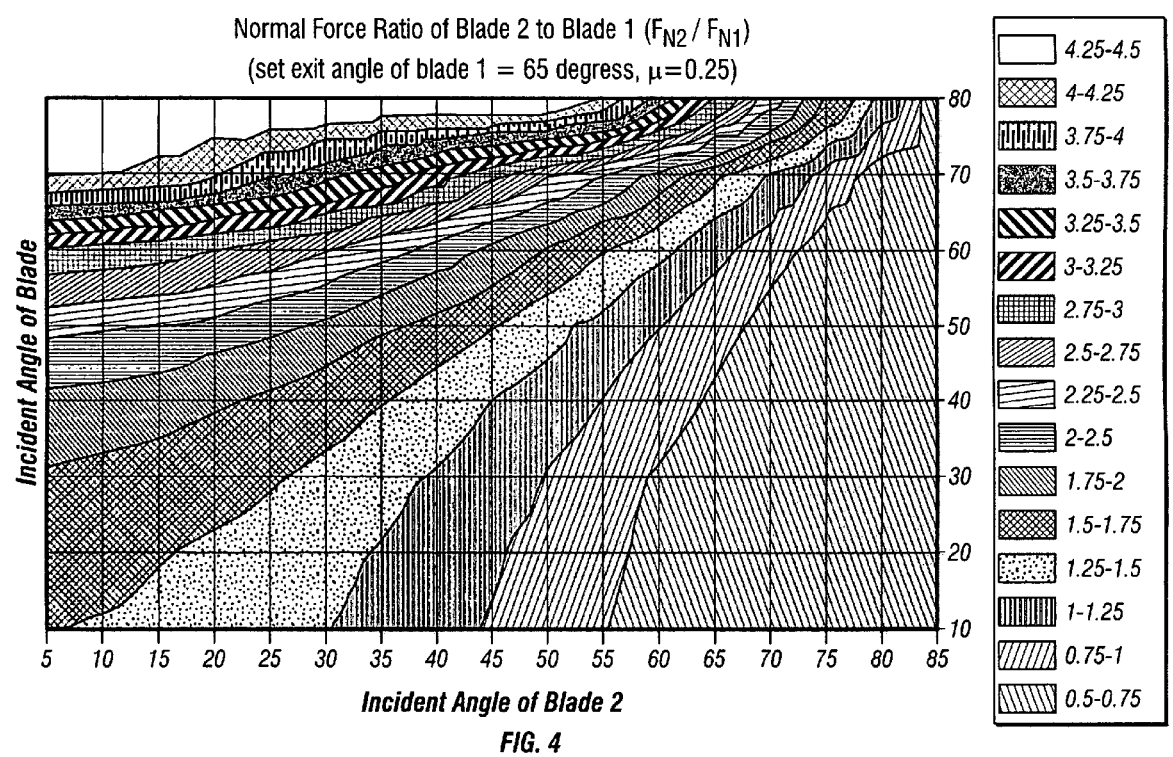
FIG. 4 is a diagram illustrating results generated by force models of FIGS. 2-3.

As shown in FIGS. 3 and 4, the forces on a blade are mathematically correlated with processing variables such as fabric web tension, blade angle, polymer viscosity, line speed and blade sharpness. How these forces are related to the encapsulation process and product performance properties will be explained herein using a force-pressure model. The encapsulation method employed by one embodiment of the present invention is a penetration process of non-Newtonian fluid (liquid silicone elastomer) into a porous substrate (fabric web) driven by external hydrodynamic pressure that is provided by a shear blade. Conceptually, the driving power for encapsulation is pressure rather than force. However, pressure equals to force per unite area, i.e. P=F/S, where S is contact area. The "effective" contact area of a blade tip (it varies with entry and exit angles as well as blade sharpness) is unknown; therefore, the force on the blade is used in this model as a relative measurement of pressure. The concept of pressure will help explain performance differences of the same product encapsulated at the same force but different blade sharpness.

Figure 7:
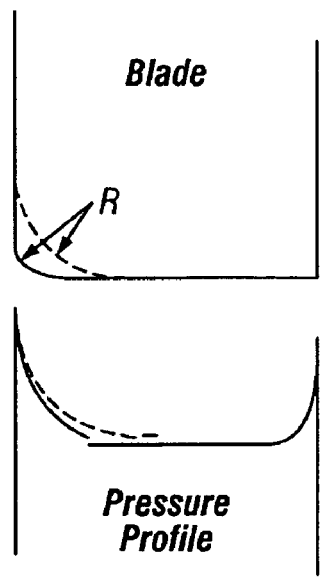
FIG. 7 is a diagram illustrating a pressure model of a shear blade/knife according to one embodiment of the present invention.

FIG. 7 illustrates a qualitative pressure profile under the blade is according to a model of an embodiment of the present invention. Referring to FIG. 7, it can be seen that high pressures exist only at blade tips. The shape of the pressure profile, i.e. the distribution, is a function of blade sharpness. The sharper the blade, the narrower the pressure distribution.

Figure 8:
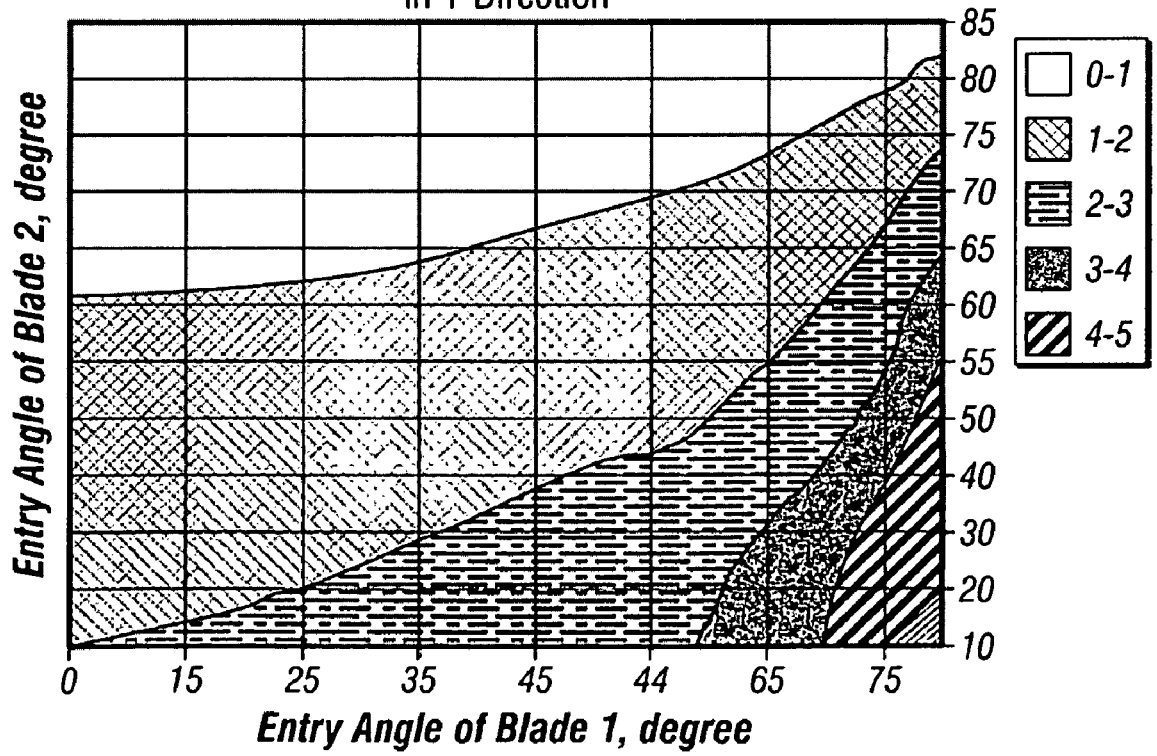
FIGS. 8-50 are diagrams illustrating results generated by one or more of the force models listed above according to embodiments of the present invention.
Figure 9:
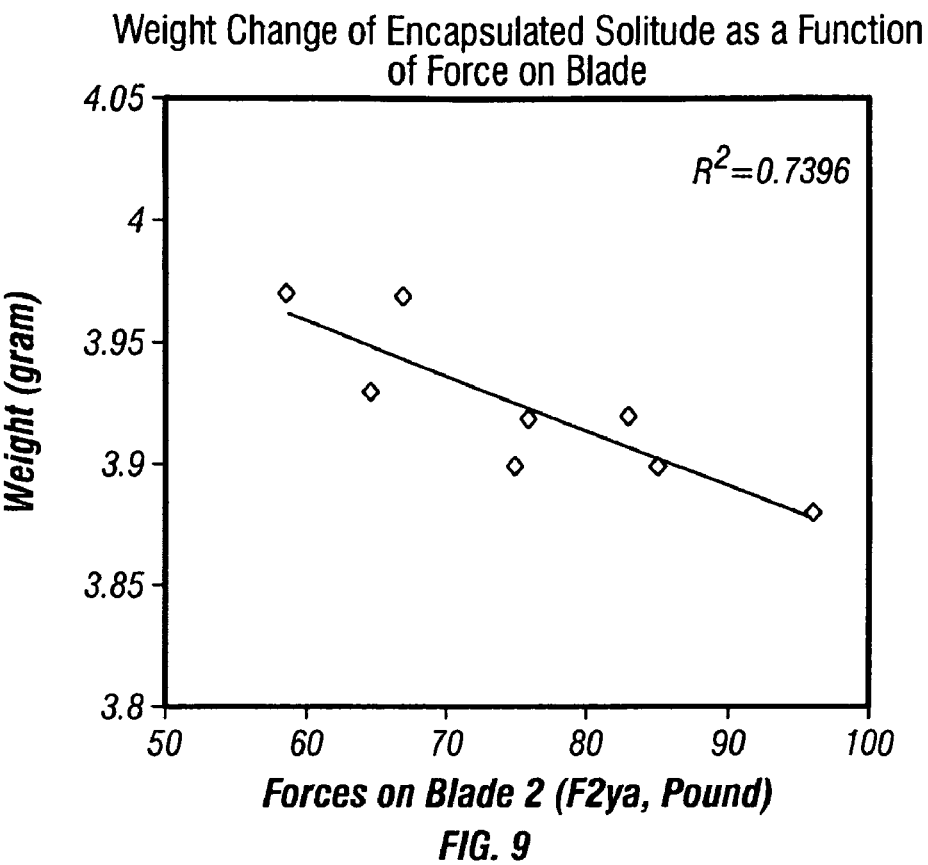
Figure 10:
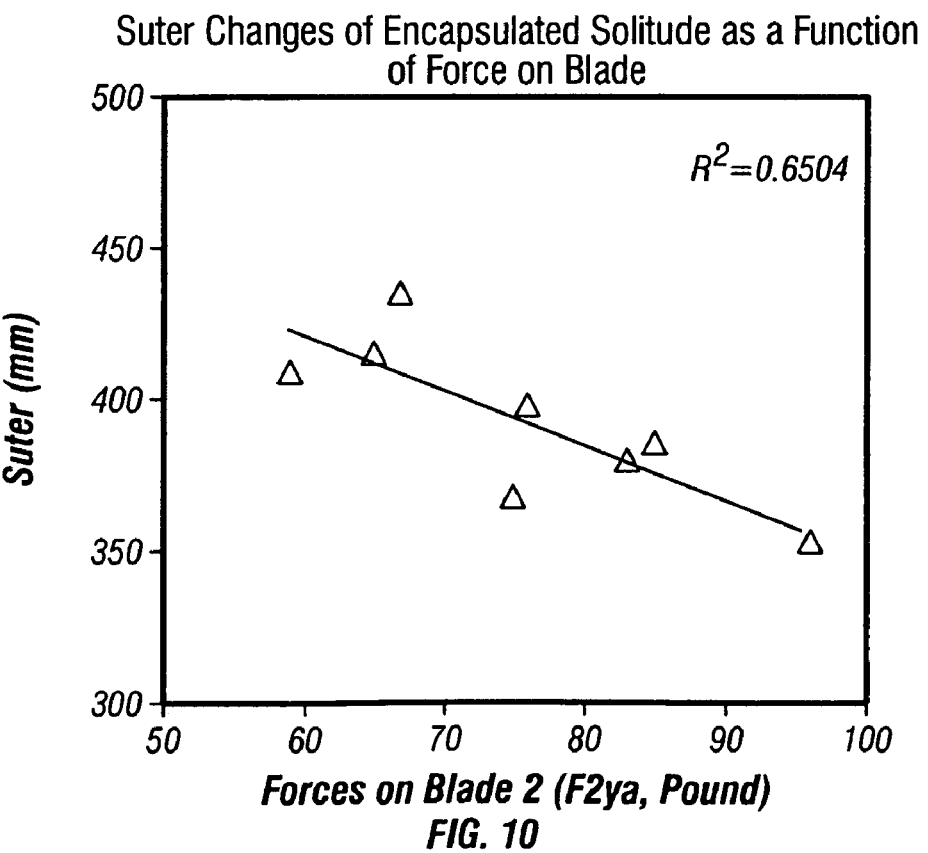
Figure 11:
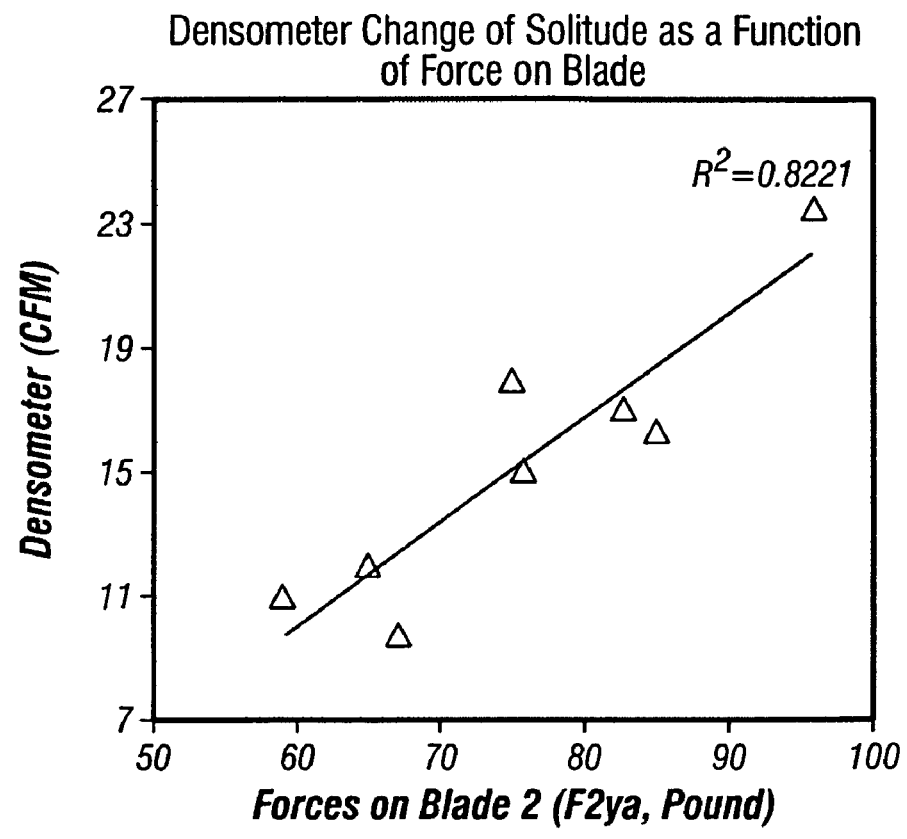
Figure 12:
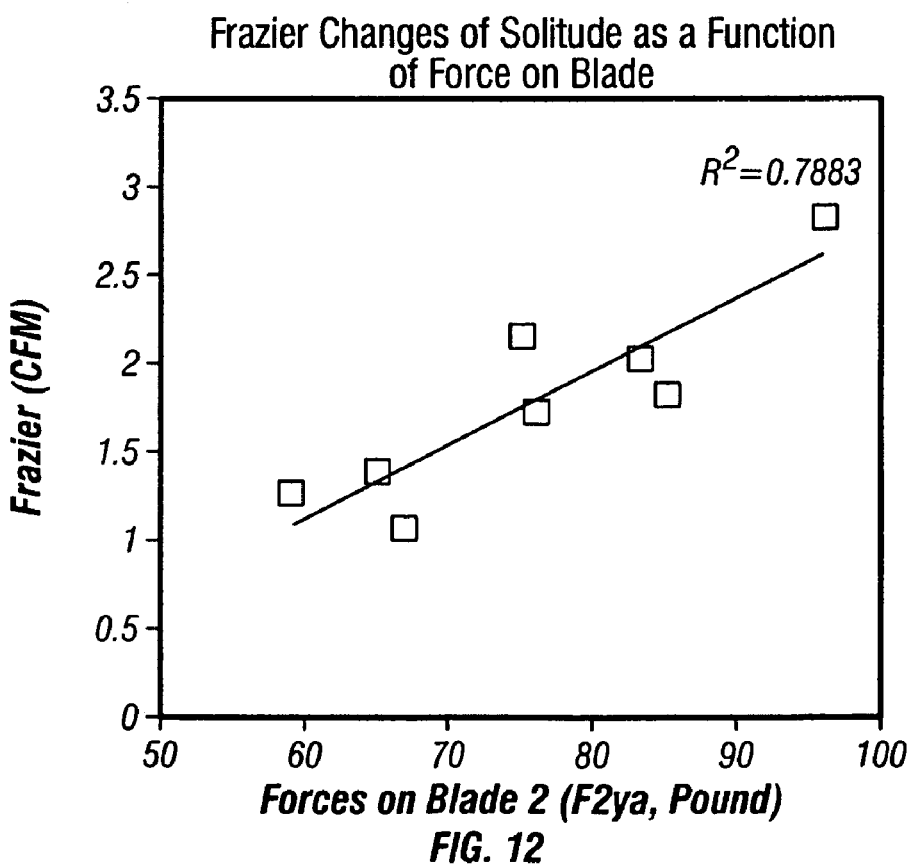

If the same sharpness is assumed for blades 101 and 102, then a force ratio will reflect its pressure ratio. With the pressure model shown in FIG. 7, a force ratio of blade 102 to blade 101 as a function of both blade 101 and blade 102 entry angles is recalculated and illustrated in FIG. 8. The zones with a blade 102 to blade 101 ratio value of larger than 1 cover most the angle setting conditions. This result indicates that blade 102 is the dominant blade at most encapsulation conditions. This pressure model result also agrees with the force model result shown in FIG. 4.

According to one embodiment of the present invention, using the force models developed above, two different types of fabric can be produced. One fabric is referred to as "Glacier Universal Print" and the other as "Praetorian". Process parameters used to produce Glacier and Praetorian is shown in Table 1.

The Glacier fabric has the following properties after being produced with the parameters listed in Table 1: Air Permeability is 0.15 CFM; Suter is 310 mm; and the MVTR value is at 650 g/m2/24 hrs. Similarly, Praetorian has the following properties after being produced with process parameters listed in Table 1: Air Permeability is 0.1 CFM; Suter is 600 mm; and the MVTR value is at 700 g/m2/24 hrs. It should be noted that other process parameters may be used to produce the same results. Table 1 should is not an exclusive listing of parameters that can yield the results shown.

TABLE 1

| Process Parameter | Glacier Universal Print | Praetorian |
| --- | --- | --- |
| Blade 101 Sharpness | 0.0012" | 0.0012" |
| Blade 102 Sharpness | 0.0019" | 0.0019" |
| Blade 101 Entrance | 45 Degrees | 45 Degrees |
| Blade 101 Exit Angle | 70 Degrees | 70 Degrees |
| Blade 102 Entrance | 50 Degrees | 50 Degrees |
| Blade 102 Exit Angle | 65 Degrees | 65 Degrees |
| Tension | 350 Pounds | 300 Pounds |
| Line Speed | 30 Yards/Minute | 30 Yards/Minute |
| Polymer | Mid Viscosity | Mid Viscosity |
| Blade 101 Pressure | 618 pounds | 530 pounds |
| Blace 102 Pressure | 654 pounds | 561 pounds |
| Air Permeability | .15 CFM | .1 CFM |
| Suter | 310 mm | 600 mm |
| MVTR | 650 g/m2/24 hrs | 700 g/m2/24 hrs |

2.0 Validation and Application of the Mechanics Model

The precision of the equations that describe the forces on blade 101 and 2 (equations (4) and (5)) was carefully evaluated using recorded LEM historical data. With reasonable estimation on the coefficient of friction ($\mu=0.2$ is used) and polymer viscosity (5.0, 4.0 and 3.5 pascals are used for three different types of materials such as, for example, GE 6108, SLE 606 and DC 4-1440), forces on the blade entry tips for both blade 101 and 2 in about 20 DOE (design of experiment) cases performed on the LEM. Unique forces on the blades are calculated regardless of the LEM setting conditions. The calculated forces matched the measured forces with differences of less than 10% for all the cases studied.

One goal of developing the mechanics force model is to establish a correlation between hydrodynamic pressure (or force) on the blade and performance properties of the encapsulated product. The usefulness of this model relies solely on whether a relationship between the force on a blade and performance properties of the product can be established. Application of this mechanics model to correlate and predict performance property of product of both historical and newly designed cases is discussed in the following sections.

2.1 Historical LEM Data Analysis

A large amount of LEM DOE data is available. This is an optimal starting point to evaluate the mechanics model. Unlike production runs, the DOE runs utilize conditions in which different forces on the blade may be generated. In addition, all the forces calculated from the force model can be confirmed by comparing with the measured forces on LEM.

Overview

FIGS. 9-12 illustrate performance properties of an encapsulated fabric (Solitude) as a function of force on blade 102 at entry tip. The forces are calculated using the force model described above using variables such as fabric tension, sharpness of blade 101, entry angle of blades 101 and 102, selected in the DOE runs. As shown in FIGS. 9-12, it can be seen that all the performance properties, including weight after encapsulation, Suter, densometer, and Frazier, have a linear or inversely linear relationship with the force on the blade. For weight and suter, the relationship is inversely linear, i.e. both weight and Suter values decrease with increasing force on the blade, while both densometer and Frazier values increase with increasing force on the blade.

Effect of Polymer Viscosity and Line Speed

Figure 13:
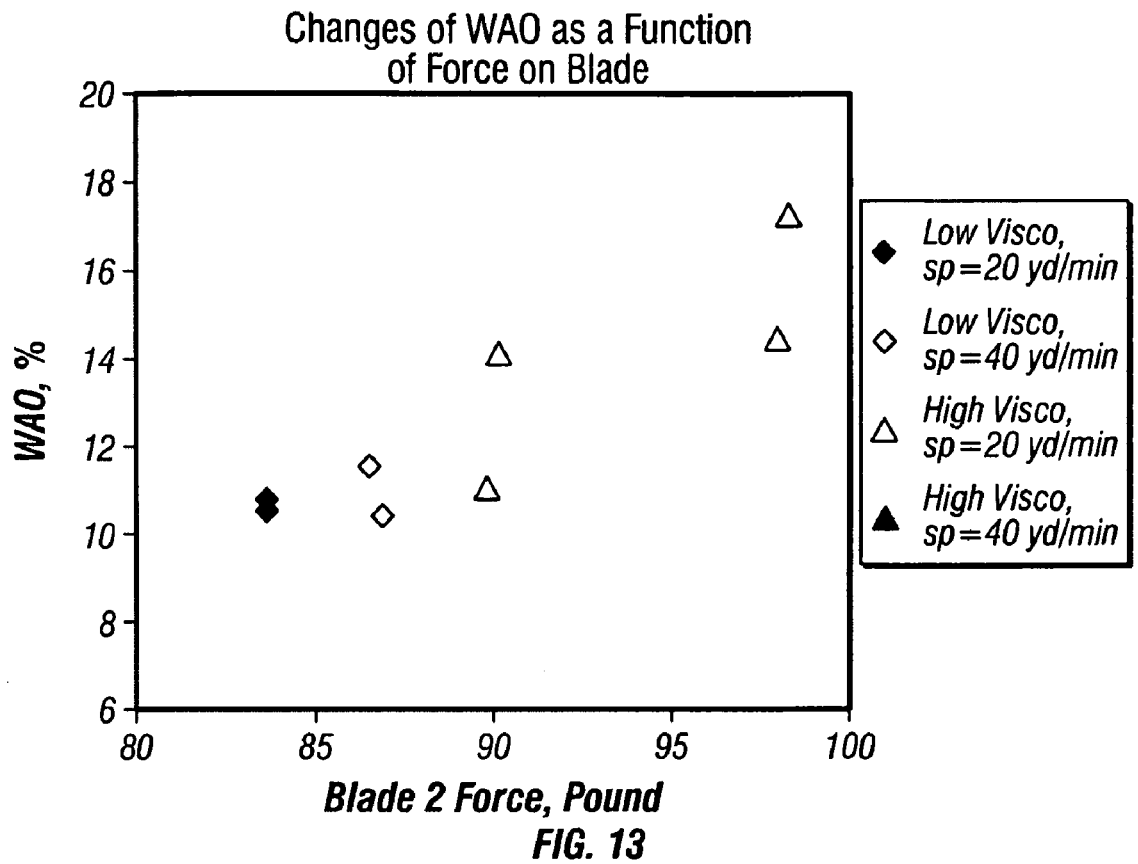
Figure 14:
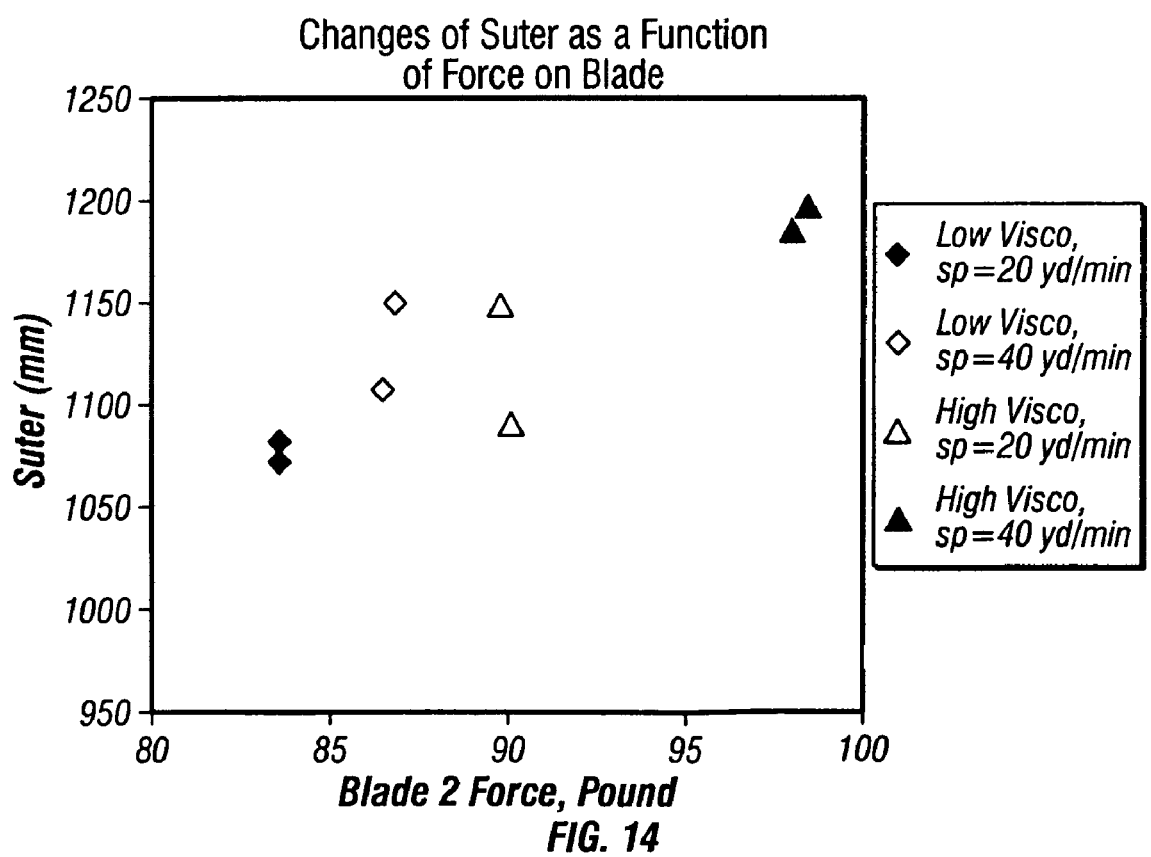
Figure 15:
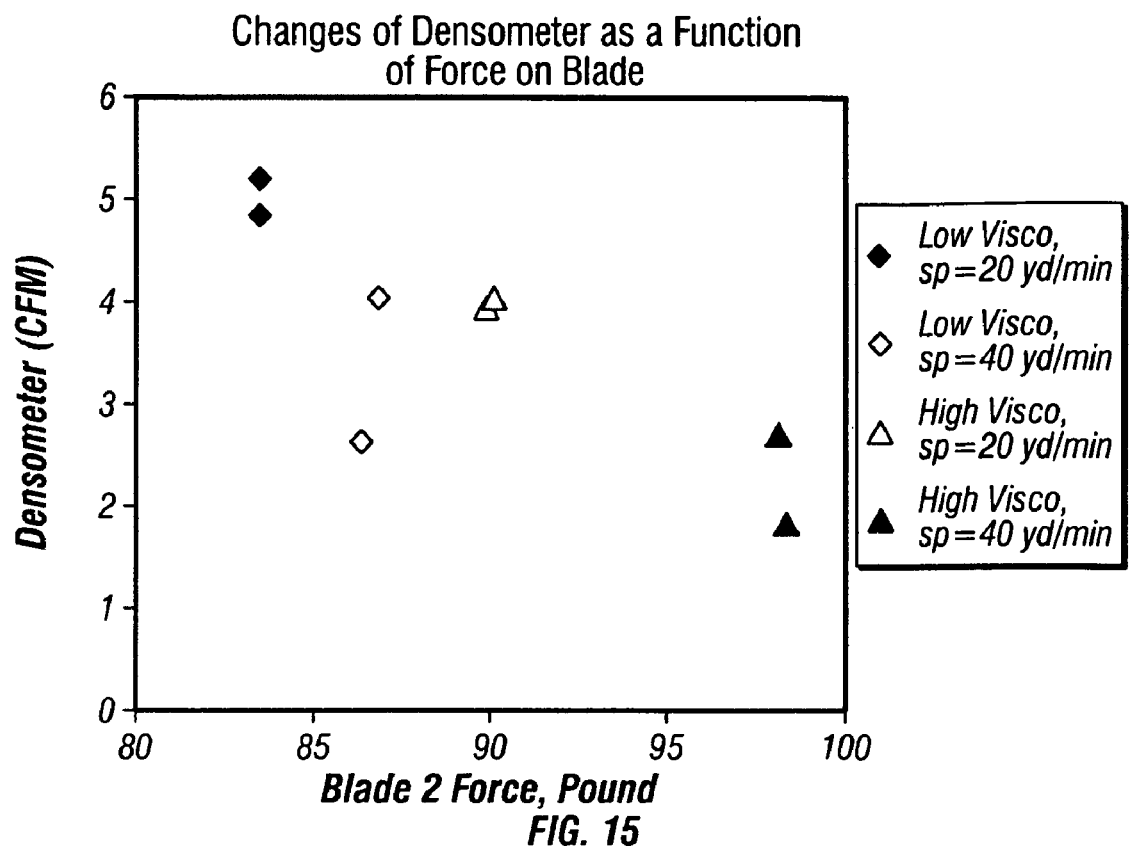

FIGS. 13-15 illustrate WAO, Suter, and Densometer as a function of calculated force on the blade based on results of a DOE study performed according one embodiment of the present invention. The DOE study was a $\frac{1}{2}\, 2^4$ DOE designed to investigate effects of blade 102 to driven nip distance, line speed, viscosity, and nip pressure on encapsulation. Since the factors of blade 102 to driven nip distance and nip pressure showed no significant effect, this DOE is practically equivalent to a full $2^2$ with a duplication of each run. Although all the 8 experiments were run under the same LEM settings, i.e. the same fabric tension, blade sharpness and entry and exit angles of blade, the resultant forces are different due to the differences in either polymer viscosity or line speed. For the same line speed, the force on the blade increases with increasing polymer viscosity. While for the same polymer, the force on the blade increases with increasing line speed. All these calculated forces on a blade at given conditions agree well the measured forces.

In this DOE, it is not very meaningful to correlate the performance properties, such as WAO, Suter, and densometer, etc., with the absolute magnitude of the force on the blade since the polymer viscosity is different in the 4 different run conditions (note that line speed can affect final viscosity for a polymer with the same initial viscosity). However, the results of this DOE clearly indicate that, at the same set of machine variables, a higher WAO is achieved for the polymer with higher initial viscosity. Higher WAO is also achieved at higher line speed for the polymer with the same initial viscosity. Suter properties showed the same trend as WAO, and densometer properties are opposite to the trend of WAO.

These results are important for us to select polymers in design of new product and make appropriate adjustment in setting of machine variables when we need to change polymers for existing product line.

Effect of Fabric Structure and Polymer Viscosity

Figure 16:
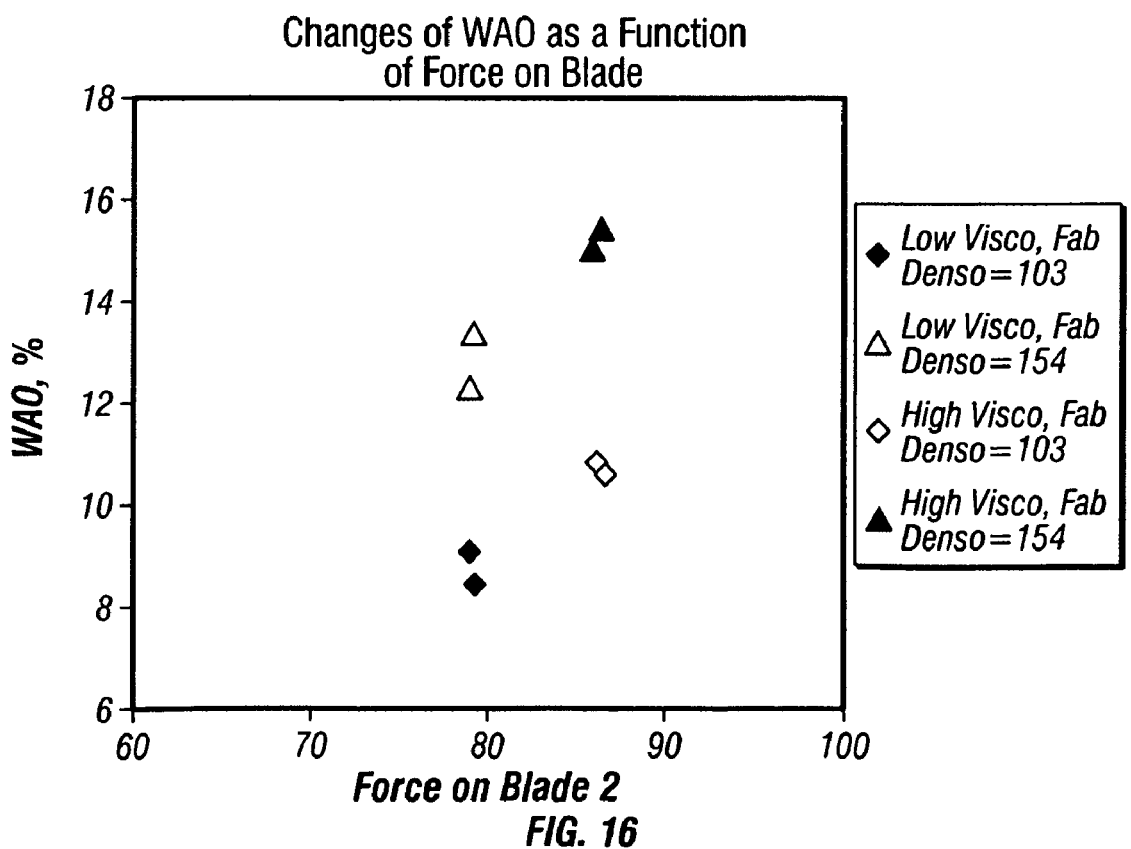
Figure 17:
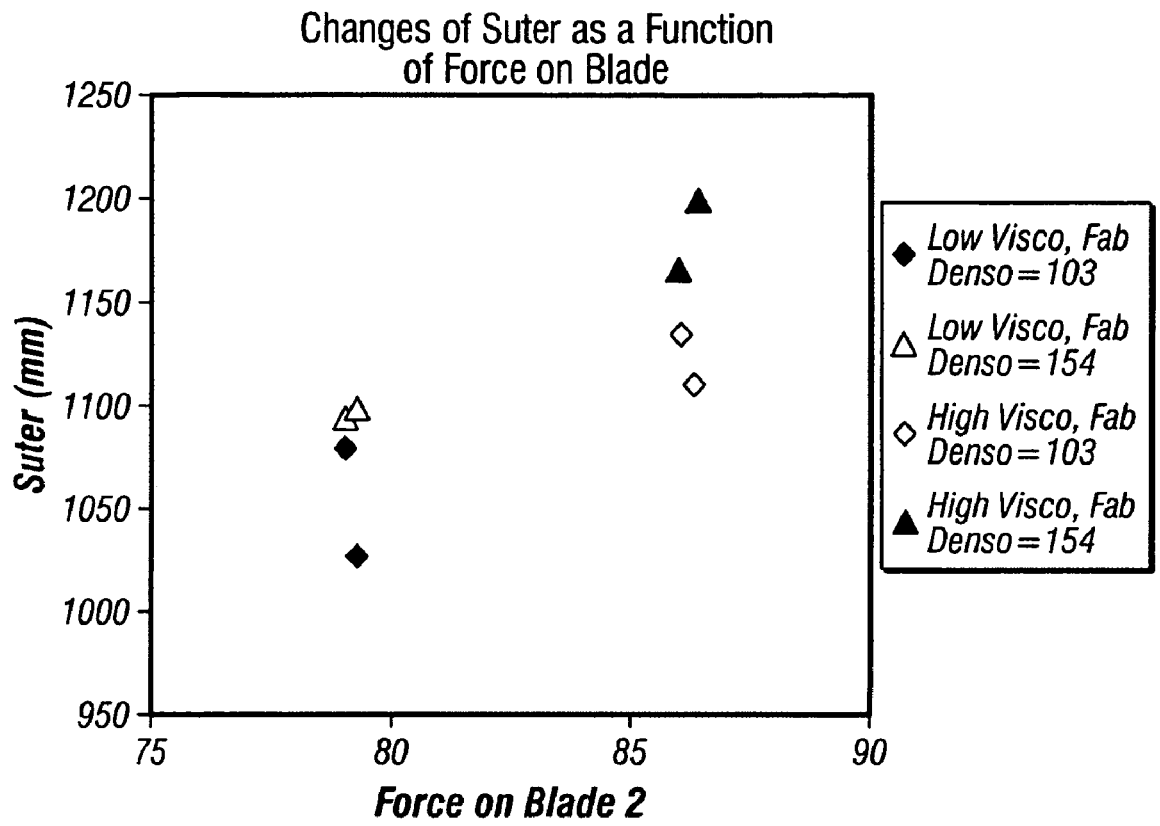
Figure 18:
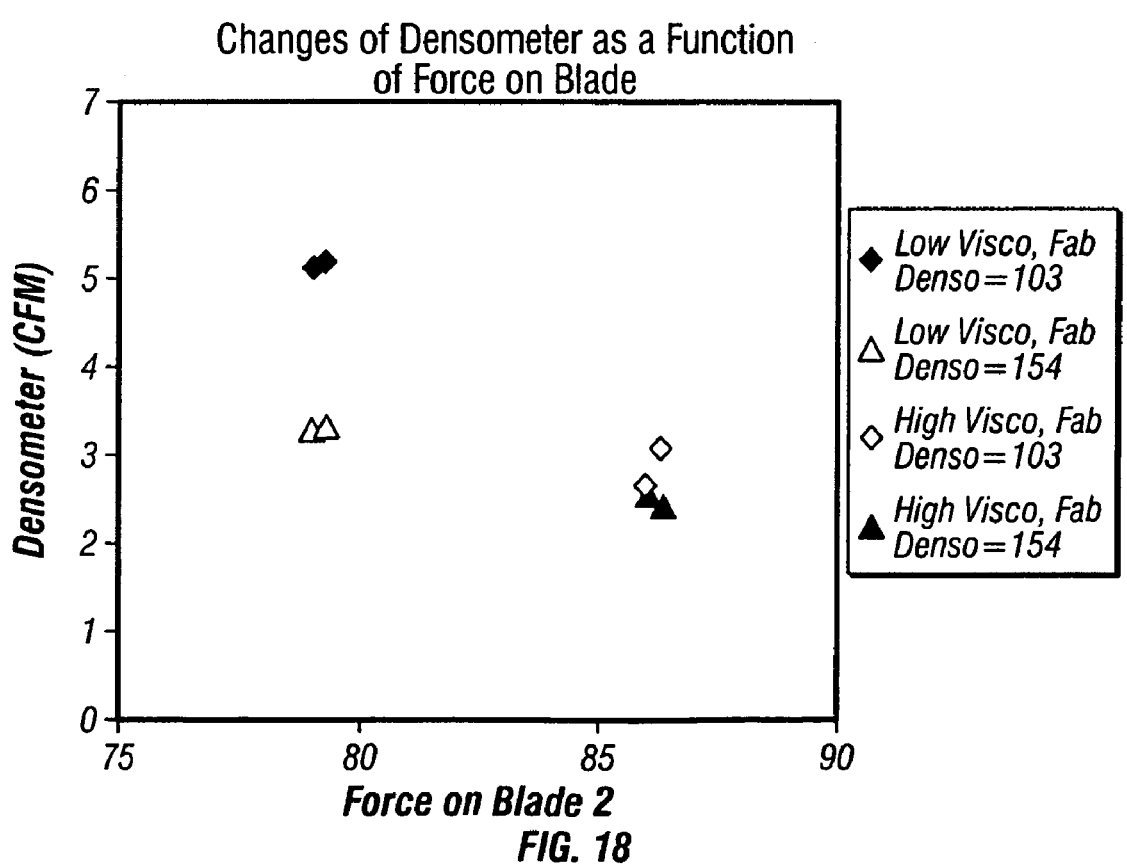

FIGS. 16-18 illustrate WAO, Suter, and Densometer as a function of force on the blade calculated based on another DOE study performed using a method according one embodiment of the present invention. This DOE study is a full $2^3$ DOE study (8 observations) is designed to investigate effects of incoming fabric densometer, polymer viscosity and bead size on encapsulation. Since bead size did not show any significant effect, this DOE practically is reduced to a duplicated $2^2$ design. In this DOE, viscosity is the sole factor that affects force on blade. Therefore, two levels of force on blade are shown in FIGS. 16-18, in which higher viscosity of the polymer results in higher force on the blade. The calculated forces agree with those of measured. FIG. 16 indicates that a higher WAO is achieved for the polymer with the higher initial viscosity under the same encapsulation conditions. For polymers with the same initial viscosity, higher WAO is achieved on looser or more porous fabric (represented by higher densometer). For the fabric of the same densometer, higher Suter and lower densometer are achieved for the polymer with higher initial viscosity.

6-Factor DOE

Thus far, DOE studies described above are 4-factor DOE studies. To further validate the force model, a 6-factor DOE was performed in which the results can be used for comparison with the force model. Factors used in the 6-factor DOE study includes fabric tension, entry angle of blade 101, exit angle of blade 101, entry angle of blade 102, exit angle of blade 102, and polymer viscosity. In order to reduce the size of experiments, a ¼ $2^6$ factorial design (¼ $2^6$=16, a full $2^6$=64) was run. Inputting of the 16 sets of experimental conditions into the mechanics model, 16 unique forces on the blade are calculated. As described below, the calculated forces match the corresponding measured forces on the blade with variations of less than 10%. The correlations between the performance properties and calculated forces on the blade are shown in FIGS. 19-21 according to an embodiment of the present invention.

Figure 19:
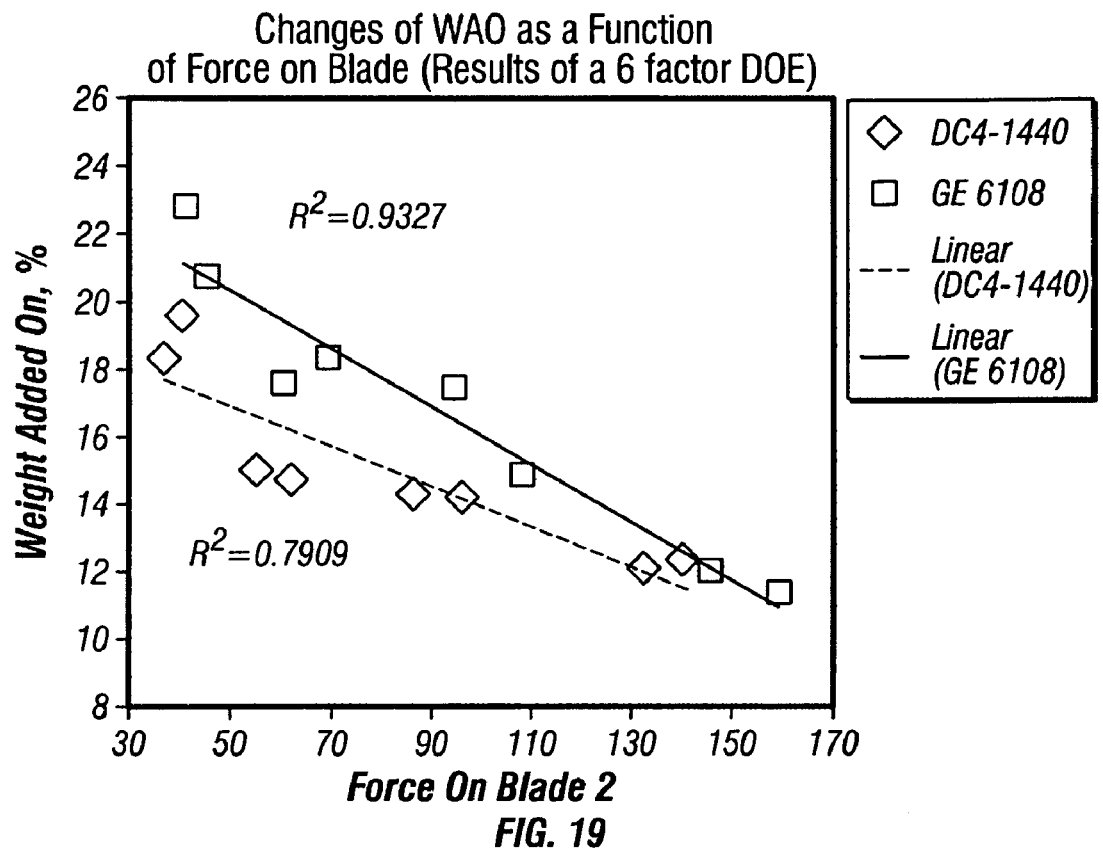
Figure 20:
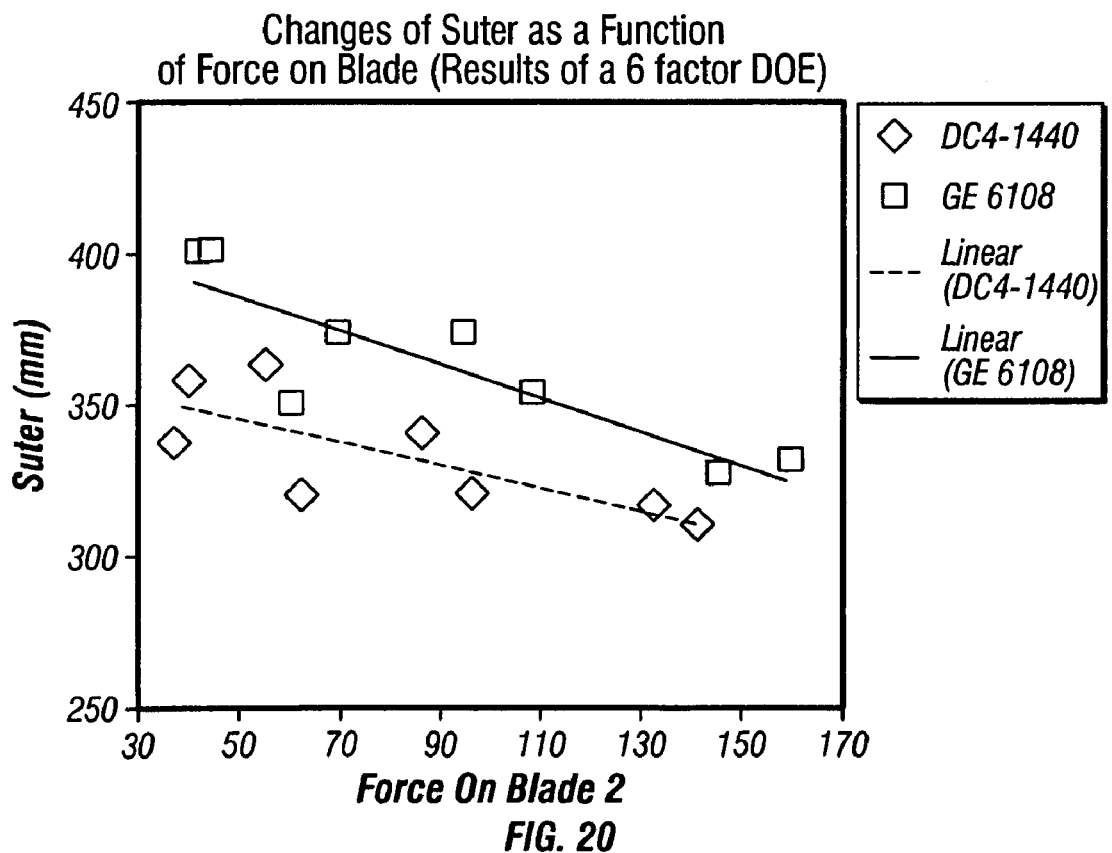
Figure 21:
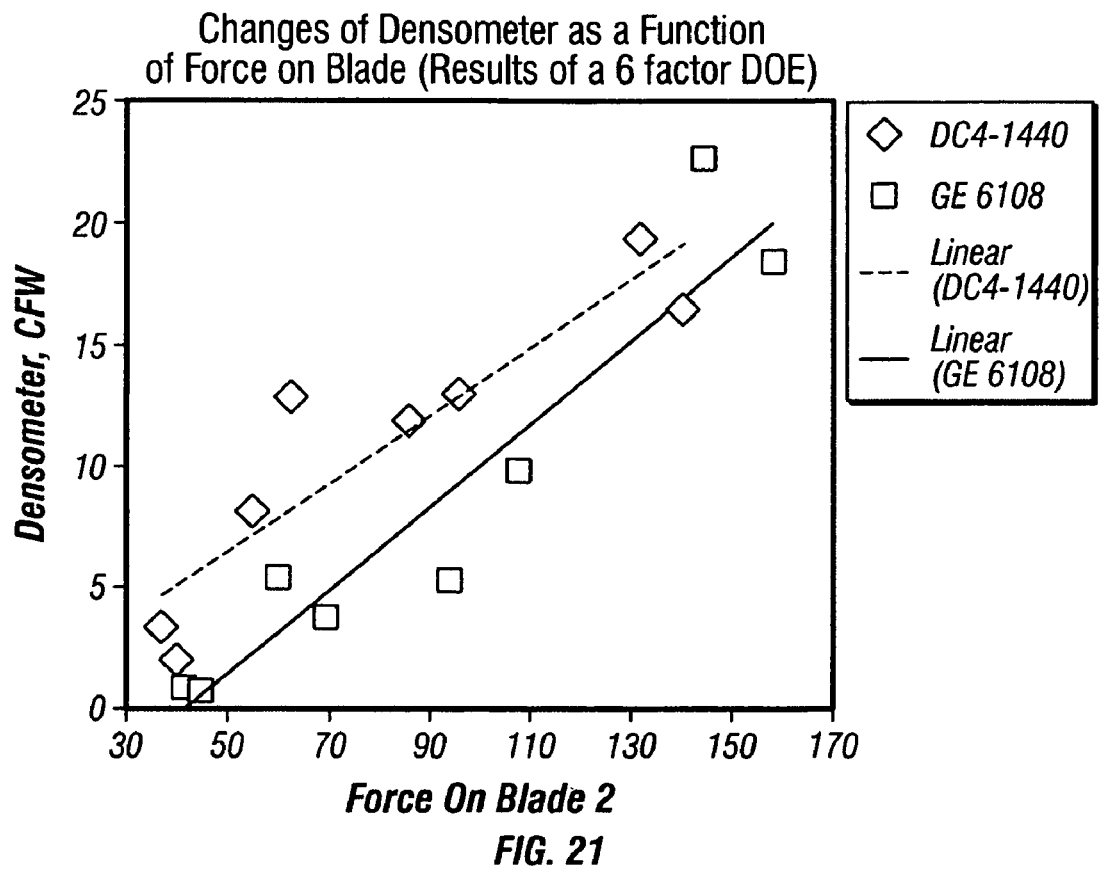

FIGS. 19-21 illustrate linear correlations between the performance properties, such as WAO, Suter, and densometer, and forces on the blade, whose results were obtained from a study that was performed using a method according to one embodiment of the present invention. The results indicate that higher WAO is achieved for the polymers with higher initial viscosities. The results also indicate that, for a given polymer, WAO decreases with increasing force on the blade. Suter changes with the same trend as WAO, and densometer changes inversely.

There are many processing and material variables that have impact on product performance. As many as 25 variables which have been listed may have impacts on product performance. This model, based on an embodiment of the present invention, indicates that for a given polymer and fabric some of these processing variables make contributions to the force on the blade (precisely the pressure on the blade, since the effective contact area is unknown, force on the blade is used to represent pressure), while the force on blade and time are the only independent factors which control the encapsulation. The factor of time in this model is hidden, but its effect is reflected in the line speed and blade sharpness. The contribution of the key variables to force on the blade is integrated through the derived force equations discussed above.

2.2 Laboratory Encapsulation Machine (LEM) DOE

Figure 22:
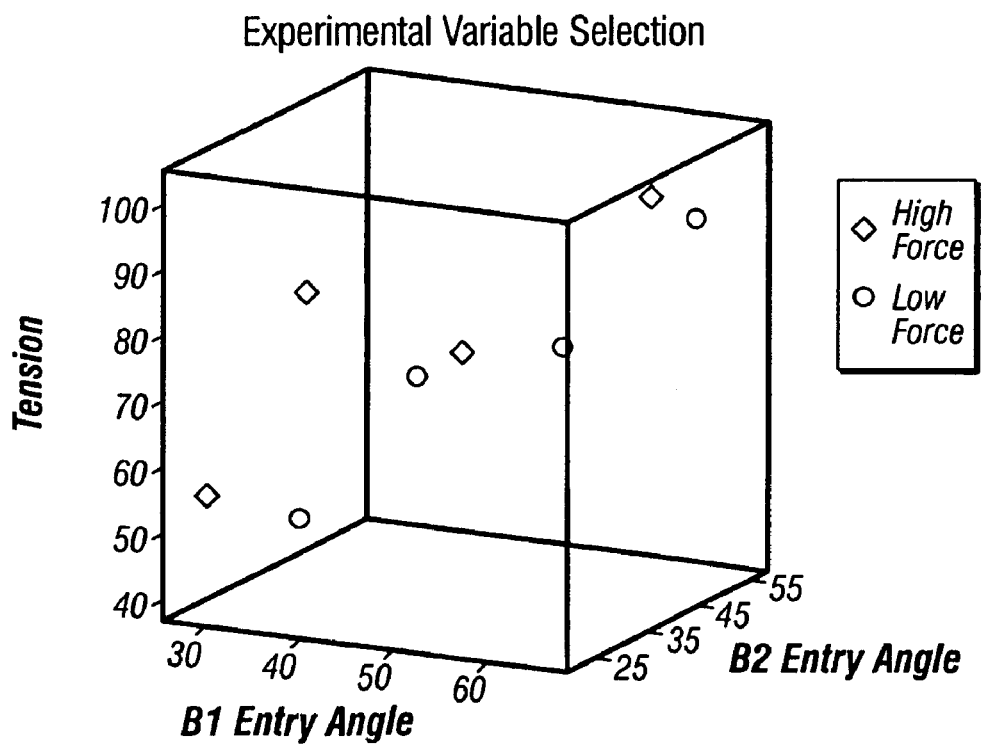
Figure 23:
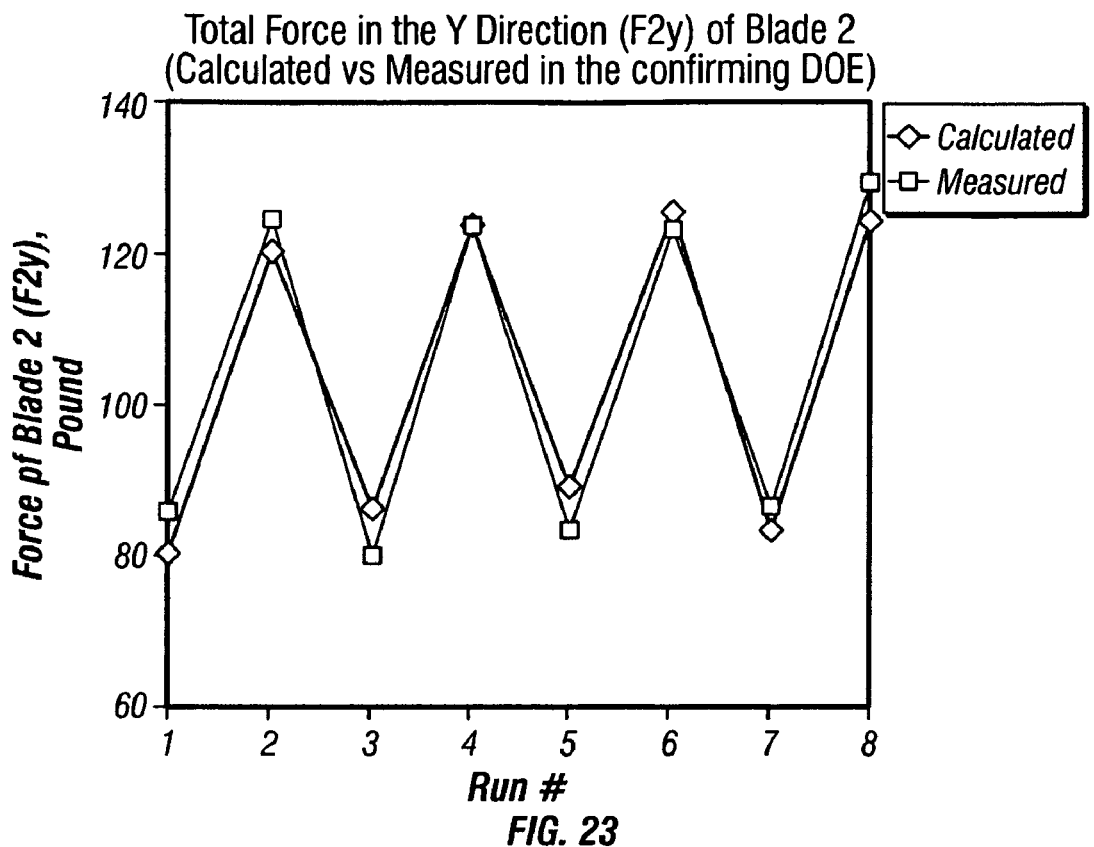
Figure 24:
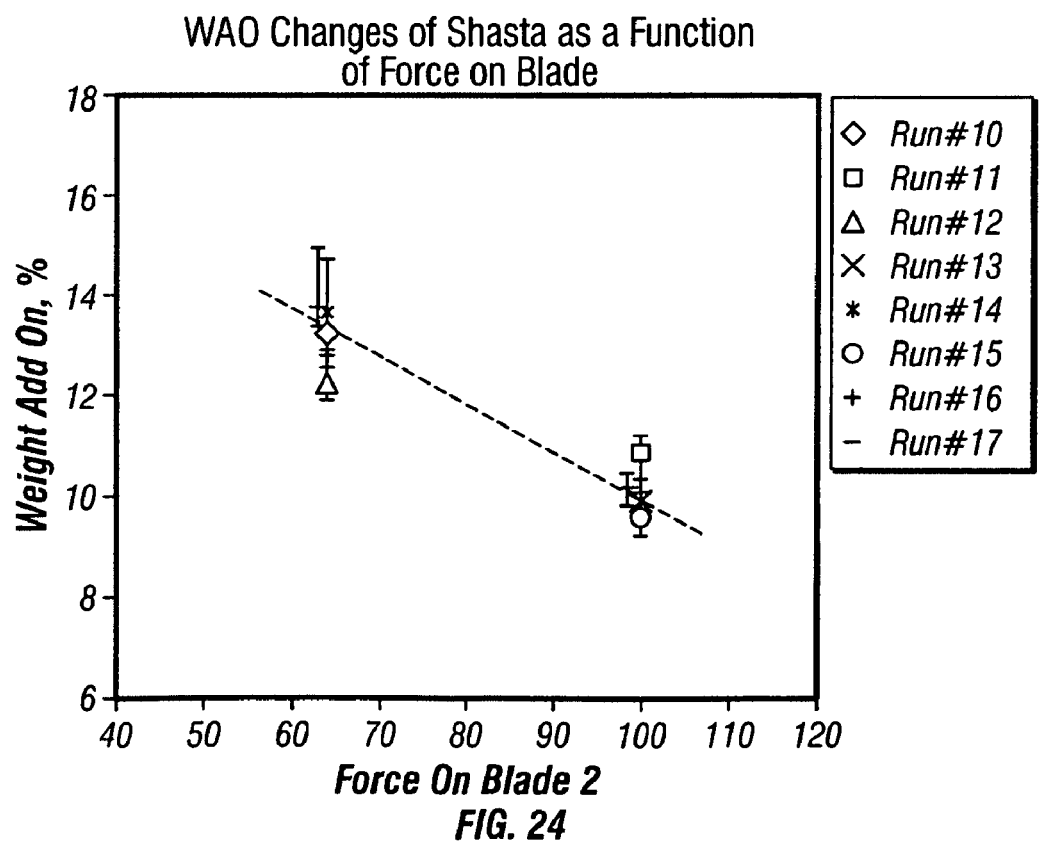
Figure 25:
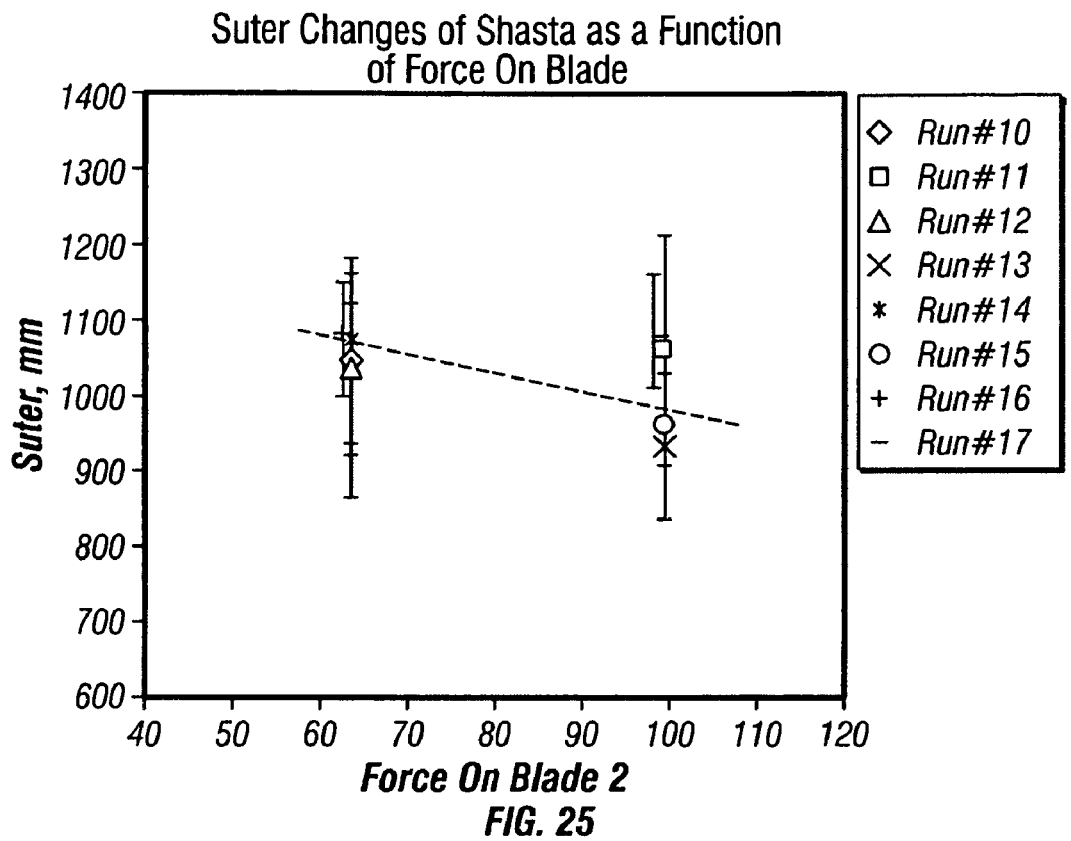
Figure 26:
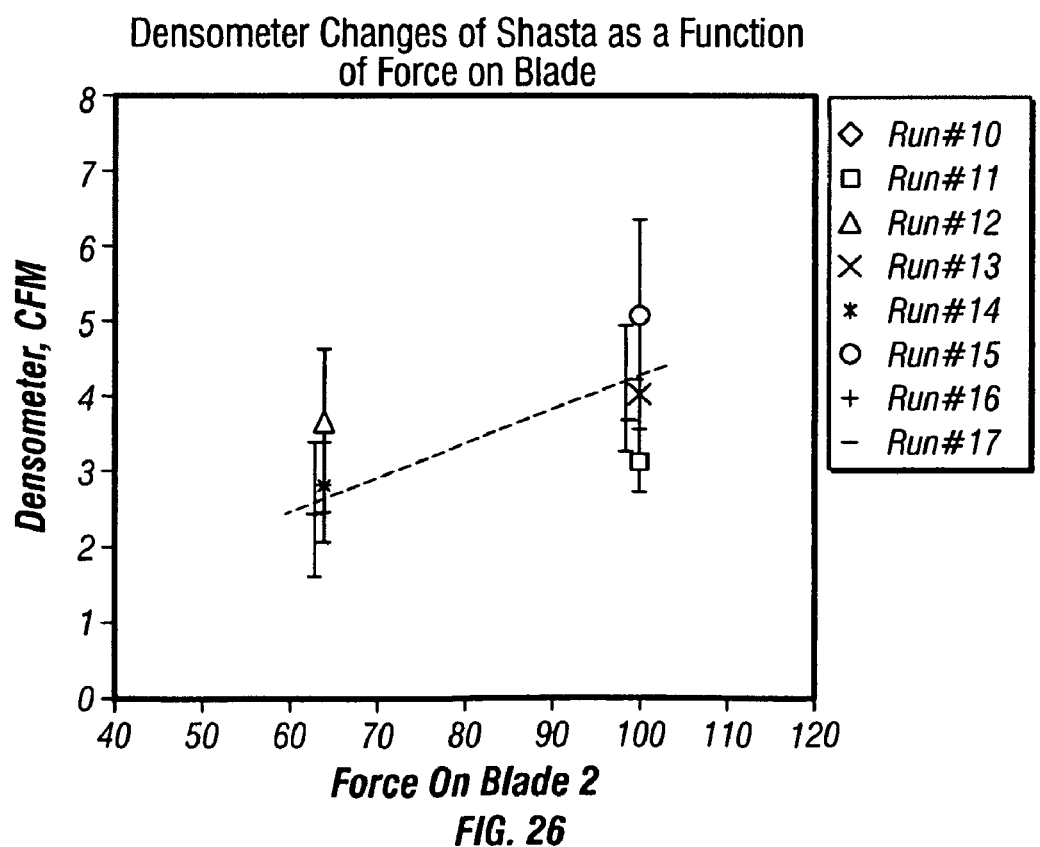
Figure 27:
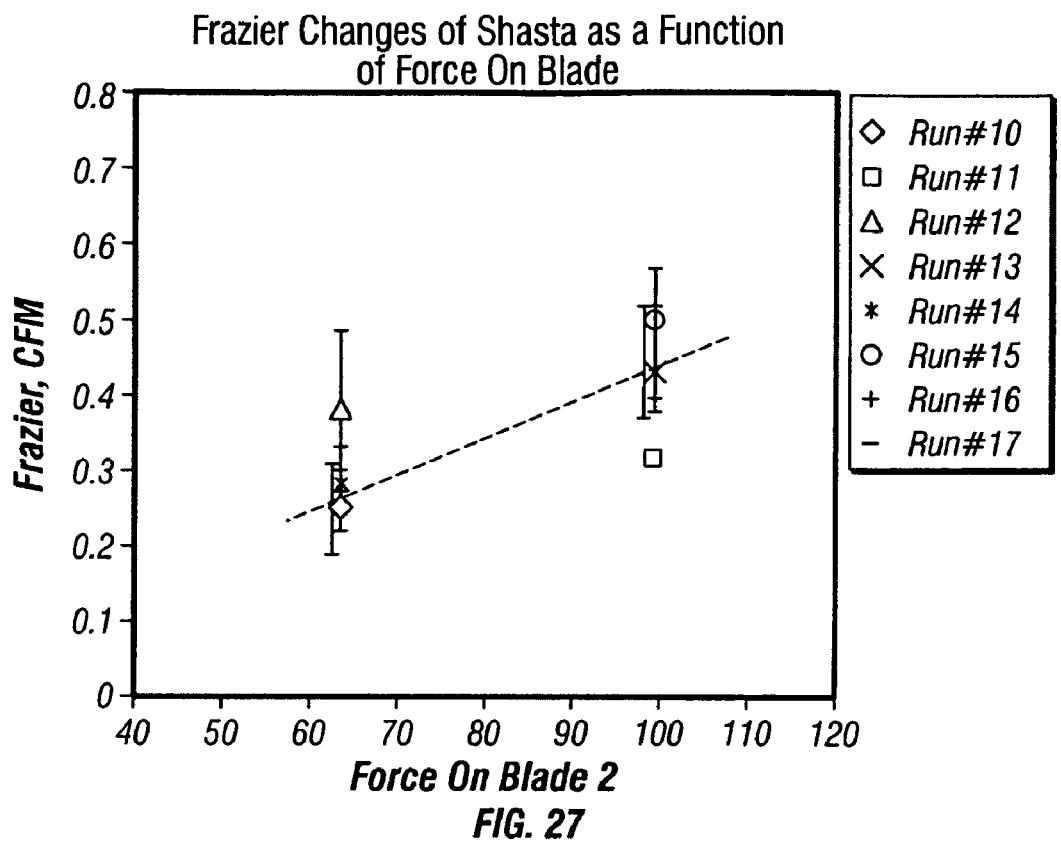
Figure 28:
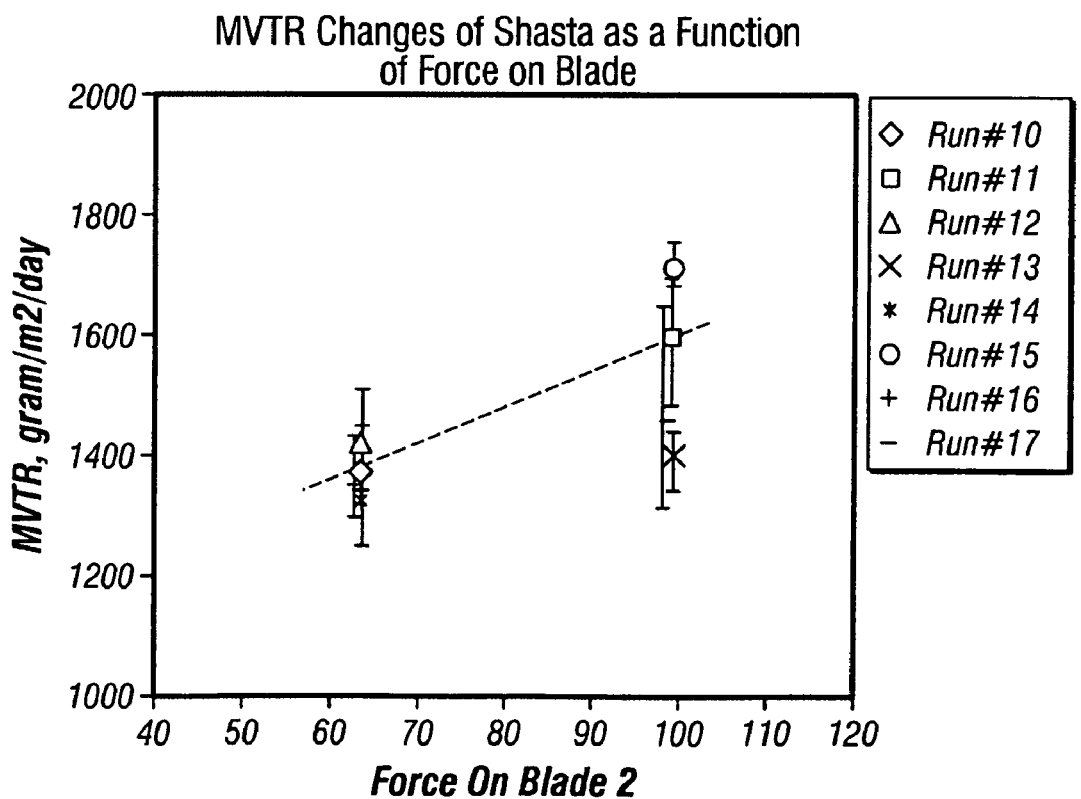

Thus far, the force model and DOE studies have revealed that a correlation between performance property and force on blade exists. However, to determine whether this correlation for a given fabric and polymer is monotonic (that is, whether the correlation exists for a specific force on the blade regardless of the run conditions (like tension, incident/entry angle, exit angle, polymer viscosity, etc.) used to achieve this force), another study (the LEM DOE study) is performed on an actual production line. In this study, an encapsulated web is produced using the same force on the blades at different sets of processing variables or parameters. In the LEM DOE study, two levels of forces on the blade (high and low) are generated from eight different sets of variables, including fabric tension, entry angle of blade 101, entry angle of blade 102, and sharpness of blade 102. The distribution of the selected variables in a three-dimension plot using tension, entry angle of blade 101 and entry angle of blade 102 as coordinates is shown in FIG. 22. The 4 diamonds and the 4 solid circles represent the high and low force groups, respectively. The forces on the blade based on selected variables were pre-calculated before the experiments were run. A comparison of the calculated forces with the corresponding measured forces is shown in FIG. 23.

FIGS. 24-28 illustrate performance properties of the encapsulated web produced in the LEM DOE study as a function of force on the blade, whose results were obtained from a study that was performed using a method according to one embodiment of the present invention. The results indicate that WAO and Suter decrease with increasing force on the blade, while densometer, Frazier and MVTR increase with increasing force on the blade. The close match in performance properties at the same force on the blade generated from 4 different sets of processing variables proves that the correlation between performance property and force on the blade is monotonic or exclusive. In other words, performance property depends only on force on the blade regardless of how this force is achieved.

3. Force Model Application

From the studies described above, it has been learned that performance properties of the encapsulated fabric is a monotonic function of force on the blade used in the encapsulation process. The force on the blade calculated using the mechanics model is well correlated by that of the measured. It has also been determined that a monotonic function exists between performance property and the calculated force on the blade. However, whether this monotonic relationship holds true for different fabrics and polymers still needs to be determined.

3.1 Encapsulation of Fabric 1 (Mirage) Using Various Polymers

A fabric known as Mirage was encapsulated on a production line 1 under the designed forces on the blade. Three force levels were chosen. For each force level, two sets of processing variables were used to generate the same level of force on blade 102 in order to test the exclusivity of the performance to force relationship.

Figure 29:
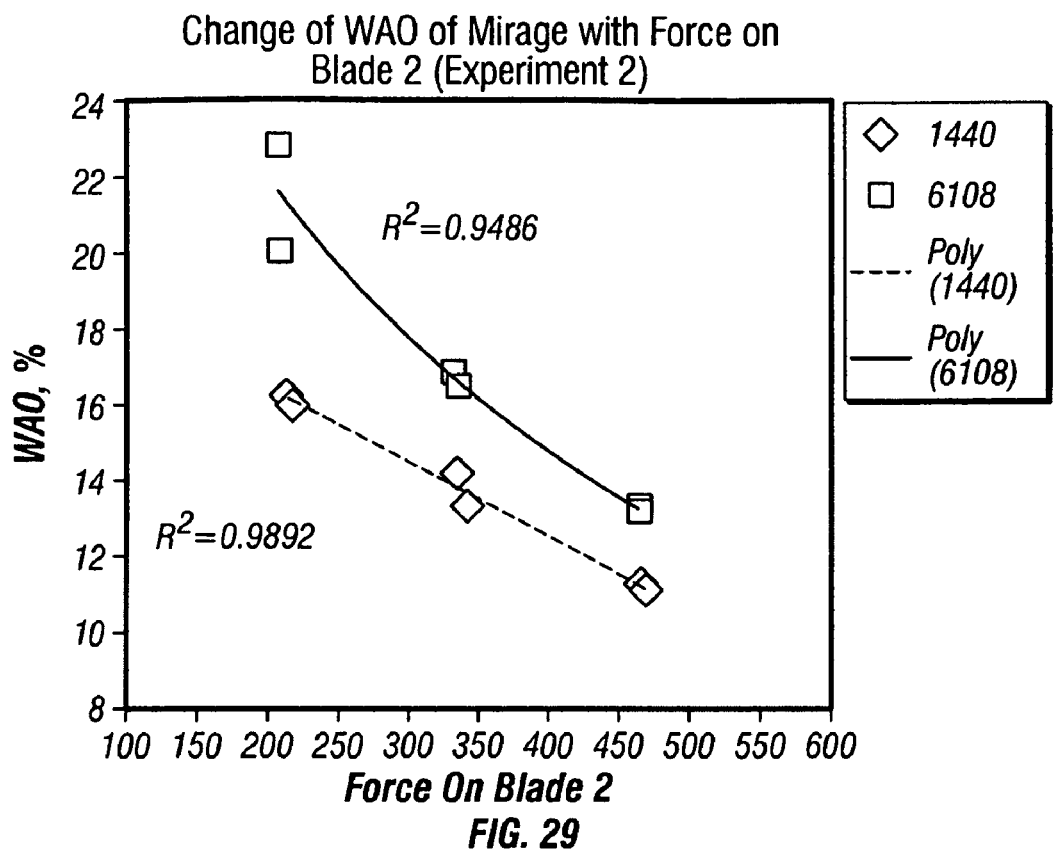
Figure 30:
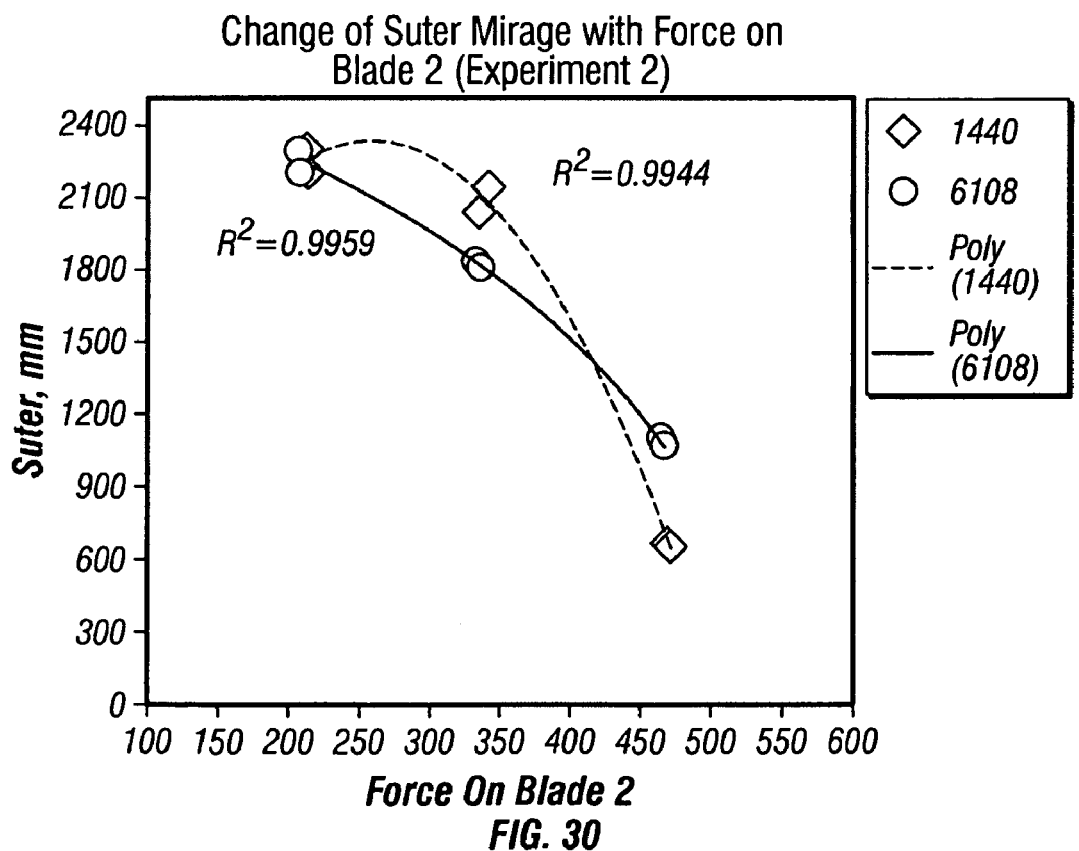
Figure 31:
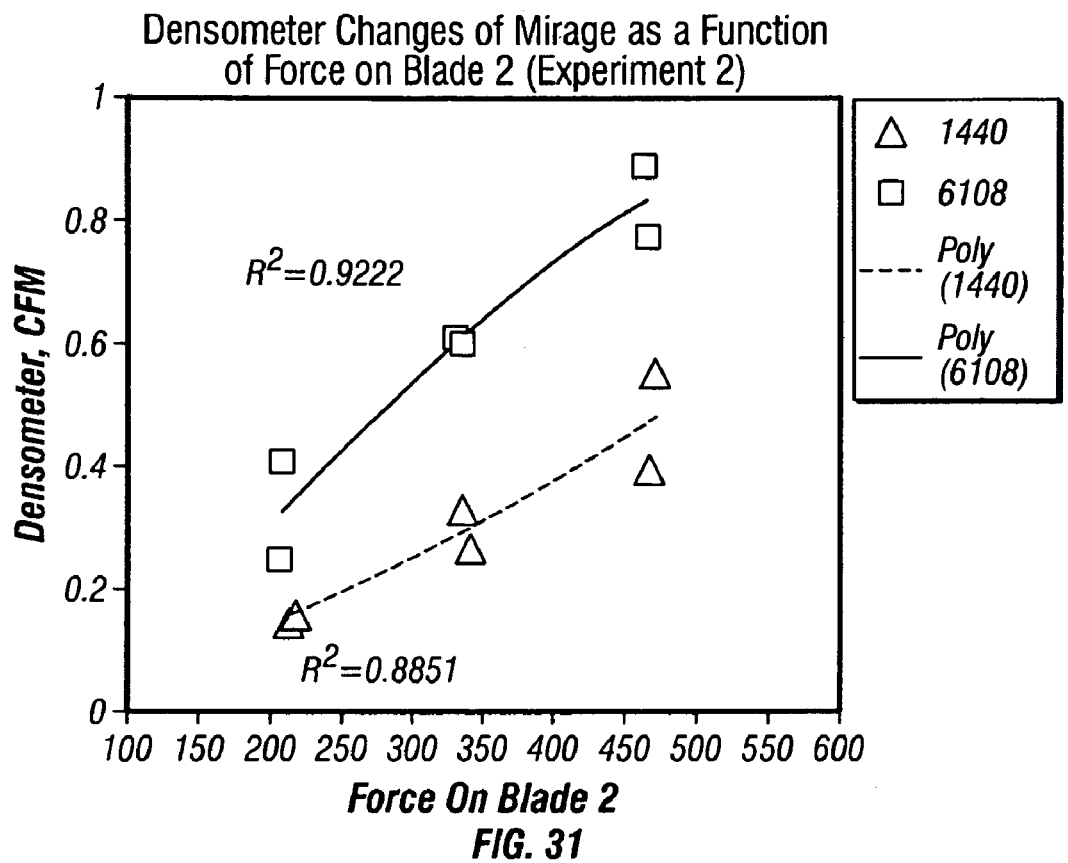
Figure 32:
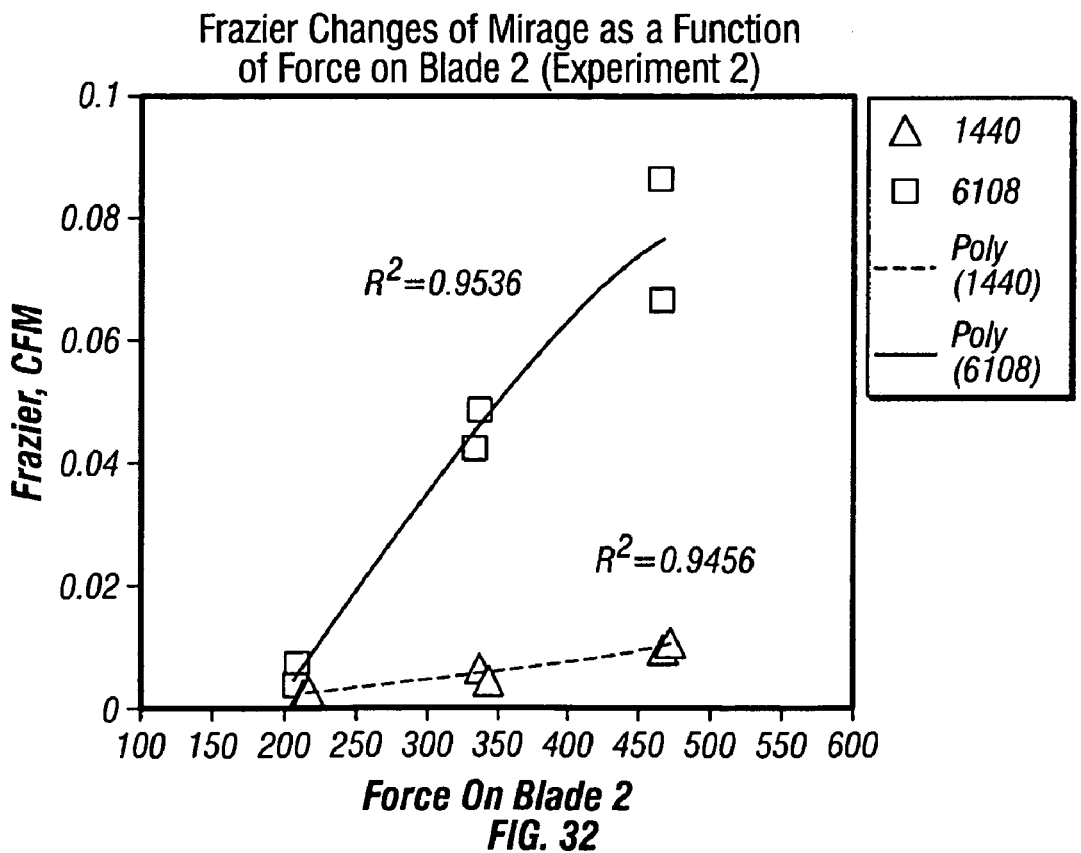
Figure 33:
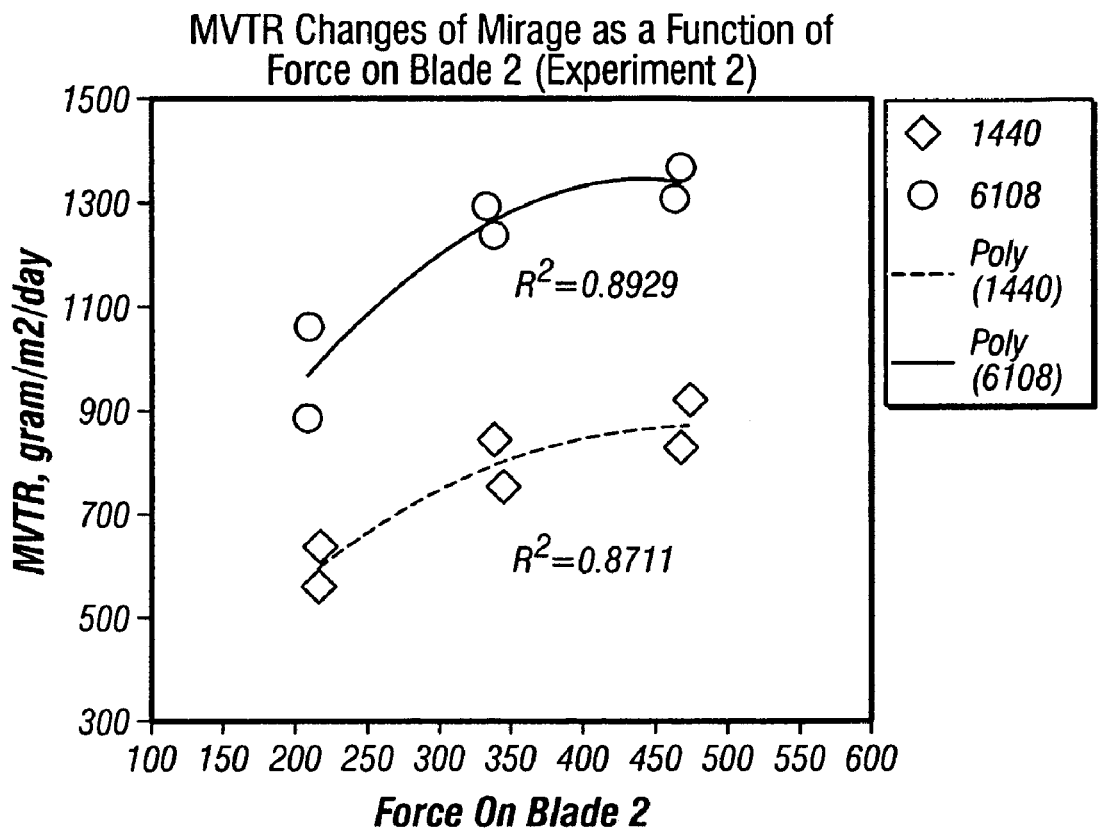
Figure 34:
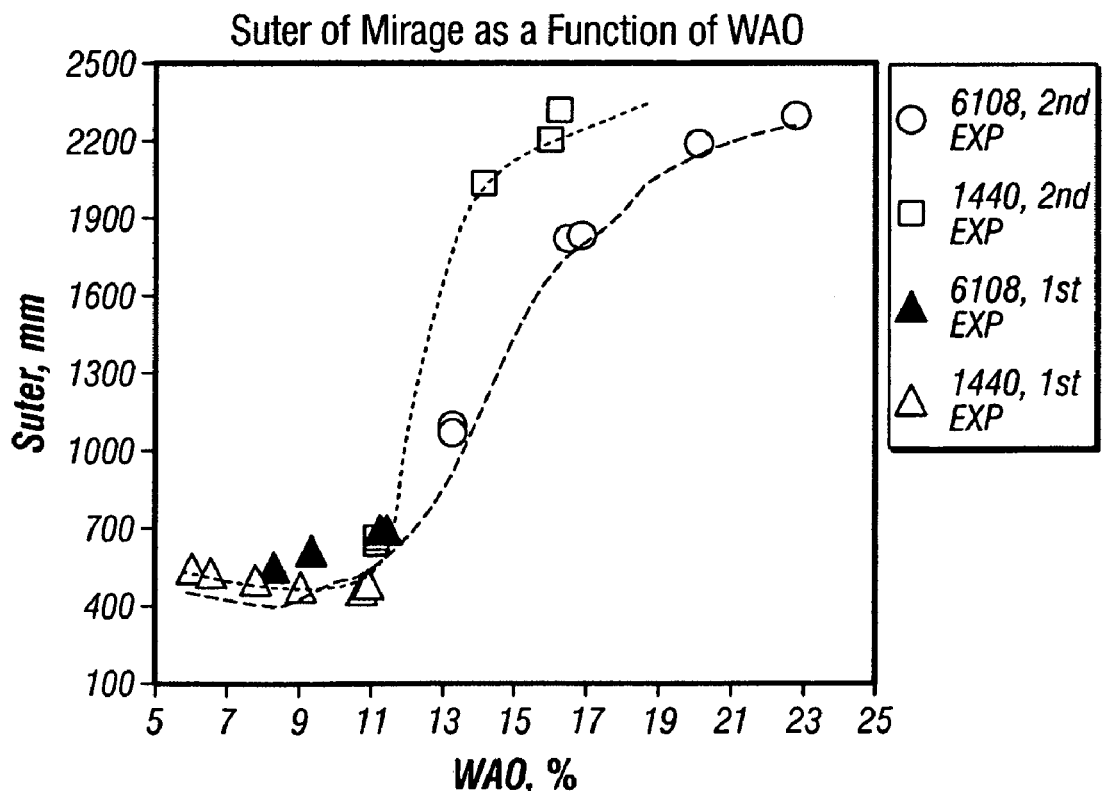
Figure 35:
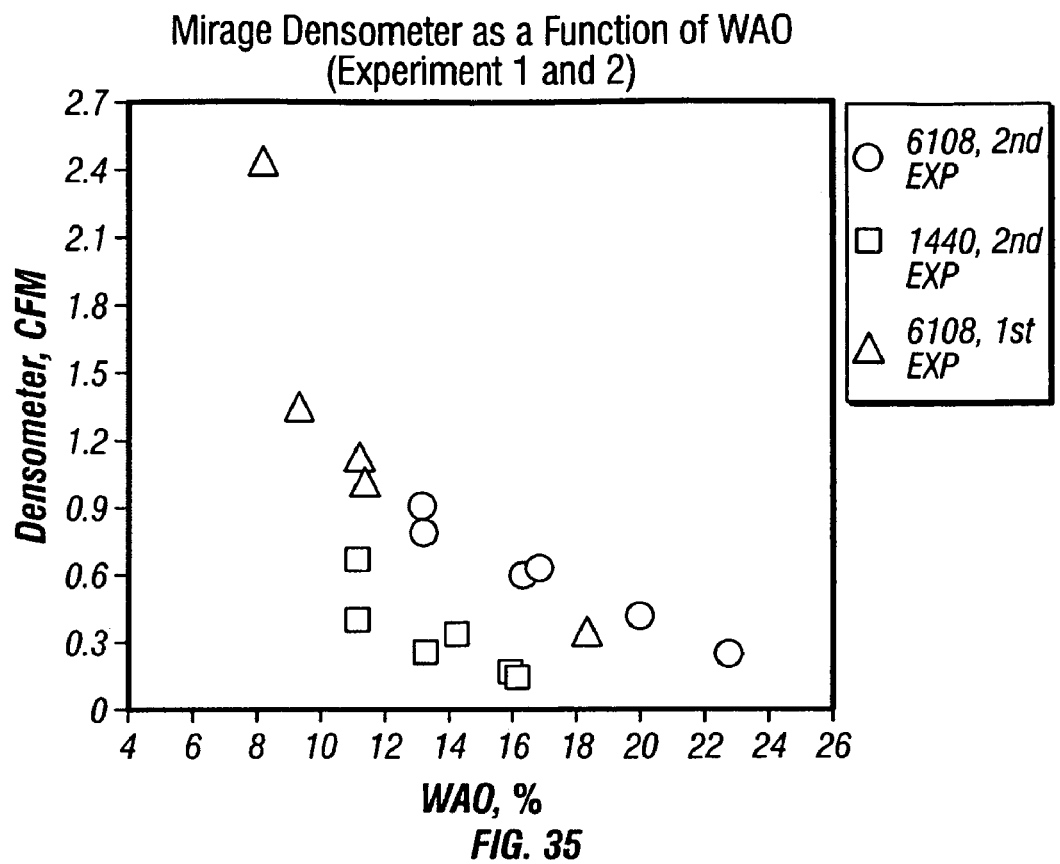
Figure 36:
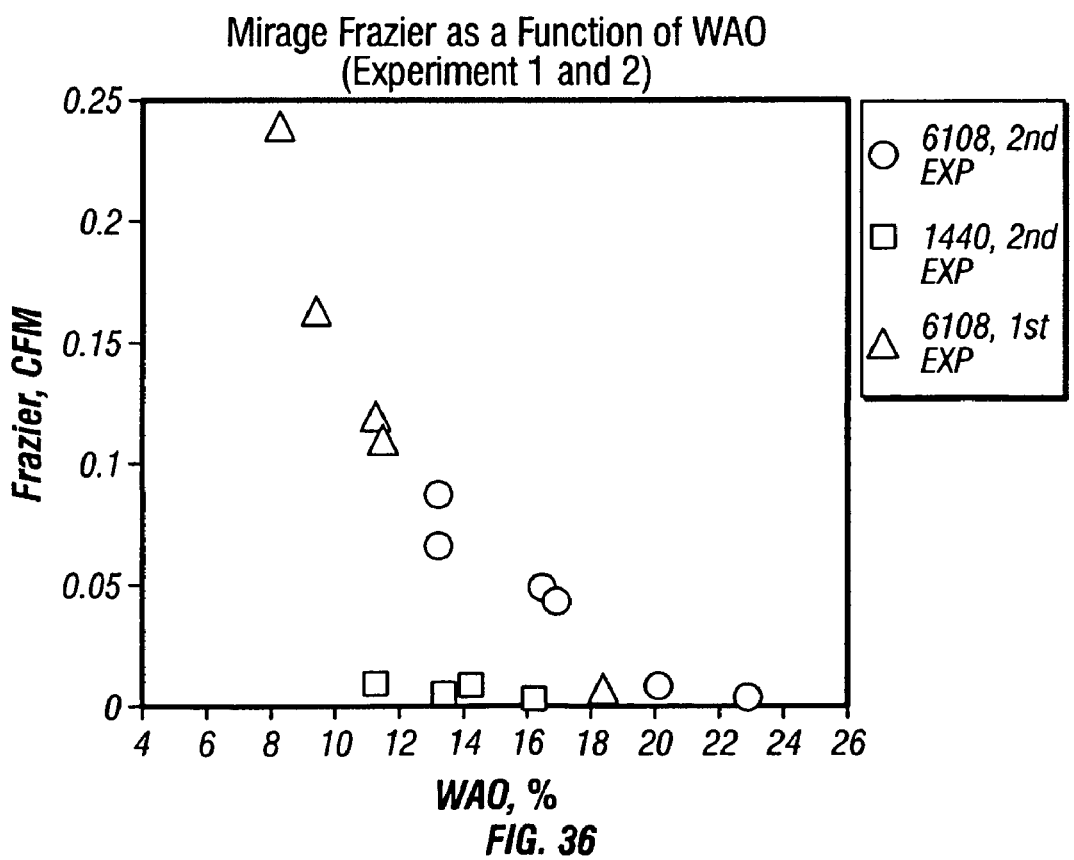
Figure 37:
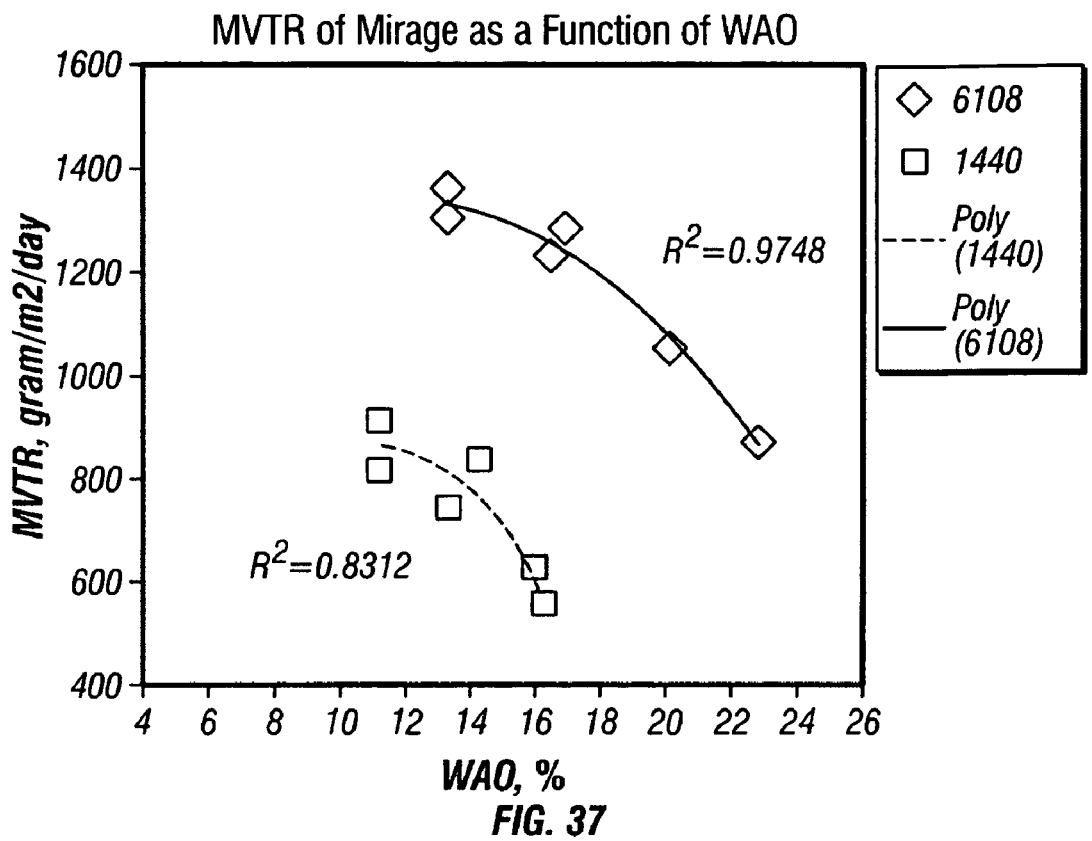
Figure 38:
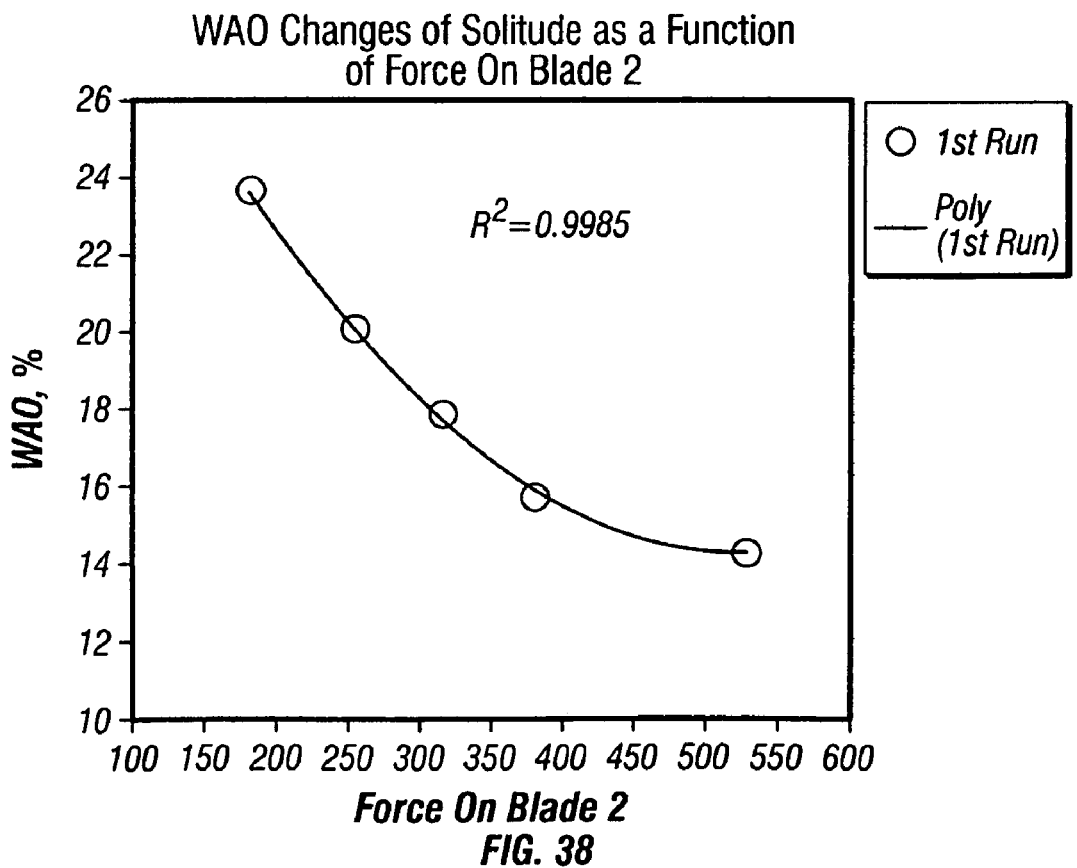
Figure 39:
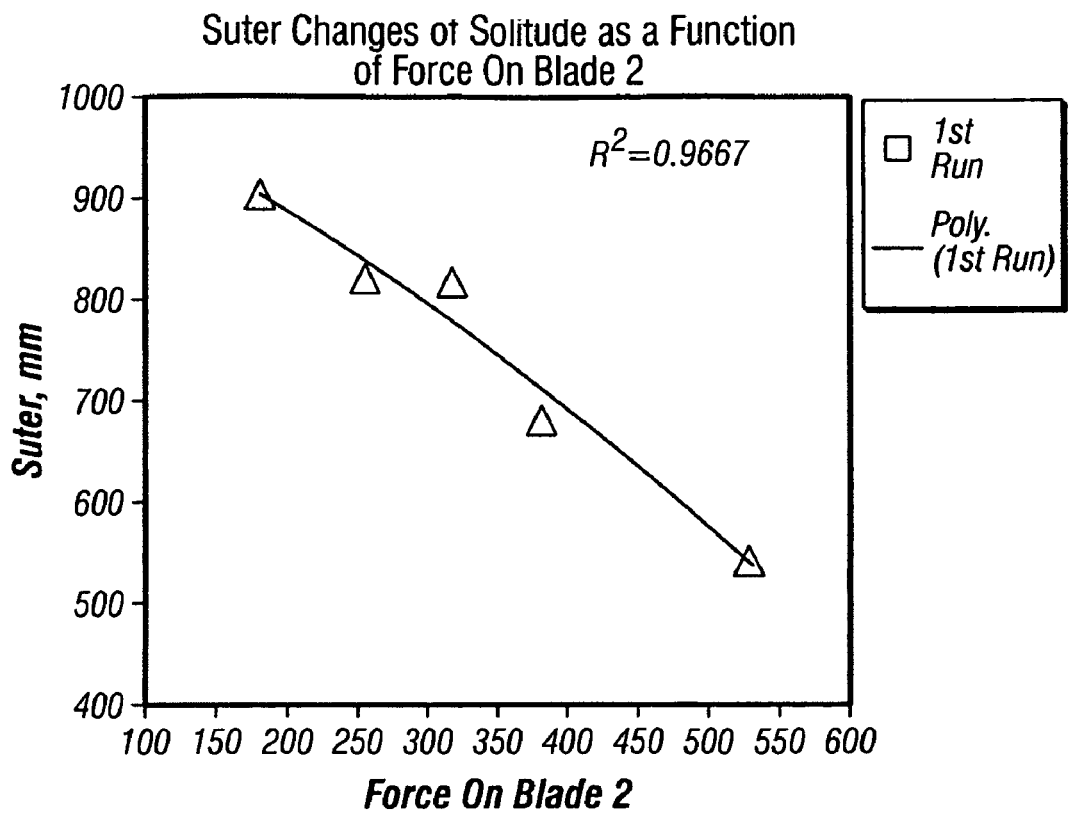
Figure 40:
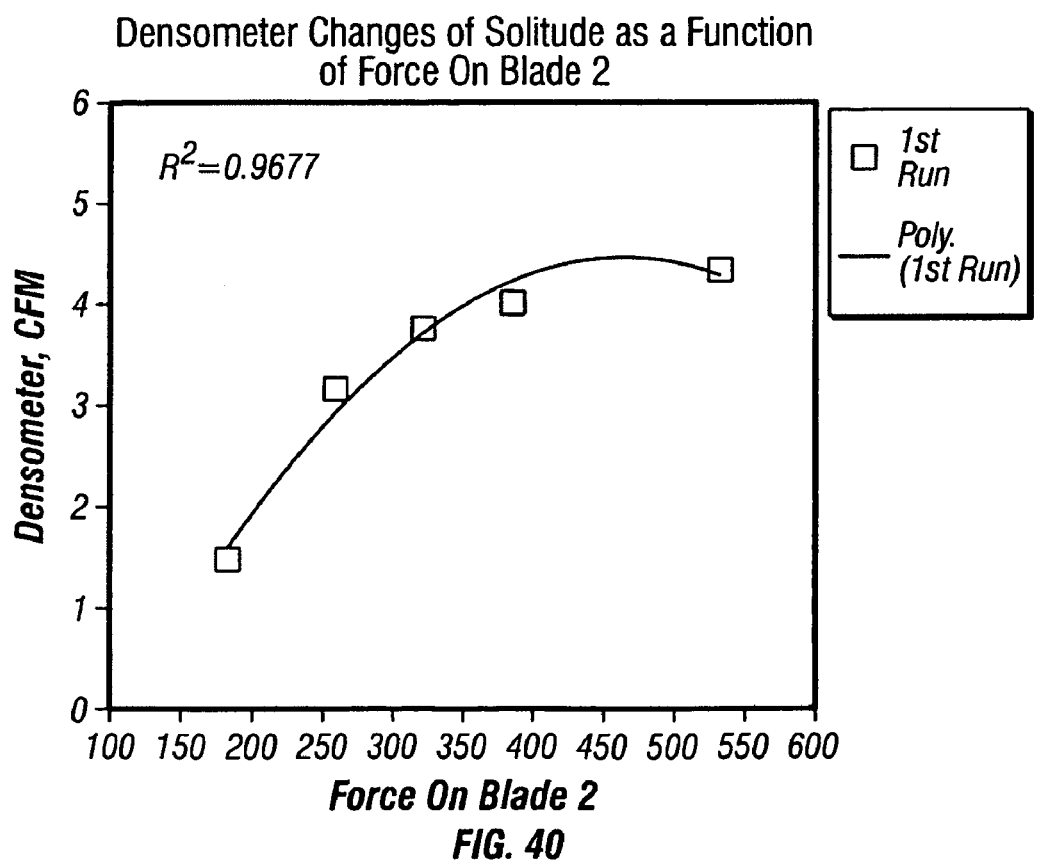
Figure 41:
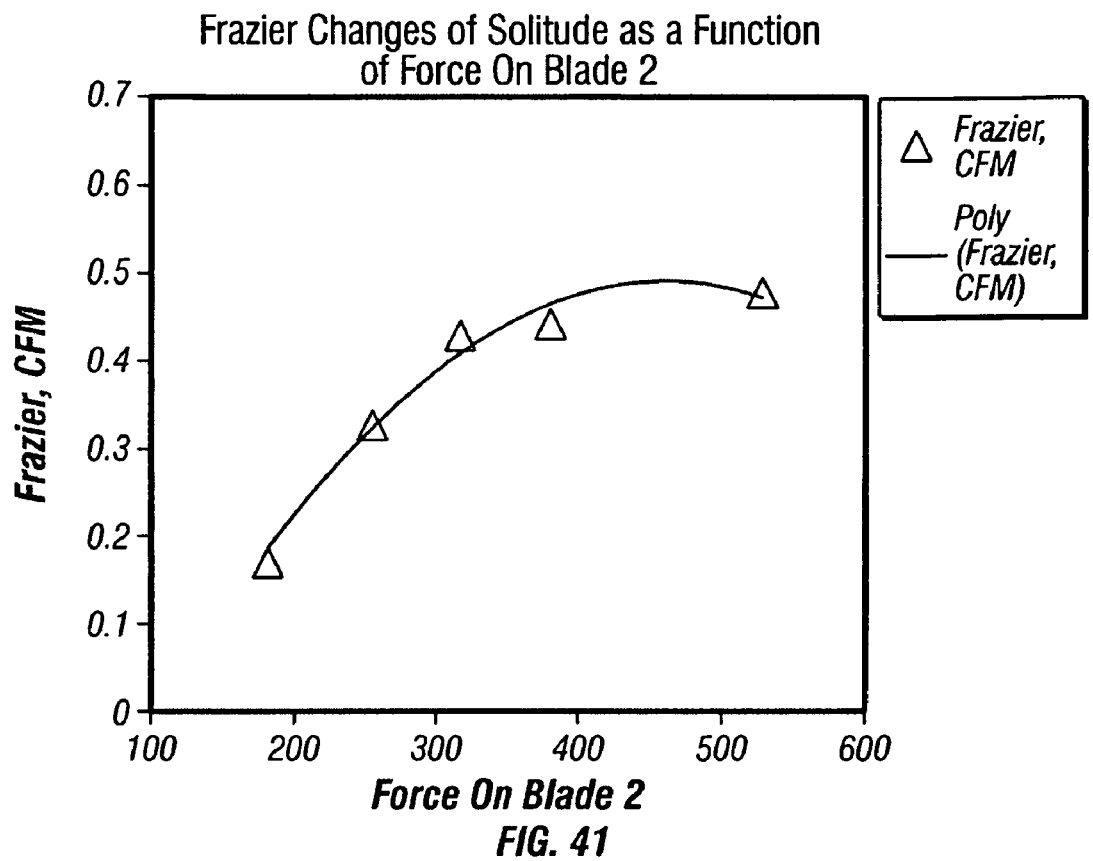
Figure 42:
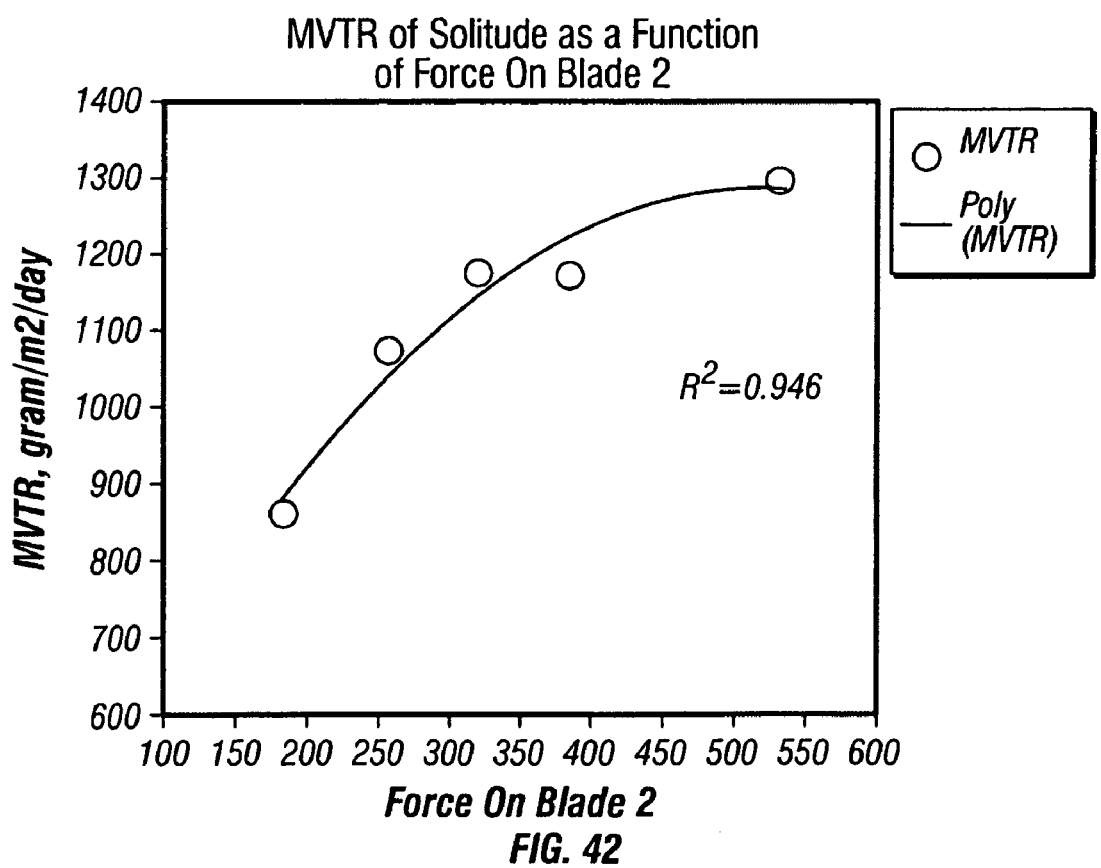
Figure 43:
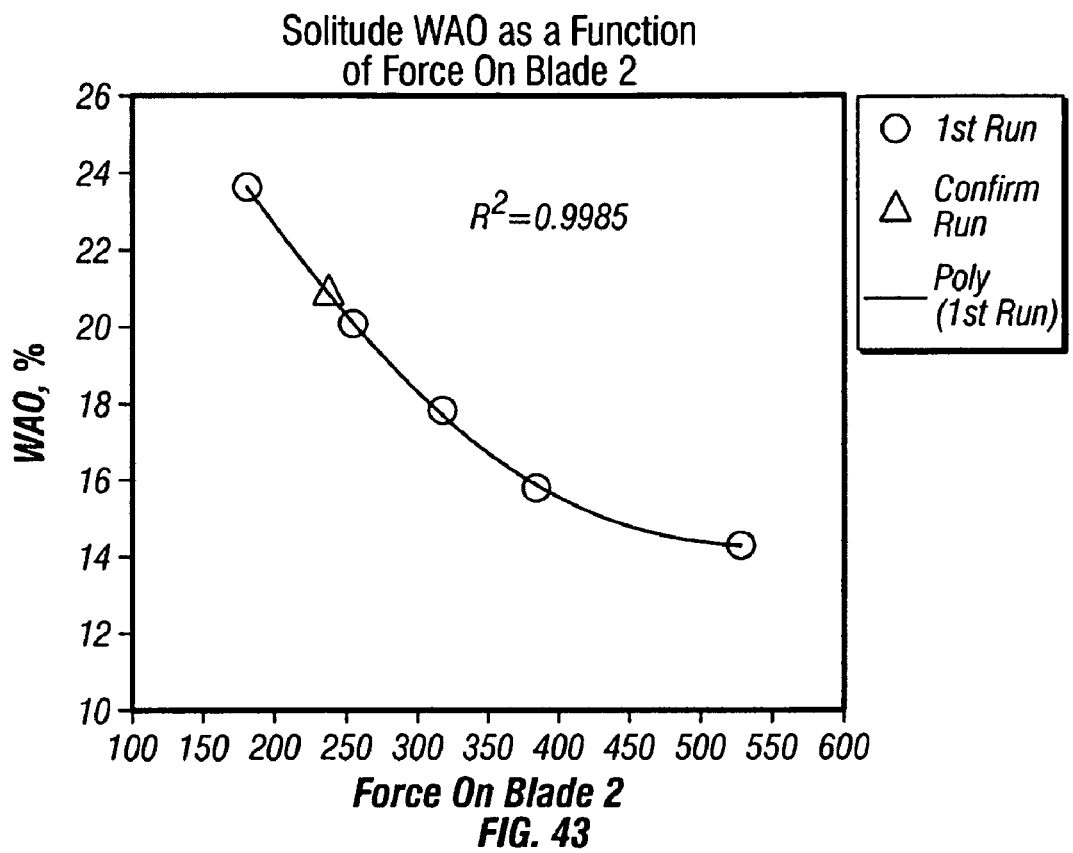
Figure 44:
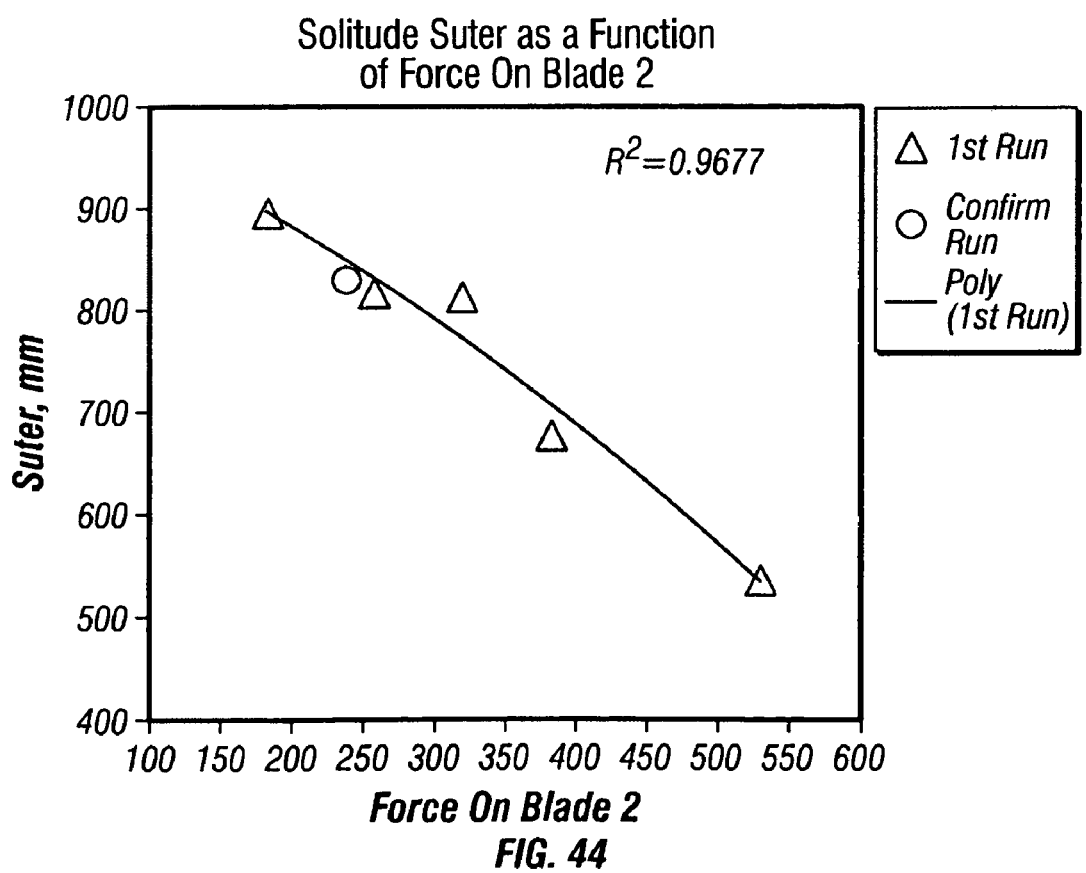
Figure 45:
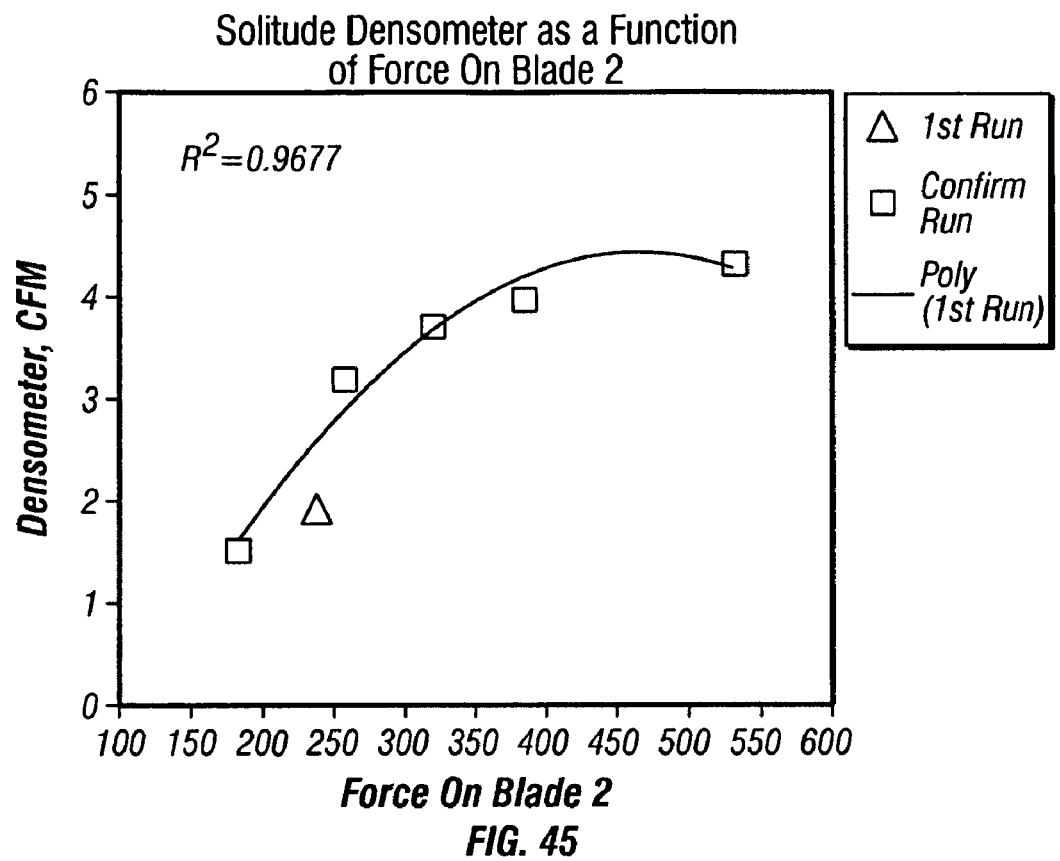
Figure 46:
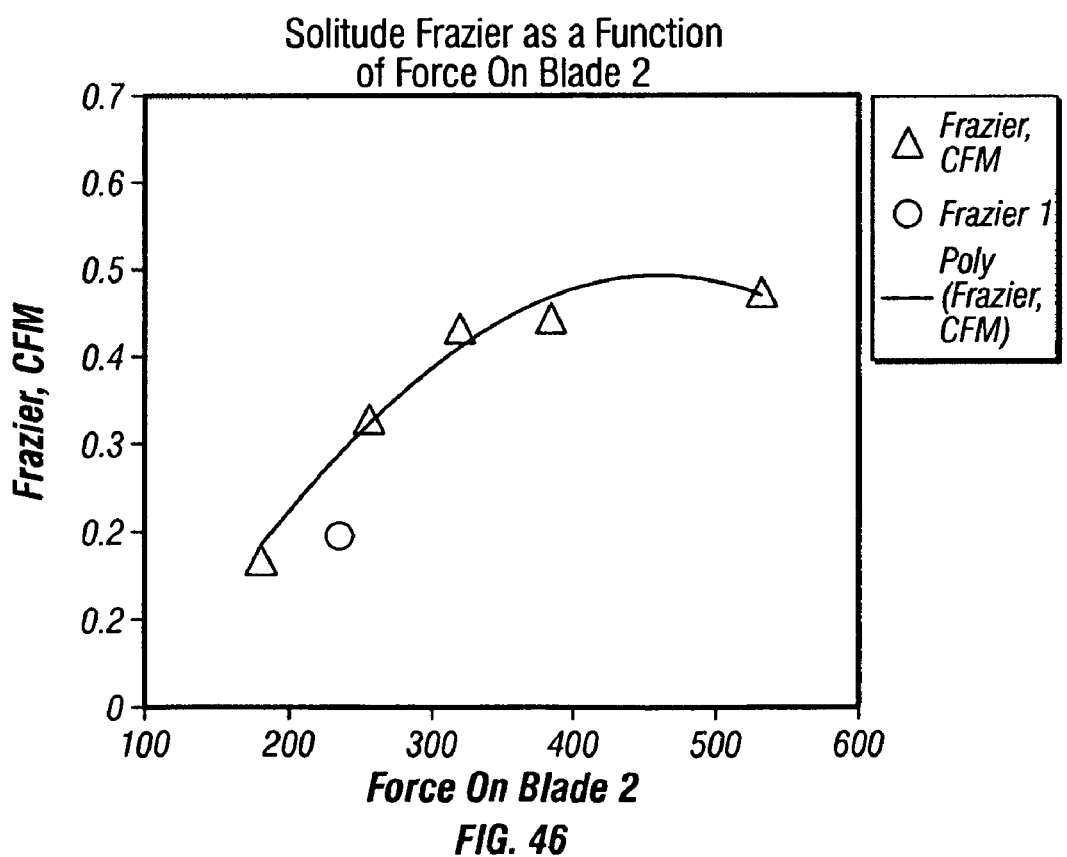
Figure 47:
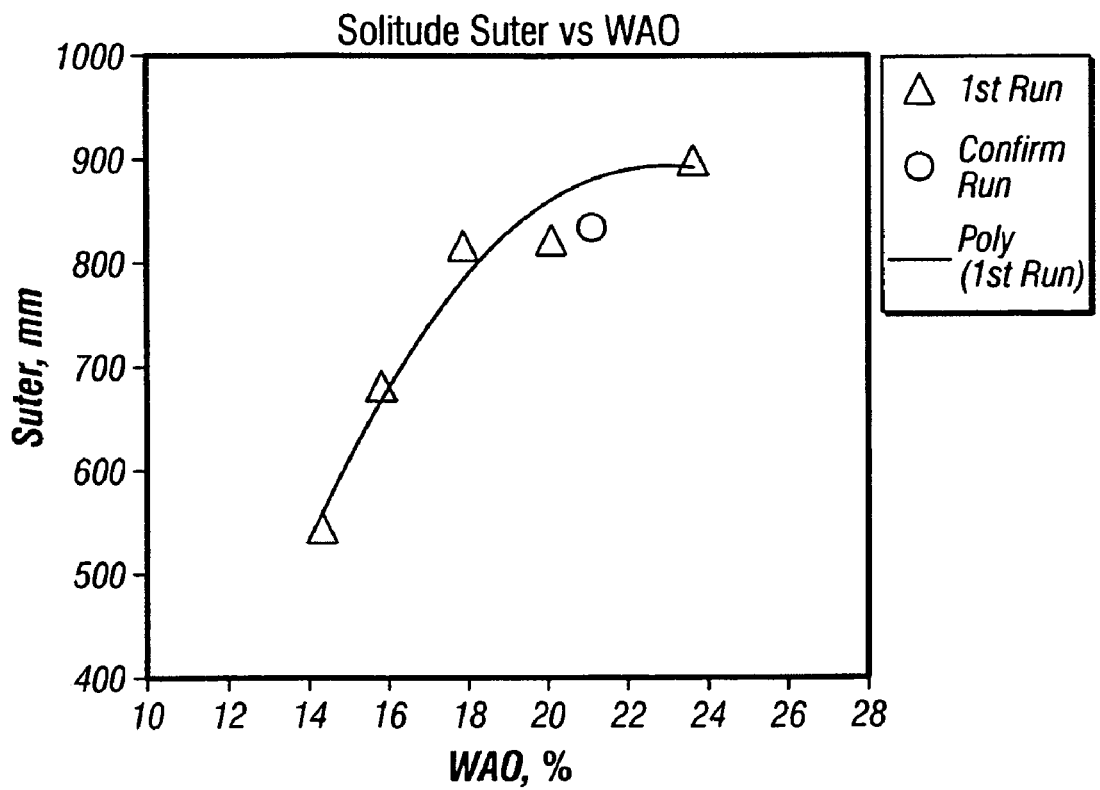
Figure 48:
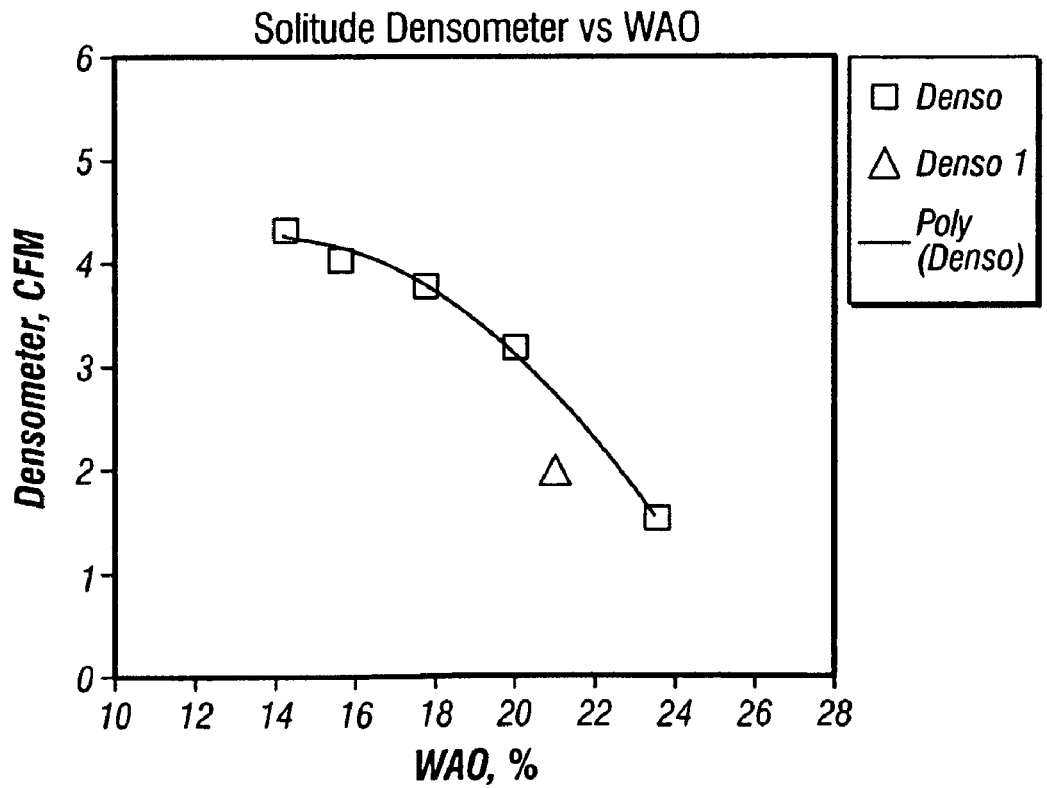
Figure 49:
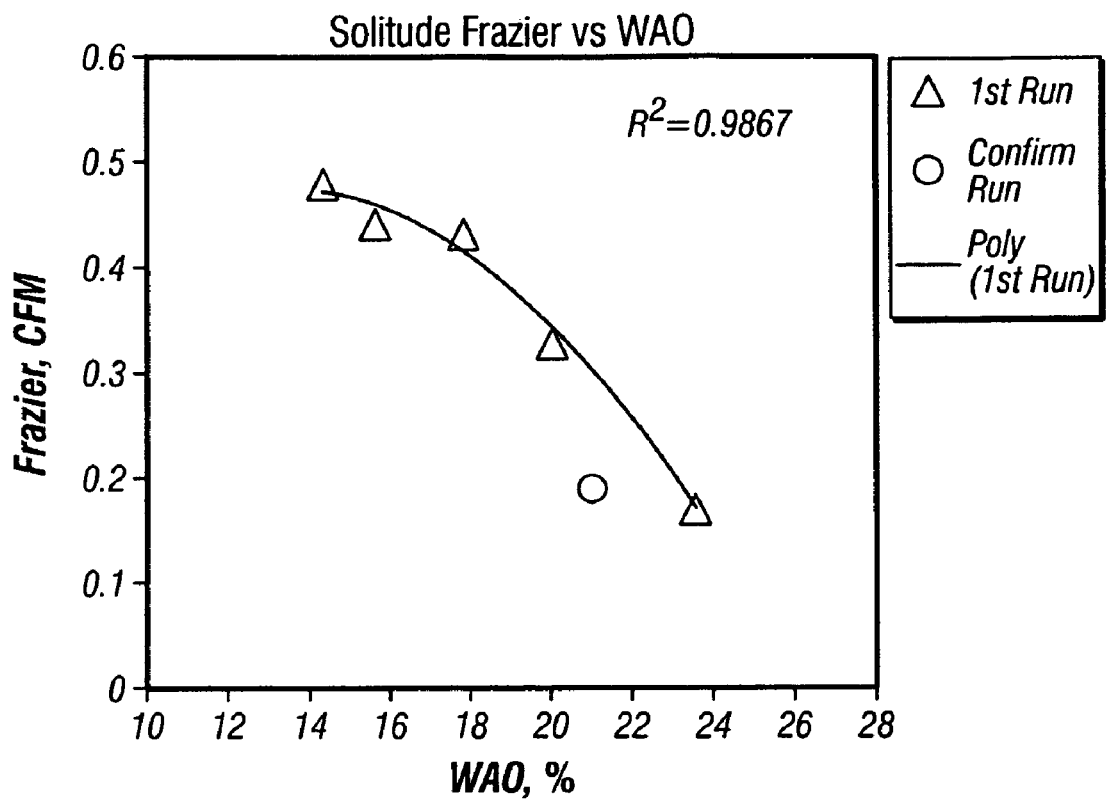
Figure 50:
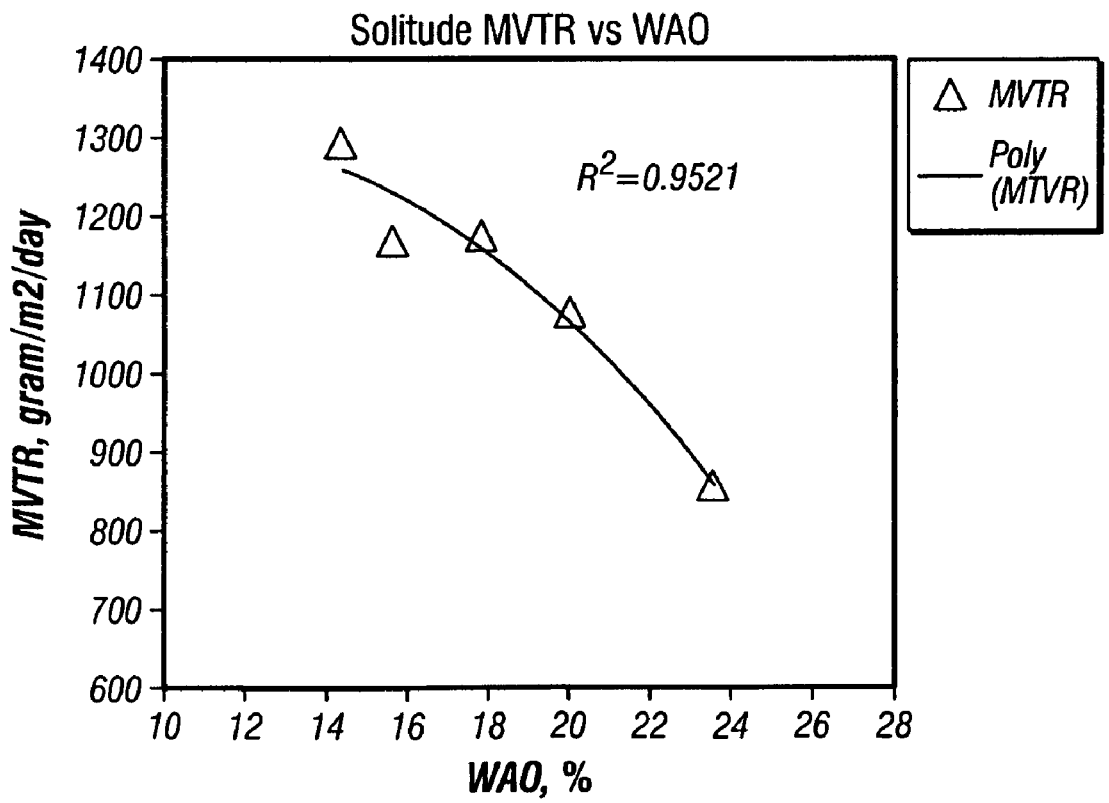

FIGS. 29-33 illustrate the relationship between WAO, suter, densometer, Frazier, and MVTR as a function of force on the blade of the encapsulated Mirage fabric. In FIG. 29, the WAO of both GE 6108 and DC 4-1440 (types of polymers) respond similarly to all the historical cases, i.e. WAO decreases with increasing force on the blade. For both types of encapsulating materials, GE 6108 and DC 4-1440, all other performance properties, such as Suter, densometer, Frazier, and MVTR, showed normal response based on the force model prediction.

Based on the mechanics model, it is revealed that, for a given fabric and polymer, the force (or pressure) on the blade becomes the only variable that determines performance properties of the encapsulated fabric. A natural question is how does force on the blade determine performance properties? Through systematically and thorough analyzing the performance property—force on the blade correlation on all the studied cases, it is found that the force on the blade controls WAO of the fabric for the given fabric and polymer. While WAO (at similar placement), in turn, determines the other performance properties such as water resistance and air permeability.

The performance properties of Mirage at different WAO are shown in FIGS. 34-37, which illustrate results from a study that was performed using a method according to one embodiment of the present invention. Specifically, FIGS. 34-37 illustrate the relationship of Suter, densometer, Frazier, and MVTR vs. WAO of a material known as Mirage. As shown in these figures, all the performance properties, including Suter, densometer, Frazier and MVTR, correlate well with WAO. The general trend was that Suter increases with increasing WAO, while densometer, Frazier and MVTR decrease with increasing WAO. Additionally, there were dramatic differences in the performance properties between the Mirage encapsulated using DC 4-1440 and GE 6108. Generally speaking, DC 4-1440 provides much lower densometer, Frazier and MVTR than GE 6108 at the same WAO. This result suggests that DC 4-1440 may penetrate deeper inside fabric interstices and fiber bundles than GE 6108 does due to its lower viscosity. Further, there exists a threshold on Suter-WAO curve (S-type curve), in which DC 4-1440 reaches high Suter faster than GE 6108 does. Obviously the transition zone of DC 4-1440 is much narrower than GE 6108. The overall differences in performance properties of the Mirage encapsulated using DC 4-1440 and GE 6108 further suggest that high Suter can be reached with DC 4-1440 at relative lower WAO, which is good in the sense of reducing materials cost. At the same time, however, you have to sacrifice some performance reduction in air permeability (lower densometer, Frazier, and MVTR) as a tradeoff.

In one embodiment, the results of Mirage encapsulation run supports the hypothesis that force on the blade controls WAO, while WAO, in turn, determines both water resistance (Suter) and air permeability (densometer, Frazier and MVTR, etc).

3.2 Product Development

In the above Mirage case, the performance—force on the blade study can still be considered as a confirming experiment since both the performance and processing condition are already known. However to determine how the force mechanics model would work for an unknown or not well established fabric, a modeling run and an experimental run were performed on a fabric that is not well understood. One such fabric is called Solitude. Based on the mechanics model, a wide spectrum in performance properties should be achieved if a large range of force on the blade was used for encapsulation. From performance—force correlation curves, desired force on the blade can be selected. Based on the force on the blade—processing variable equations, a unique set of processing variables can then be determined.

Performance properties—force on the blade plots of encapsulated Solitude are shown in FIGS. 38-42, which illustrate results from a study that was performed using a method according to one embodiment of the present invention. Specifically, FIGS. 38-42 illustrate the relationship of change in WAO, Suter, densometer, and Frazier vs. the force of Blade 102 of a relatively unknown fabric called Solitude. It can be seen from these figures that all the performance properties can be fitted using a 2nd order polynomial equation with minimum $R^2$ of 0.946 (MVTR) or larger. The performance properties varied with the force on the blade in a relatively large scale in which the optimum performance properties are covered. Based on the performance requirement, a critical force on the blade can be chosen.

The performance property of Solitude—force on the blade relationship observed proved that the force on the blade can be used as an independent variable in design and development of new products. However, since the performance property—force curves were obtained from the same block, the exclusivity or duplication ability was not demonstrated. To prove the exclusivity of the performance—force relationship, an independent encapsulation run (check point) was conducted, and the results were plotted together with those of previous runs in FIGS. 43-46, which illustrate results from a study that was performed using a method according to one embodiment of the present invention. Specifically, FIGS. 43-46 illustrate the relationship of WAO, Suter, densometer, and Frazier vs. the force of Blade 102 of the Solitude material. From these figures, it has been seen that both WAO and Suter are right on the line. Both densometer and Frazier are lower than the values predicted from the curve, but they are still within the range of experimental error.

When WAO is used as an independent variable, good correlation between performance properties and WAO was found. FIGS. 47-50 illustrate results from a study that was performed using a method according to one embodiment of the present invention. Specifically, FIGS. 47-50 illustrate the relationship of Suter, densometer, Frazier, and MVTR vs. WAO of the Solitude material.

In one embodiment, the Solitude fabric requires a Suter of 800 mm. Based on the suter-WAO curve, the minimum WAO of 18% is recommended. In order to achieve a Suter of 800 mm, double encapsulation was used. In the historical data, Suters of 800 mm or higher were achieved from double encapsulations, while the majority of the lower Suters were obtained by a single encapsulation. The curve generated from the mechanics model study covers a relatively broad WAO range. These results indicate that a desired Suter may be achieved if the WAO requirement is fulfilled regardless of whether a single or double encapsulation method is used.

Figure 51:
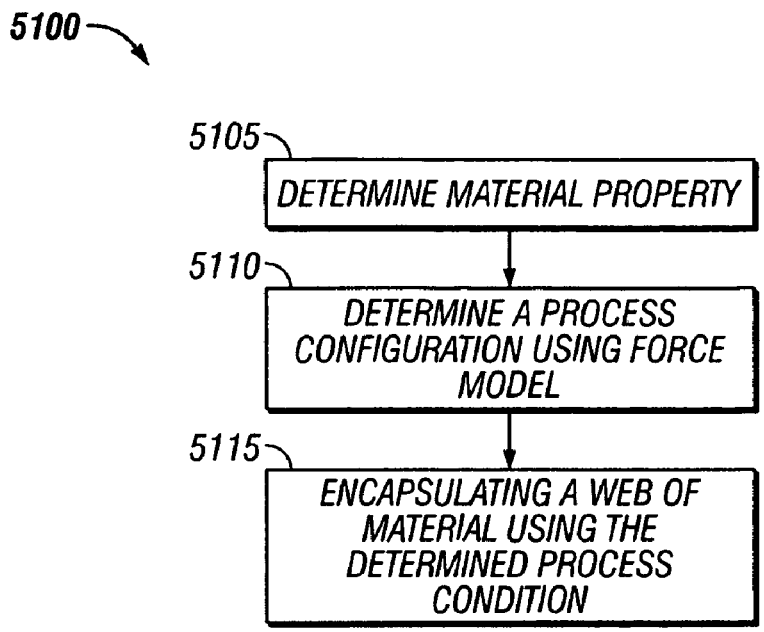
FIG. 51 is a diagram illustrating a method used for encapsulating a web according to an embodiment of the present invention.

FIG. 51 illustrates a process flow 5100 for an encapsulation method according to one embodiment of the present invention. Referring to FIG. 51, process flow 5100 begins at a step 5105 where a material property is determined. In step 5105, the material of the web and the encapsulating material can be determined. In one embodiment, inspection module 123 can be used to determine a characteristic or property of the material of the web or the encapsulating material. For example, a weight or porosity of the web or the viscosity and temperature of the encapsulating material can be determined using inspection module 123. In one embodiment, the material property may be a desired property or characteristic of the final encapsulated web/product, which may be manually determined and entered. Once these data are determined and collected, they can be used at a step 5110.

In step 5110, a process configuration is determined using a force model of an encapsulating system having two coating blades. Each blade of the encapsulating is configured to encourage the encapsulation material to encapsulate the web when the web passes each of the blades. The force model used to determine the process configuration(s) is configured to use the data received from step 5105 such as, for example, the web's weight and porosity or the encapsulating material's temperature and viscosity. Additionally, the force model can be configured to take the desired material property of the final encapsulated web into consideration as it generates the process configurations or parameters. Using the models established above and as shown in FIGS. 2-8, for example, the force model can generate a recommended process configurations or parameters, which are then used in a step 5115.

In step 5115, a web is encapsulated or coated using the determined process configurations such that the encapsulated web will exhibit the desired or predicted characteristics.

4. Encapsulation Mechanism

The encapsulation process used by apparatus or environment 100 or in apparatus shown in FIG. 1A-C deals with the controlled penetration of a non-Newtonian fluid (liquid silicone rubber) into the pore spaces of fabric, including interstices between warp and fill yarns and capillaries between fiber filaments. Such a penetration is driven by the hydrodynamic pressure difference between the encapsulation surface and the back face of a fabric. Such a hydrodynamic pressure difference is composed of external hydrodynamic pressure generated at blade tips, weight of polymer, as well as capillary pressure induced by wetting or repelling of polymer liquid.

Among the three sources of pressure, weight of polymer is normally not high enough to drive high viscous polymer inside most pores of a woven fabric, so its effects are not considered in the encapsulation process. Based on capillary principle, the capillary pressure difference can be either positive or negative depending on either spreading or repelling nature of a liquid on the surface of capillaries.

With a positive capillary pressure difference, a spontaneous uptake of liquid (capillary rise) occurs, in which small pores are filled preferentially with limited supply of liquid. With a negative capillary pressure difference; however, a repelling of liquid occurs, in which large pores are preferentially filled with limited supply of liquid if external hydrodynamic pressure is applied. This spontaneous uptake process probably does not happen in the apparatus or system shown in FIG. 1A-C due to either high viscosity of polymer liquid or special hindrance of small capillary size relative to the size of entangled polymer molecule coils or high repelling effect from pre-finish chemical treatment or a combination of the above. Among these possibilities, the repelling effect is generally considered to be the most likely one. Such an assumption is indirectly supported by the phenomenon that, under the same encapsulation process, silicone weight added on a raw fabric (without pre-finish chemical treatment) is always higher than on the same fabric with a pre-finish chemical treatment.

It is believed that the pre-finish chemical treatment mainly increases the repelling effect of a fabric (by reducing surface energy) with negligible change of its physical structure, the higher silicone weight added on was resulted from much deeper penetration of silicone into the interstitial spaces and filament bundles of a raw fabric. External hydrodynamic pressure on the blade is generated by fabric tension, setting of blade angles as well as blade sharpness. Precise control of the balance between external hydrodynamic pressure and capillary pressure for any given fabric and polymer becomes the state-of-art of our encapsulation technology.

4.1 Effect of Fabric Structure on Encapsulation

For in depth understanding of encapsulation process, it is essential to have some key knowledge of fabric structure. Fabric structure is so important that most failures in product development can be attributed to improper fabric structures and its pre-finish treatment. For the coating of a porous substrate (coating processes have many similarities as our encapsulation technology), pore size, shape, and distribution (including connectivity) of a porous material may be the most interested structural properties. Woven fabric is generally considered to be a porous substrate due to the existence of interstial spaces between warp and fill yarns and capillaries between filament bundles. In order to understand the details of the effect of fabric structure on encapsulation, fabric structure is defined in a more general way below.

Figure 52:
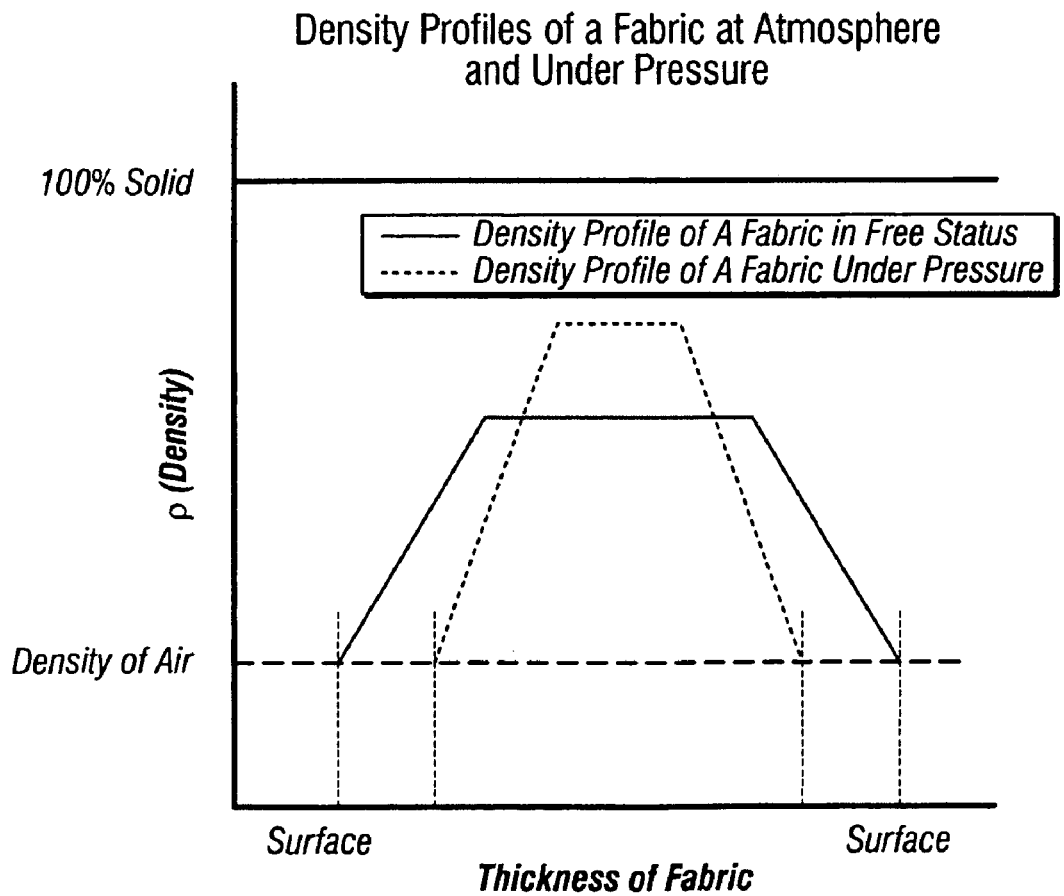

Let us assume that a fabric were rigid and it can be laterally sliced into many very thin layers, then an imaginary density profile of the fabric, as shown in FIG. 52, from the face to back would be then obtained by averaging the density of each sliced layer and plotting this density as a function of position of each layer. The solid bar in FIG. 52 represents the density of a pore-free fabric, i.e. the fabric is made of 100% solid material (the same density of a single fiber). The portion of the fabric, which shows a constant density, is defined as inside of the fabric, while the portion of the fabric, which shows a varying density, is defined as surface of the fabric. Keep it in mind that a real fabric is not a rigid network and its dimension will change under tension or pressure (expanding in tension direction and reducing in thickness). With dimensional changes, the density profile will change accordingly, see dotted line in FIG. 52. The discrepancy between the solid bar and the inside density reflects porosity. Porosity inside a fabric is mainly dependent upon both the tightness of warp and fill yarns and weaving tightness of the woven fabric (influenced by the weaving structure and weaving technology). The surface of a fabric, however, is not only dependent on tightness of yarns and weaving, but is also dependent on count of filaments (thickness of yarns). The concept of fabric surface topology can be better understood by viewing a simplified plain weaved fabric model shown in FIG. 53.

Structure of a fabric is defined as above since it is believed flow behavior of a polymer is quite different at the exposure surface region and inside of the fabric. Such a definition will help us in understanding of concept of WAO and polymer placement on and/or inside a fabric. Inside a fabric, polymer flow can be simply treated as one dimensional flow described by Darcy's law: $q=-k\Delta p/\eta \Delta x$, i.e. locally the volumetric flux per unit total cross-section of material q is proportional to the negative of the mechanical potential gradient, of which only the pressure gradient $\Delta p$ is relevant here, and is inversely proportional to the liquid's (liquid silicone rubber for our case) viscosity, $\eta$. The proportionality constant is the permeability of the material to the liquid, k. The permeability, k, is mainly dependent on size and shape of pores inside the fabric. In deformable porous media such as a fabric undergoing compression (hydrodynamic pressure) and expansion (fabric recovery after release of the hydrodynamic pressure), the size and shape of pore may change (as described by the dot curve in FIG. 54).

At the surface region of a fabric, however, polymer flow is three dimensional and more complex than inside the fabric. Since the majority of the surface contour spaces are wide open, they can be filled quite easily in the dynamic encapsulation process. However, except for the surface dragging effect weight added at the surface of a fabric is determined by the available open surface space of the deformed fabric. The deformability is mainly dependent on external hydrodynamic pressure, structure, rigidity and tightness of a fabric.

Effect of WAO and Polymer Placement on Performance

Proposed WAO and polymer placement as a function of pressure is shown in FIG. 54 according to a model of one embodiment of the present invention. The solid line indicates how total WAO changes with pressure, while the two dotted lines reflect where the WAO is distributed. FIG. 54 indicates that, for a given polymer, the total WAO always decreases with increasing encapsulation pressure. WAO on the surface region follows the same trend as the total WAO, while the WAO inside of a fabric may show a reverse trend. In other words, WAO inside a fabric may increase with increasing encapsulation pressure, the total WAO always decreases as a result of removing of WAO on surface region. For polymers with different viscosities, however, total WAO for a higher viscous polymer is always higher than that for a lower viscous polymer (surface dragging effect). The WAO inside a fabric is usually reversed based on Darcy's law. The detailed WAO and its placement can be used to explain performance properties of encapsulated fabrics.

Air Permeability

Since the size of molecules in air is fairly small, their transmitting rate through a fabric is mainly controlled by the total percentage of pores and connectivity of those pores. For any given fabric, the seal of air paths in the fabric and total surface area covered by the polymer increase with increasing WAO. Therefore, under atmosphere or limited pressure, air permeability will decrease with increasing WAO. When polymers with different viscosities are used, the air permeability will be affected not only by the total WAO but also by the depth of polymer penetration inside a fabric. For example, Mirage encapsulated with GE 6108 (high viscosity) always has a higher air permeability than that encapsulated with DC 4-1440 (low viscosity) at the same total WAO (see FIG. 35). The effect of polymer penetration inside a fabric on air permeability is so dramatic that, for the same level of MVTR, only half amount of WAO is needed if DC 4-1440 is used to replace GE 6108. Obviously, the high efficiency of air blocking of DC 4-1440 is attributed to its deeper penetration inside the fabric yarns.

Water Permeability (Suter Test).

Theoretically, anything that decreases air permeability should also decrease water permeability (or increase water resistance). However, since water resistance is characterized by the hydrodynamic pressure needed to push a water drop through a fabric (Suter Test), the water resistance is not only dependent upon how many water paths are blocked but also on how strong the blocking materials are. The strength of the encapsulated polymer is contributed from both the film thickness and restrictions on the deformability of the films. Generally speaking, the higher the WAO, the higher the water resistance since film thickness increases with increasing WAO. However, variation of water resistance as a function of WAO is not necessarily linear, instead, a S-type curve is observed for the limited cases studied, such as Mirage and Solitude. Based on the shape of the Suter-WAO curve (see FIG. 34), three WAO ranges at which Suter responds differently are identified. At a low WAO range (the actual upper limit varies with the fabric and silicone), there is no enhancement of Suter performance; instead, the Suter is even lower than that of corresponding raw fabric. At an intermediate WAO range, Suter increases dramatically with increasing WAO. At high WAO, the rate of Suter increase slows down. Although the true reason why the Suter is even lower than raw fabric at low WAO is not clear, a hypothesis that may be used to explain this phenomenon is proposed. At low WAO (note that low WAO is normally achieved by very high encapsulation pressure and the WAO is mainly placed inside of the fabric rather than concentrated on surface region), the original structure of the raw fabric is interrupted by forced penetration of silicone. Such interruptions may create more pores and these pores are partially filled due to limited supply of silicone. Therefore, though the partially filled pores become a barrier for air permeability at low hydrodynamic pressure such as in both the Densometer and Frazier tests, it is not strong enough to stop water penetration under high hydrodynamic pressure such as in the Suter test. At an intermediate range of WAO, however, Suter increases almost linearly with increasing WAO because a coating (as defined previously) starts to form and its thickness increases with WAO. At a high WAO range (note that high WAO is normally achieved at very low encapsulation pressure and the WAO is mainly placed on surface region of a fabric), the thickness of the coating is still growing, but the rate of Suter increase slows down since the restriction from inside of the fabric is weakened due to less polymer penetration. The S-shape curve of Suter-WAO is only observed on Mirage and Solitude (the only two systems studied). The utility across substrate is still to be explored.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

While various embodiments of the present invention have been described above, it should be understood that they have been presented by way of example only, and not of limitation. Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for encapsulating a web with an encapsulation material comprising:
   determining initial material properties of the material to be encapsulated
   determining a process configuration using a force model of an encapsulating system having two coating blades, wherein each blade is configured to encourage the encapsulation material to encapsulate the web when the web passes each of the blades, and wherein the force model is applied based on the initial properties of the material to be encapsulated; and
   encapsulating the web using the determined process configuration.

2. The method of claim 1, further comprising determining a final performance property of the encapsulated web, wherein the force model is applied based on the final performance property of the web, and wherein the final performance property comprises one or more of air permeability, hydrostatic head, and weight add on.

3. The method of claim 1, further comprising defining a property of the encapsulation material, wherein the force model is applied based on the defined property of the encapsulation material, and wherein the property of the encapsulation material comprises one or more of polymer type, viscosity, and coefficient of friction.

4. The method of claim 1, wherein a first blade of the two coating blades is downstream from a second blade of the two coating blades.

5. The method of claim 4, wherein the process configuration comprises one or more of a first entrance angle of the first blade, a first exit angle of the first blade, a second entrance angle of the second blade, a second exit angle of the second blade, a second radius of the second blade, and tension of the web.

6. The method of claim 5, wherein the force model comprises:

$$\frac{F_{N2}}{F_{N1}} = \frac{\cos\theta_{i2}}{\cos\theta_{i1}(1-\cos\theta_{e1}\mu)(1-\cos\theta_{i2}\mu)}$$

wherein $F_{N2}$ is a force normal to the web at the second blade, $F_{N1}$ is a force normal to the web at the first blade, $\theta_{i1}$ is the first entrance angle, $\theta_{e1}$, is the first exit angle, $\theta_{i2}$ is the second entrance angle, $\theta_{e2}$ is the second exit angle, and $\mu$ is a coefficient of friction between the web and the blades.

7. The method of claim 6, wherein the process configuration is selected based on the such that $F_{N2}$ is larger than $F_{N1}$.

8. The method of claim 7, $F_{N1}$ wherein and $F_{N2}$ are selected based on the desired property of the encapsulated web.

9. The method of claim 5, wherein the first and second entrance angles and the first and second exit angles have a range of 25-85 degrees.

10. The method of claim 5, wherein the first and second radii have a range of 0.00002-0.00100 inches, and wherein the tension of the web has a range of 125-750 pounds.

11. The method of claim 4, wherein the process parameters comprises one or more of a first entrance angle of the first blade, a first exit angle of the first blade, a first radius of the first blade, a second entrance angle of the second blade, a second exit angle of the second blade, a second radius of the second blade, and a tension of the web.

12. The method of claim 5, wherein the force model comprises:

$$\frac{F_{N2}}{F_{N1}} = \frac{\cos\theta_{i2}}{\cos\theta_{i1}(1-\cos\theta_{e1}\mu)(1-\cos\theta_{i2}\mu)}$$

wherein $F_{N2}$ is a force normal to the web at the second blade, $F_{N1}$ is a force normal to the web at the first blade, $\theta_{i1}$ is the first entrance angle, $\theta_{e1}$ is the first exit angle, $\theta_{i2}$ is the second entrance angle, $\theta_{e2}$ is the second exit angle, and $\mu$ is a coefficient of friction between the web and the blades.

13. The method of claim 1, wherein the first material property comprises weight, strength, porosity, or weave configuration.

14. The method of claim 1, wherein the second material property comprises a viscosity of the encapsulation material.

15. The method of claim 14, wherein the viscosity of the encapsulation material has a range of 100,000-1,500,000 centi-poise.

16. A method for coating a web with a coating material comprising:
   determining a desired characteristic of a coated web;
   determining a process parameter using a force model of a coating system having two coating blades, wherein each blade is configured to encourage the coating material into the web when the web passes each of the blades, and wherein the force model is based on the desired characteristic of the coated web; and
   coating the web with the coating material using the determined process parameter, wherein the process parameter defines how the web passes one of the blades.

17. An encapsulating system comprises:
   a first blade and a second blade configured to cause an encapsulation material to encapsulate a web, the second blade being downstream from the first blade;
   a plurality of rollers for supporting and encouraging the web to pass the first and second blades;
   a force modeling module configured to receive characteristics of the web and the encapsulation material, wherein the force modeling module is configured to generate operating parameters for controlling one or more of the first and second blades and one or more of the plurality of rollers based on the received characteristics; and a control module configured to implement the generated operating parameters such that a first force is exerted on the web by the first blade and a second force is exerted on the web by second blade.

18. The encapsulating system of claim 17, wherein the operating parameters comprises one or more of a first entrance angle of the first blade, a first exit angle of the first blade, a first radius of the first blade, a second entrance angle of the second blade, a second exit angle of the second blade, a second radius of the second blade, and a tension of the web.

19. The encapsulating system of claim 18 wherein the force modeling module generates the operating parameters based on a force equation defined as:

$$\frac{F_{N2}}{F_{N1}} = \frac{\cos\theta_{i2}}{\cos\theta_{i1}(1-\cos\theta_{e1}\mu)(1-\cos\theta_{i2}\mu)}$$

wherein $F_{N2}$ is a force normal to the web at the second blade, $F_{N1}$ is a force normal to the web at the first blade, $\theta_{i1}$ is the first entrance angle, $\theta_{e1}$ is the first exit angle, $\theta_{i2}$ is the second entrance angle, $\theta_{e2}$ is the second exit angle, and $\mu$ is a coefficient of friction between the web and the blades.

20. The encapsulating system of claim 19, wherein the second force is equal to or larger than the first force.

21. The encapsulating system of claim 19, wherein the second force is less than the first force.

22. The encapsulating system of claim 20, wherein $F_{N1}$ and $F_{N2}$ are selected based on a desired property of an encapsulated web.

23. An encapsulating system comprises:
a first blade and a second blade configured to cause an encapsulation material to encapsulate a web, the second blade being downstream from the first blade;
a plurality of rollers for supporting and encouraging the web to pass the first and second blades;
a control module configured to change one or more characteristics of the web relative to the first and second blades by changing an operating parameter of one or more of the blades or one or more of the plurality of rollers, wherein the relative characteristics of the web are changed based on a desired amount of force ratio of the first and second blades, the force ratio being defined as $$\frac{F_{N2}}{F_{N1}} = \frac{\cos\theta_{i2}}{\cos\theta_{i1}(1-\cos\theta_{e1}\mu)(1-\cos\theta_{i2}\mu)}$$

wherein $F_{N2}$ is a force normal to the web at the second blade, $F_{N1}$ is a force normal to the web at the first blade, $\theta_{i1}$, is an entrance angle of the web with respect to the first blade, $\theta_{e1}$ is an exit angle of the web with respect to the first blade, $\theta_{i2}$ is an entrance angle of the web with respect to the second blade, $\theta_{e2}$ is an exit angle of the web with respect to the second blade, and $\mu$ is a coefficient of friction between the web and the blades.

24. A fabric having a plurality of encapsulated fibers prepared by a process, the process comprising:
determining initial material properties of the material to be encapsulated
determining a process configuration using a force model of an encapsulating system having two coating blades, wherein each blade is configured to encourage the encapsulation material to encapsulate the fabric when the fabric passes each of the blades, and wherein the force model is applied based on the initial properties of the material to be encapsulated; and
encapsulating the fabric using the determined process configuration.

25. A fabric having a plurality of fibers and interstices, wherein the plurality of fibers are encapsulated by a polymer, and wherein the plurality of interstices are filled with the polymer, the fabric prepared in accordance with the method of claim 24.

* * * * *